US008463107B2

(12) United States Patent
Ikeda et al.

(10) Patent No.: US 8,463,107 B2
(45) Date of Patent: Jun. 11, 2013

(54) RECORDING MEDIUM, REPRODUCTION APPARATUS, RECORDING METHOD, PROGRAM, AND REPRODUCTION METHOD

(75) Inventors: Wataru Ikeda, Osaka (JP); Tomoyuki Okada, Nara (JP); Yasushi Uesaka, Hyogo (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 505 days.

(21) Appl. No.: 12/757,128

(22) Filed: Apr. 9, 2010

(65) Prior Publication Data

US 2010/0195982 A1    Aug. 5, 2010

Related U.S. Application Data

(62) Division of application No. 10/543,515, filed as application No. PCT/JP2004/000891 on Jan. 30, 2004, now Pat. No. 7,729,598.

(60) Provisional application No. 60/443,876, filed on Jan. 31, 2003.

(51) Int. Cl.
*H04N 5/917* (2006.01)

(52) U.S. Cl.
USPC .......................................................... 386/248

(58) Field of Classification Search
None
See application file for complete search history.

(56) References Cited

U.S. PATENT DOCUMENTS

| 5,440,680 | A |   | 8/1995 | Ichikawa et al. |
|-----------|---|---|--------|-----------------|
| 5,600,838 | A | * | 2/1997 | Guillen et al. ................ 719/315 |
| 5,859,642 | A | * | 1/1999 | Jones ........................... 715/821 |
| 5,895,124 | A |   | 4/1999 | Tsuga et al. |
| 5,907,658 | A |   | 5/1999 | Murase et al. |
| 5,929,857 | A |   | 7/1999 | Dinallo et al. |
| 6,067,400 | A |   | 5/2000 | Saeki et al. |
| 6,088,506 | A |   | 7/2000 | Yoshio et al. |
| 6,181,871 | B1 |  | 1/2001 | Saeki et al. |

(Continued)

FOREIGN PATENT DOCUMENTS

| CN | 1213454 A | 4/1999 |
|----|-----------|--------|
| CN | 1216196 A | 5/1999 |

(Continued)

OTHER PUBLICATIONS

The Extended European Search Report of EP Application No. 10151651, dated Aug. 30, 2011.

(Continued)

*Primary Examiner* — Thai Tran
*Assistant Examiner* — Sunghyoun Park
(74) *Attorney, Agent, or Firm* — Panasonic Patent Center

(57) ABSTRACT

On a BD-ROM, there is recorded is a digital stream into which video and audio streams are multiplexed. The video stream is composed of a plurality of pictures that together represent video. The graphics stream includes a PES packet storing state control information (ICS) and PES packets containing graphics data (ODSs). The graphics data constructs an interactive display. The state control information defines the control so as to change the states of buttons presented on the interactive display according to the reproduction proceeding and user operations.

The ICS is attached with a PTS showing the display timing of a picture to be synchronized with the interactive display. The ODS is attached with a PTS showing the timing for decoding the graphics data. The timing shown in the ODS is prior to the display timing.

7 Claims, 48 Drawing Sheets

U.S. PATENT DOCUMENTS

| | | |
|---|---|---|
| 6,226,446 B1 | 5/2001 | Murase et al. .................. 386/95 |
| 6,266,478 B1 | 7/2001 | Yoshio et al. |
| 6,285,823 B1 | 9/2001 | Saeki et al. |
| 6,381,398 B1 | 4/2002 | Yamauchi et al. |
| 6,389,221 B1 | 5/2002 | Saeki et al. |
| 6,434,326 B1 | 8/2002 | Kondo et al. |
| 6,466,220 B1 | 10/2002 | Cesana et al. |
| 6,470,460 B1 | 10/2002 | Kashiwagi et al. |
| 6,600,502 B1 * | 7/2003 | Brewster, Jr. .................. 715/854 |
| 6,806,893 B1 * | 10/2004 | Kolawa et al. ................. 715/848 |
| 7,412,152 B2 | 8/2008 | Yahata et al. |
| 7,426,337 B2 | 9/2008 | Yahata et al. |
| 7,814,422 B2 | 10/2010 | Yahata et al. |
| 2001/0010671 A1 | 8/2001 | Ando et al. |
| 2001/0051040 A1 | 12/2001 | Yoshio et al. |
| 2002/0163543 A1 * | 11/2002 | Oshikiri ........................ 345/810 |
| 2003/0161615 A1 | 8/2003 | Tsumagari et al. |
| 2003/0182402 A1 * | 9/2003 | Goodman et al. ............ 709/220 |
| 2003/0206712 A1 | 11/2003 | Yoshio et al. |
| 2005/0105888 A1 | 5/2005 | Hamada et al. |
| 2006/0188223 A1 | 8/2006 | Ikeda et al. |
| 2008/0271093 A1 | 10/2008 | Nabeshima et al. |

FOREIGN PATENT DOCUMENTS

| | | |
|---|---|---|
| CN | 1263420 A | 8/2000 |
| EP | 0 738 078 | 10/1996 |
| EP | 0 800 174 | 10/1997 |
| EP | 0 886 276 | 12/1998 |
| EP | 0 898 279 | 2/1999 |
| EP | 0 924 934 | 6/1999 |
| EP | 0 982 725 A2 | 3/2000 |
| EP | 1 605 696 | 12/2005 |
| EP | 1 876 821 | 1/2008 |
| JP | 1-221073 | 9/1989 |
| JP | 09-81118 | 3/1997 |
| JP | 9-282848 | 10/1997 |
| JP | 2813245 | 8/1998 |
| JP | 11-18048 | 1/1999 |
| JP | 11-187398 | 7/1999 |
| JP | 2000-67522 A | 3/2000 |
| JP | 2001-052470 | 2/2001 |
| JP | 2001-332006 | 11/2001 |
| JP | 2002-063570 | 2/2002 |
| JP | 2002-230942 A | 8/2002 |
| JP | 2002-533000 | 10/2002 |
| JP | 4245607 B2 | 3/2009 |
| KR | 0177816 | 4/1999 |
| WO | 98/21722 | 5/1998 |
| WO | WO 00/36600 | 6/2000 |
| WO | 01/15168 | 3/2001 |
| WO | 01/30088 A1 | 4/2001 |
| WO | 01/31497 | 5/2001 |
| WO | WO 01/76256 A1 | 10/2001 |
| WO | 02/079902 | 10/2002 |
| WO | 2004/068854 A1 | 8/2004 |
| WO | 2005/004145 | 1/2005 |

OTHER PUBLICATIONS

Digital Video Broadcasting—Subtitling Systems; European Standard (Telecommunications series) ETSI EN 300 743 V1.2.1 (Oct. 2002).

Chinese Notice of Allowance, with English Translation, issued in Chinese Patent Application No. 200710147101.1 dated Sep. 29, 2012.

* cited by examiner

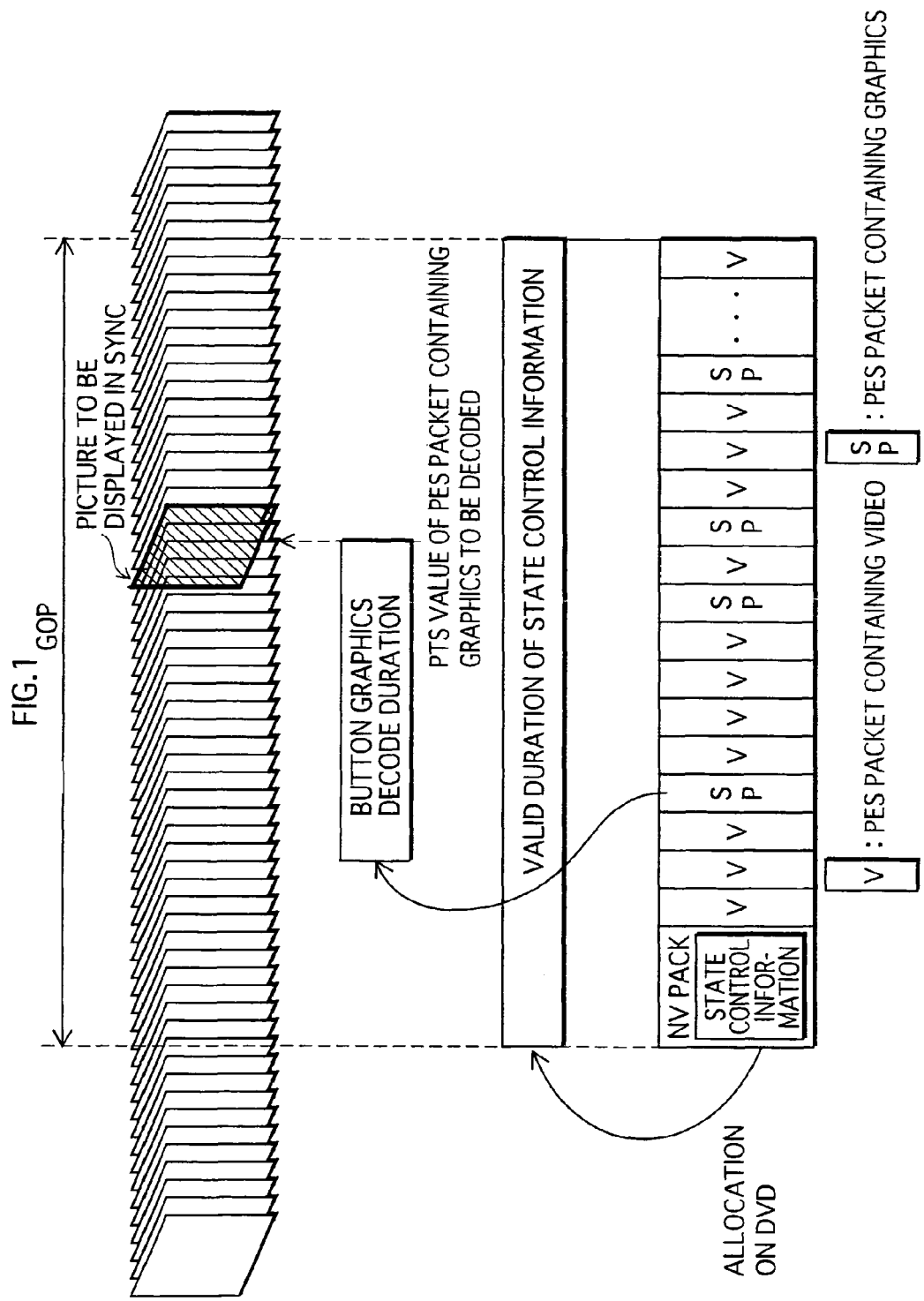

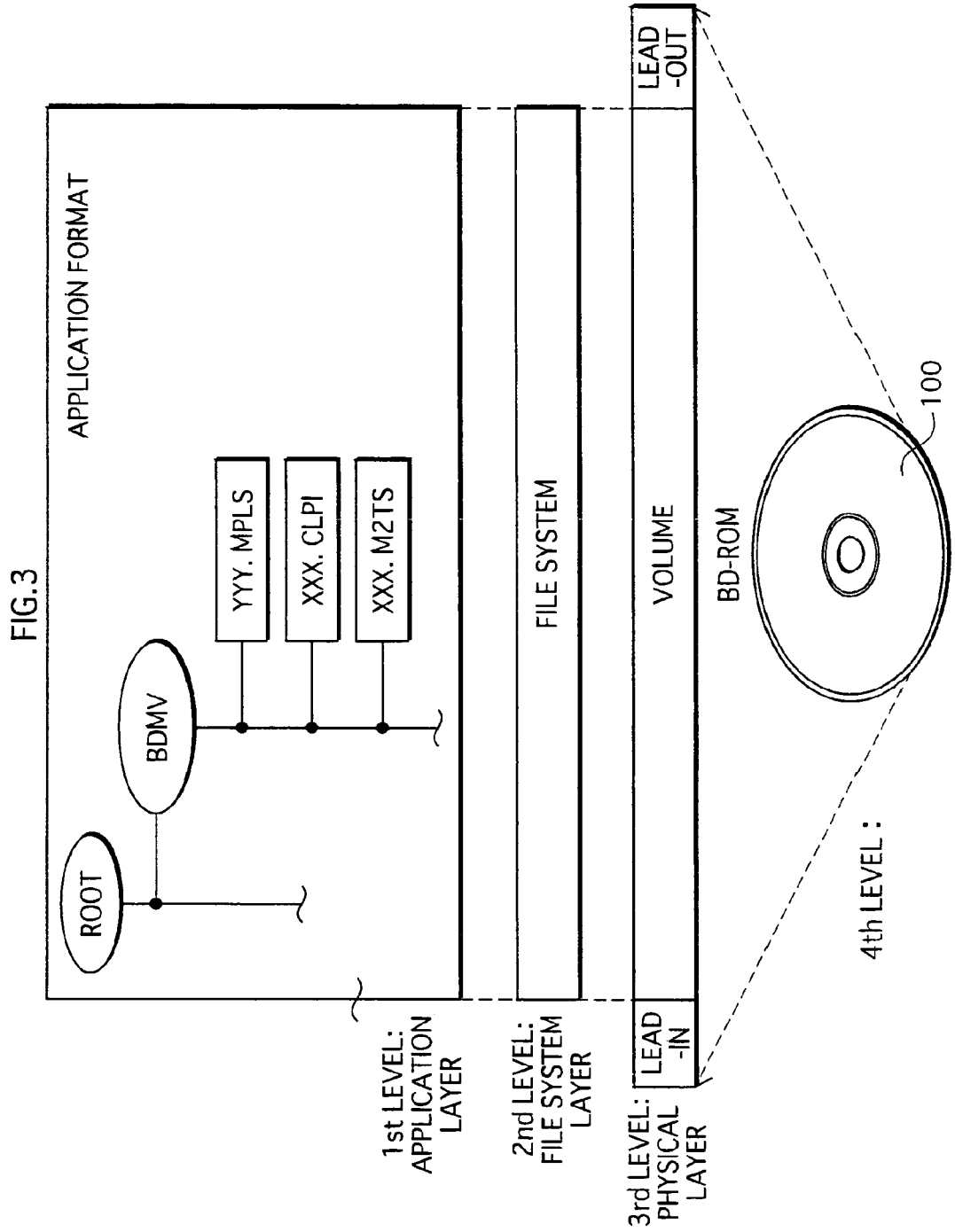

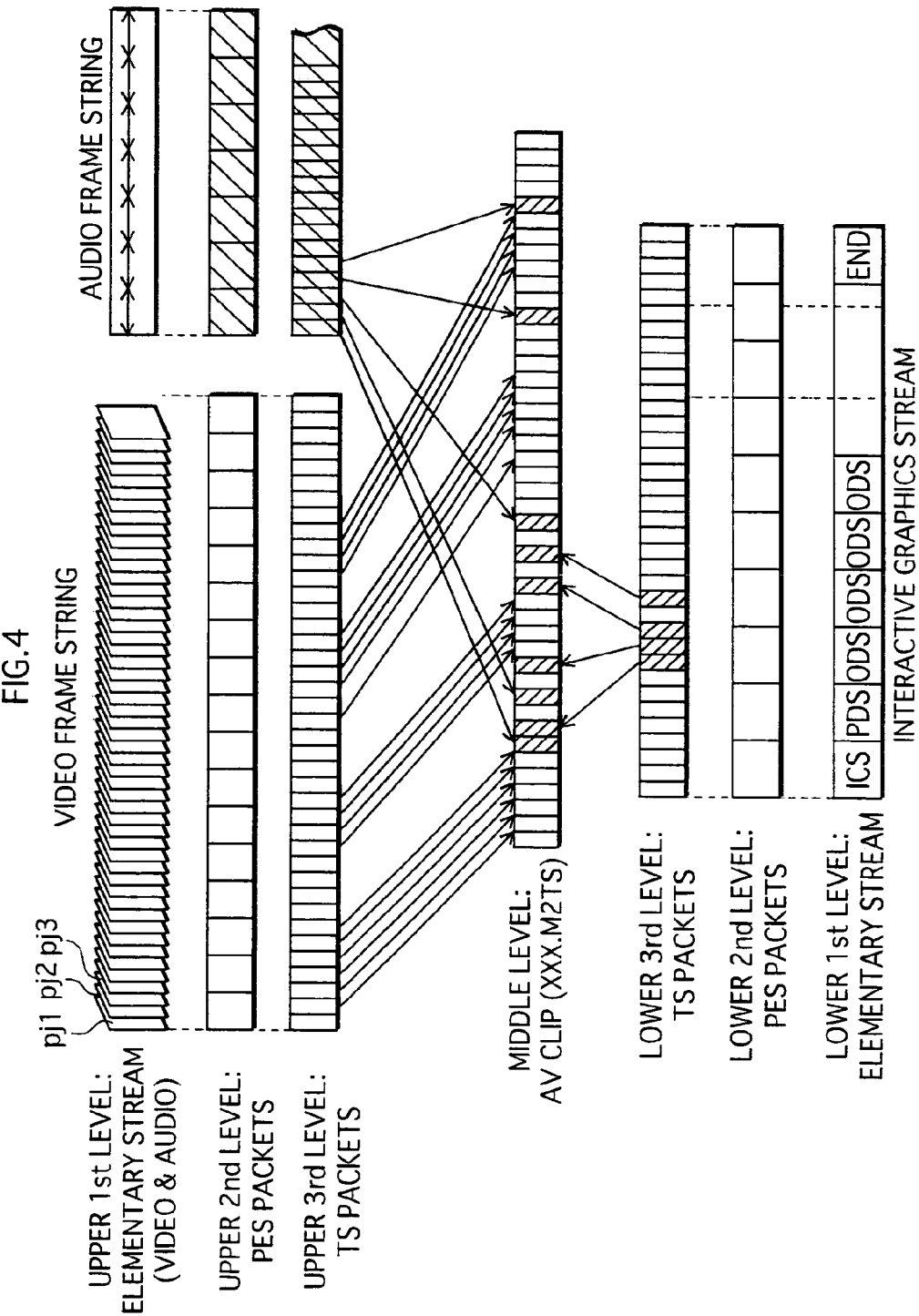

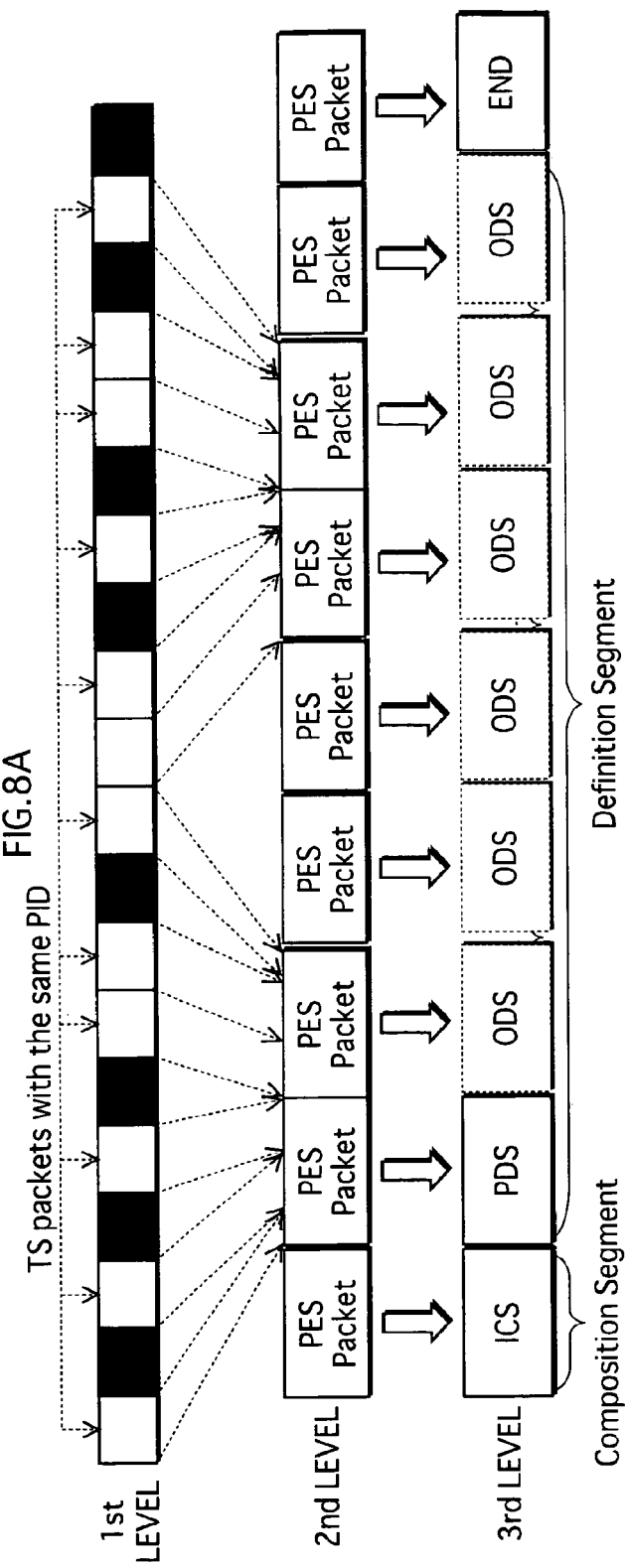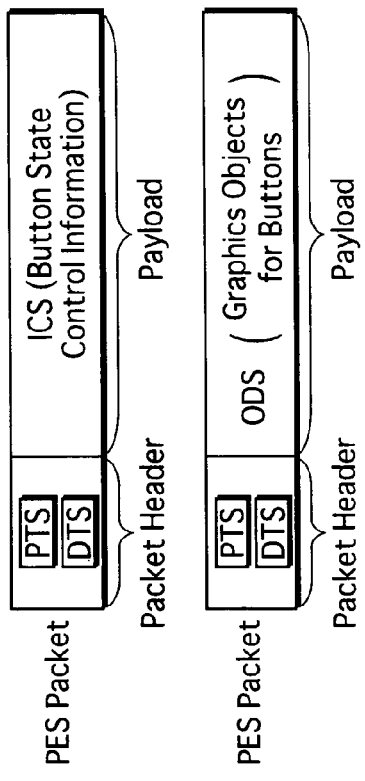

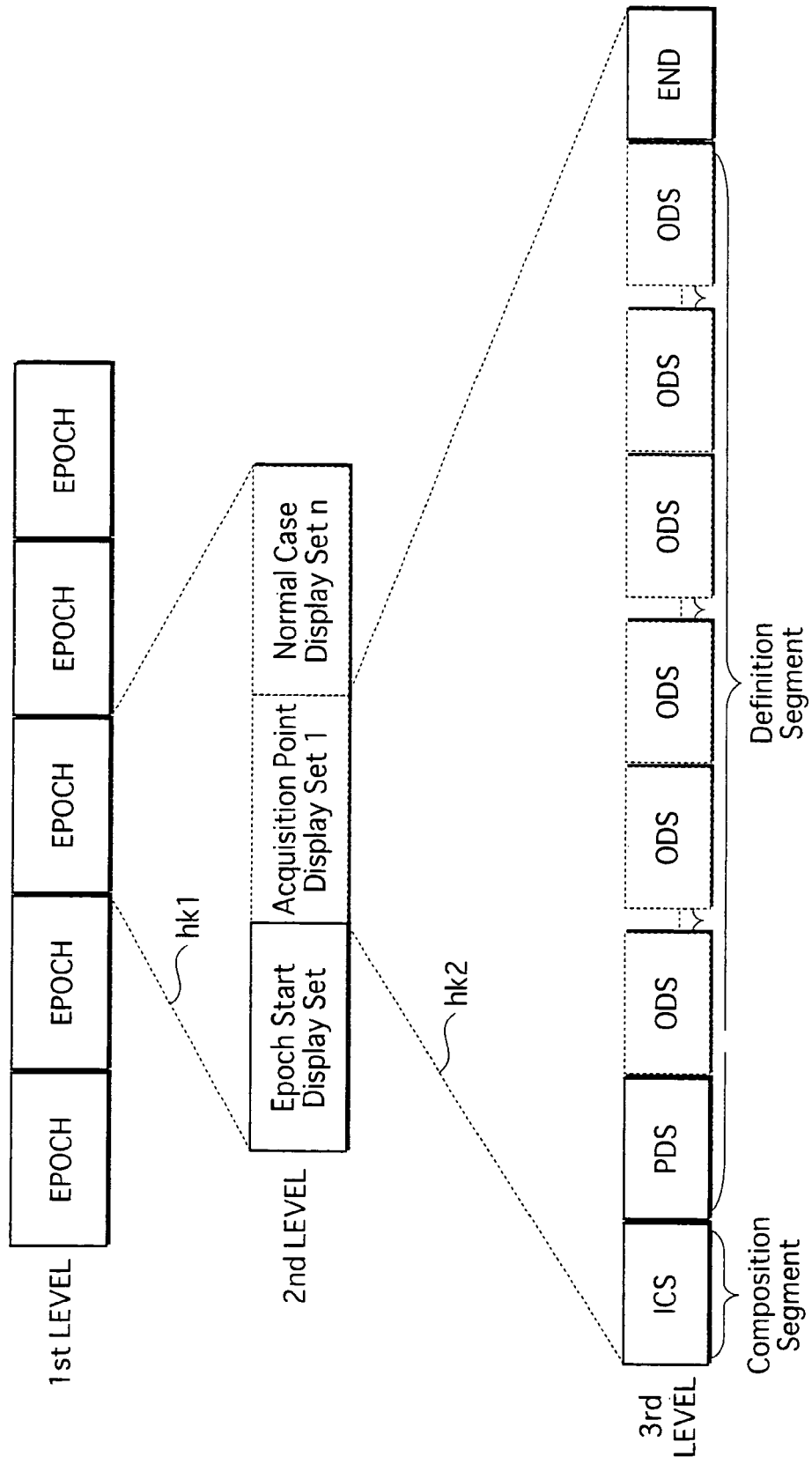

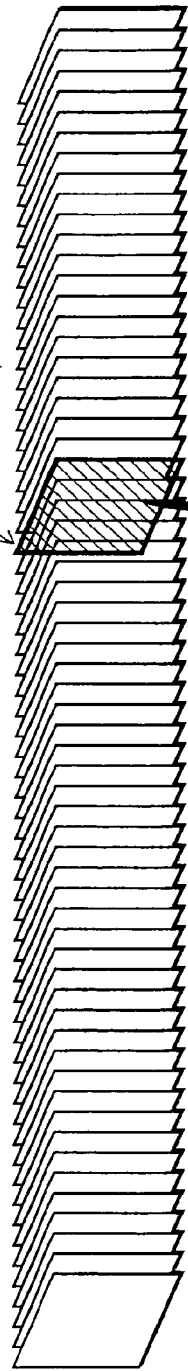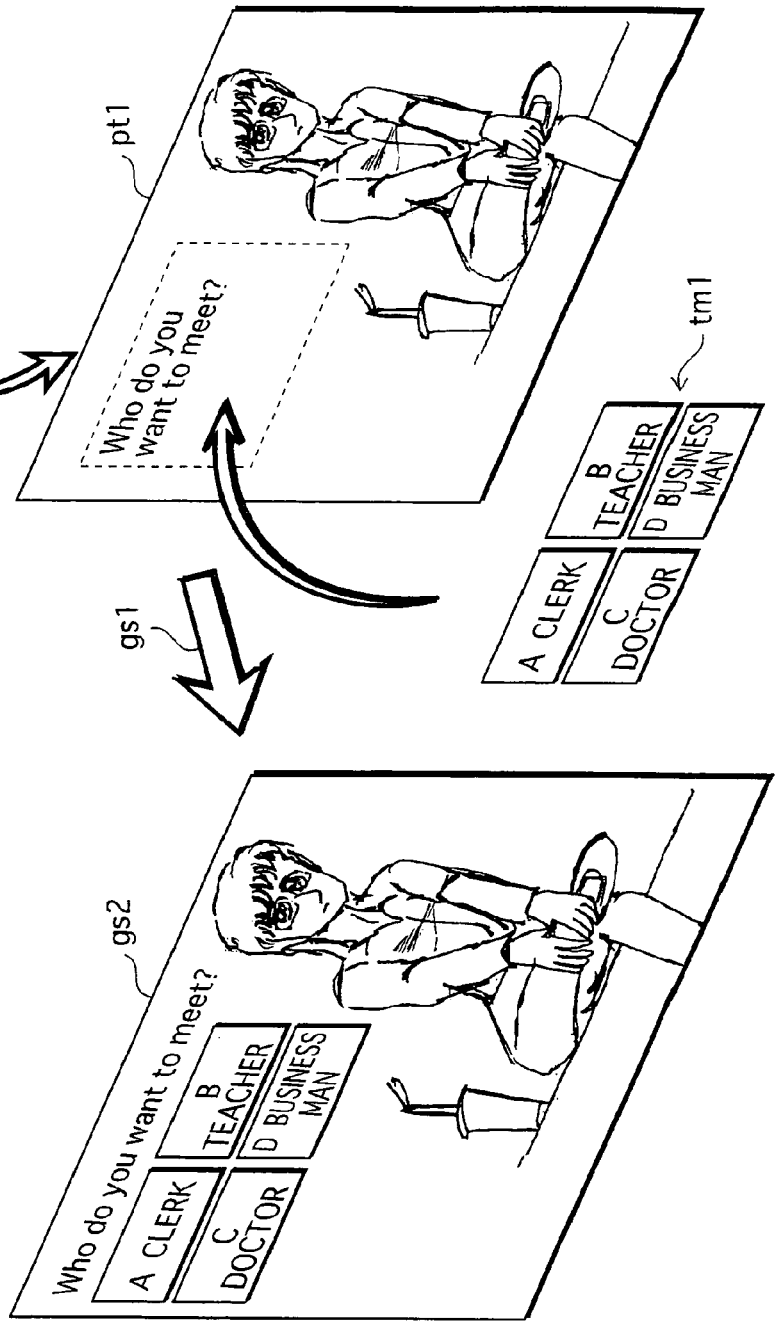
FIG.13

PLAYERS LIST

| | BUTTON A | BUTTON B | BUTTON C |
|---|---|---|---|
| L-COMPONENT | 1.0 | 0.1 | |
| R-COMPONENT | | 0.1 | |
| CENTER COMPONENT | | 0.4 | |
| REAR-LEFT COMPONENT | | 0.2 | |
| REAR-RIGHT COMPONENT | | 0.2 | 1.0 |

BUTTON 1 IN SELECTED STATE

BUTTON 2 IN SELECTED STATE

|  | BUTTON A | BUTTON B | BUTTON C |
|---|---|---|---|
| L-COMPONENT | 1.0 | 0.5 | 0.0 |
| R-COMPONENT | 0.0 | 0.5 | 1.0 |

RECORDING MEDIUM, REPRODUCTION APPARATUS, RECORDING METHOD, PROGRAM, AND REPRODUCTION METHOD

TECHNICAL FIELD

The present invention relates to a recording medium such as a BD-ROM for distribution of movies, and also to a reproduction apparatus for such a recording medium. More particularly, the present invention relates to an improvement in interactive control techniques.

BACKGROUND ART

It has long been desired to realize such interactive control that buttons appear on a display screen as a video stream is reproduced and that the reproduction proceeds in accordance with user operations made to the buttons. A DVD is a breakthrough recording medium realizing such reproduction control. The synchronous presentation of buttons with a video stream is established through the use of time stamps set to cause the buttons to appear at specific points on the reproduction time axis of the video stream.

In order to realize the interactive control, however, it is not sufficient to record onto a recording medium graphics data used for rendering the buttons. A reproduction apparatus needs to be controlled so as to change the state of each button displayed on a screen, according to a user operation or to the proceeding of video stream reproduction. To realize the interactive control, a stream into which audio and video streams are multiplexed (Video Objects) is recorded on a DVD, and a NAVI pack containing state control information is provided at the beginning of each VOBU. The VOBU includes one GOP of the video stream, and also includes audio data and graphics data, which is supplemental to the video stream, both to be read simultaneously with the GOP from the DVD. The state control information is used to change, according to a user operation, the state of each button displayed on the screen. The NAVI pack contains information defining a transfer rate and a buffer size that each stream requires in handling the GOP. Since the DVD stores the state control information in NAVI packs, the button states can be changed with the time accuracy of GOPs. FIG. 1 illustrates the interactive control described above. In the figure, the lowest level shows data allocation on the DVD. It is shown that state control information is contained in a NAVI pack. The state control information remains valid during a time period of the GOP to which the NAVI pack belongs. Each graphics object is contained in a PES packet, and displayed at the same timing with a picture to be synchronized with the graphics object. This prior art technique is disclosed for example in JP patent No. 2813245.

It should be noted here that in DVD authoring, the structures of GOPs and VOBUs are not determined until elementary streams of video, audio, and graphics data are encoded and ready to be multiplexed into one VOB. The multiplexing is a final stage of authoring. That is, the state control information cannot be incorporated into a VOB before this final stage, and thus testing of how the buttons change on a display screen can not be carried out any earlier. Consequently, it is often the case that bugs are found right before the shipment and the developers are forced to make corrections in a rush. In addition, without enough time for the testing, it is risky to incorporate buttons of complex animation into a movie. For the reasons stated above, it is common in current authoring to incorporate relatively simple buttons, such as one which changes in color in response to a user operation.

DISCLOSURE OF THE INVENTION

The present invention aims to provide a recording medium which allows the button state changes to be tested at an early stage of authoring.

It has been an effective scheme to store state control information in a NAVI pack of each VOBU when considering a DVD's data read rate. This is because the state control information is read from the DVD simply by reading the NAVI pack, so that the bandwidth required for reading is low.

However, the scheme is not as effective when considering a rate at which a BD-ROM is read. The BD-ROM's read rate is much higher than that of DVD's, so that it is no longer important to restrict the bandwidth.

In view of the advances in recording mediums and to achieve the above aim, a recording medium according to the present invention has recorded thereon a digital stream into which a video stream and a graphics stream are multiplexed. The graphics stream includes graphics data and state control information integrated therein. The graphics data is used to compose an interactive display. The state control information is used to cause the interactive display to change to a different state in response to a reproduction proceeding of the video stream and a user operation. According to the recording medium of the present invention, the information for causing the button state change is integrated with the graphics data into the graphics stream. Thus, as soon as the graphics stream is generated, the validation test can be carried out to check how the button state changes in accordance with the reproduction proceeding. It is no longer necessary to wait for the completion of video stream encoding or of stream multiplexing. Since the verification test of button state changes can be carried out at an early stage of the authoring (prior to the stream multiplexing), the undesirable possibility is reduced that an error is found in the recording medium right before the shipment and the developers are forced to rush. Also, since the graphics stream can be subjected to the verification test independently of the other streams, there is provided a better environment for incorporating buttons of complex animation into a movie.

Here, the state control information in each of the plurality of display sets may include an update flag. When set to ON, the update flag indicates that the display set is identical to an immediately preceding display set with respect to the state control information and the graphics data, except for a button command. When set to OFF, the update flag indicates that the display set is identical to an immediately preceding display set with respect to the state control information and the graphics data. The button command may be for execution by a reproduction apparatus upon activation of an associated button on the interactive display.

With the above state structure, such a title can be produced that the reproduction branches to one out of a plurality of reproduction paths in accordance with button commands. For example, a title is a quiz game and two display sets present a question for a user to answer. The title may be constructed to branch to a more and more disadvantageous reproduction path for the user as the user response delays.

Here, each of the n buttons may have a number assigned thereto. Each of the n pieces of button information may include a number assigned to an associated button and a flag showing whether the button is numerically selectable with the number. With this structure, discrete numbers can be assigned to the buttons, which is convenient for producing such a title as a list of baseball players.

To be more specific, such button commands are prepared that the reproduction branches to scenes showing play of the baseball players. In addition, the player numbers are assigned to the button commands. With this arrangement, the reproduction path to the scenes of a specific baseball player is taken at a numeric input of the player number.

BRIEF DESCRIPTION OF DRAWINGS

FIG. 1 is a view illustrating interactive control on a DVD;

FIG. 3 is a view showing a structure of a BD-ROM;

FIG. 4 is a view schematically shows a structure of an AV Clip;

FIG. 8A is a view showing a structure of a graphical stream;

FIG. 8B is a view showing internal structures of an ICS and an ODS;

FIG. 9 is a view showing a logical structure defined by various types of functional segments;

FIG. 13 is a view showing a composite screen at the display timing of an arbitrary picture pt1;

BEST MODE FOR CARRYING OUT THE INVENTION

First Embodiment

The following is a description of a recording medium according to a first embodiment of the present invention.

Figure 2A:
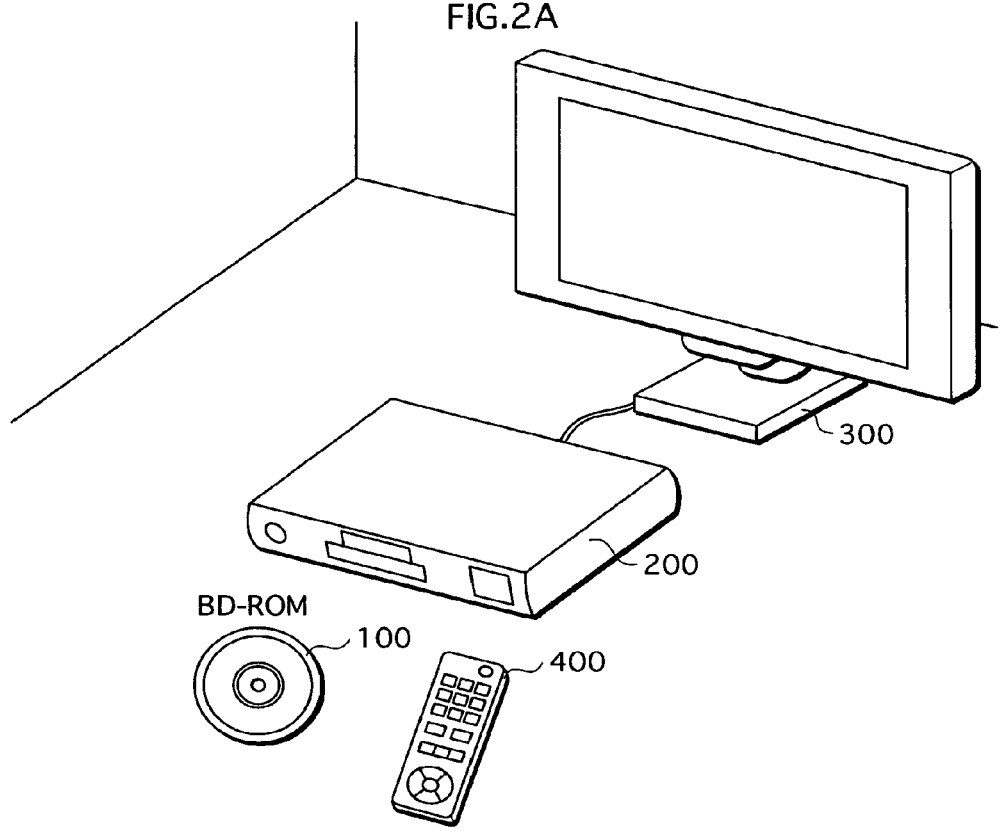
FIG. 2A is a view showing a usage pattern of a recording medium according to the present invention.
Figure 2B:
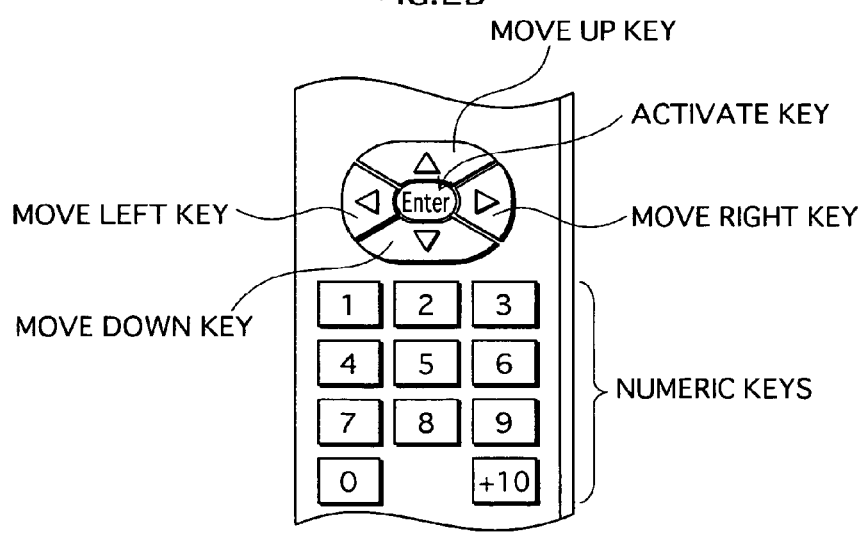
FIG. 2B is a view showing keys of a remote controller 400 for receiving user operations to an interactive display.

First, a description is given to usage of the recording medium, which is one form of practicing the present invention. FIG. 2A shows a usage pattern of the recording medium according to the present invention. In FIG. 2, a BD-ROM 100 is a recording medium according to the present invention. The BD-ROM 100 is used for providing movies to a home theater system composed of a reproduction apparatus 200, a television 300, and a remote controller 400. The remote controller 400 receives user operations instructing to change the state of interactive display, and is closely related to the recording medium according to the present invention. FIG. 2B shows keys of the remote controller 400. As shown in the figure, the remote controller 400 has a Move Up key, a Move Down key, a Move Right key, and a Move Left key. Each button displayed on the interactive display has three states: the normal state; the selected state; and the activated state. The Move Up, Move Down, Move Right, and Move Left keys are used to receive user operations for causing the button state to change in the order of the normal state→the selected state→the activated state, for example. When a button has the normal state, the button is simply displayed. When a button has the selected stated, the button is currently focused as a result of a user operation but not yet activated. When a button has the activated state, the button has been activated. When a specific button has the selected state on an interactive display, the Move Up key is used to put a button displayed above the currently selected button to the selected state. The Move Down key is used to put a button displayed below the currently selected button to the selected state. The Move Right key is used to put a button displayed right to the currently selected button to the selected state. The Move Left key is used to out a button displayed left to the currently selected button to the selected state.

An Activate key is used to put a button having the selected state to the activated state (to activate the currently selected button). Numeral keys "0" to "9" are used for numeric selection so as to put a button having assigned an inputted value to the selected state. A "+10" key is used to add the value of 10 to a value having been entered. Note that the "0" key and the "+10" key are both used to enter a two-digit value. Thus, one of the "0" and "+10" keys may be sufficient instead of both.

This concludes the description of the usage of recording medium according to the present invention.

Next, a description is given to production of the recording medium, which is another form of practicing the present invention. The recording medium can be embodied by making improvements to an application layer of a BD-ROM. FIG. 3 shows an example structure of the BD-ROM 100.

In the figure, the BD-ROM 100 is shown on the fourth level, and a BD-ROM's track is shown on the third level. In the figure, the track is stretched out into a straight line, although the track in practice spirals outwards from the center of the BD-ROM. The track is composed of a lead-in area, a volume area, and a lead-out area. The volume area has a layer model of a physical layer, a file system layer, and an application layer. The first level shows, in a directory structure, a format of the application layer (application format) of the BD-ROM. As illustrated, the BD-ROM has a BDMV directory below a ROOT directory. The BDMV directory contains files, such as XXX.M2TS, XXX.CLPI, and YYY.MPLS. The BD-ROM of the present invention can be produced by creating an application format as shown in the figure.

Now, a description is given to each of the files used in the application format. First, an AV Clip (XXX.M2TS file) is described.

The AV Clip (XXX.N2TS) is a digital stream compliant with an MPEG-TS (transport stream) format, and obtained by multiplexing a video stream, one or more audio streams, a presentation graphics stream, and an interactive graphics stream. The video stream represents video of a movie. The audio stream represents audio of the movie. The presentation graphics stream represents subtitles of the movie. The interactive graphics stream represents dynamic control procedures for reproduction of menus. FIG. 4 schematically shows a structure of the AV Clip.

The AV Clip shown in the figure on the middle level is obtained in the following manner. The video stream shown on the upper first level is composed of a plurality of video frames (picture pj1, pj2, pj3, . . . ), and the audio stream also shown on the upper first level is composed of a plurality of audio frames. The video and audio streams are separately converted to PES packets shown on the upper second level. The PES packets are further converted to TS packets shown on the upper third level. Similarly, the presentation graphics stream and the interactive graphics stream shown on the lower first level are separately converted to PES packets shown on the lower second level, and further converted to TS packets shown on the lower third level. These TS packets shown on the upper and lower third levels are multiplexed to form the AV Clip.

The AV Clip generated as above is divided into a plurality of extents in the same way as computer files, and recorded onto the BD-ROM. The AV Clip is composed of one or more Access Units, and the reproduction of AV Clip may skip to a point corresponding to ant Access Unit. An Access Unit is composed of one GOP (Group Of Pictures) and an audio frame to be read simultaneously with the GOP, and is a minimum unit for decoding. GOPs include three types of pictures: Bidirectionally Predictive picture (B picture) that is coded using correlation with both past and future pictures; Predictive picture (P picture) that is coded using correlation with past pictures; and Intra picture (I picture) that is coded using its own spatial frequency characteristic without referencing the inter-frame correlation.

Figure 5:
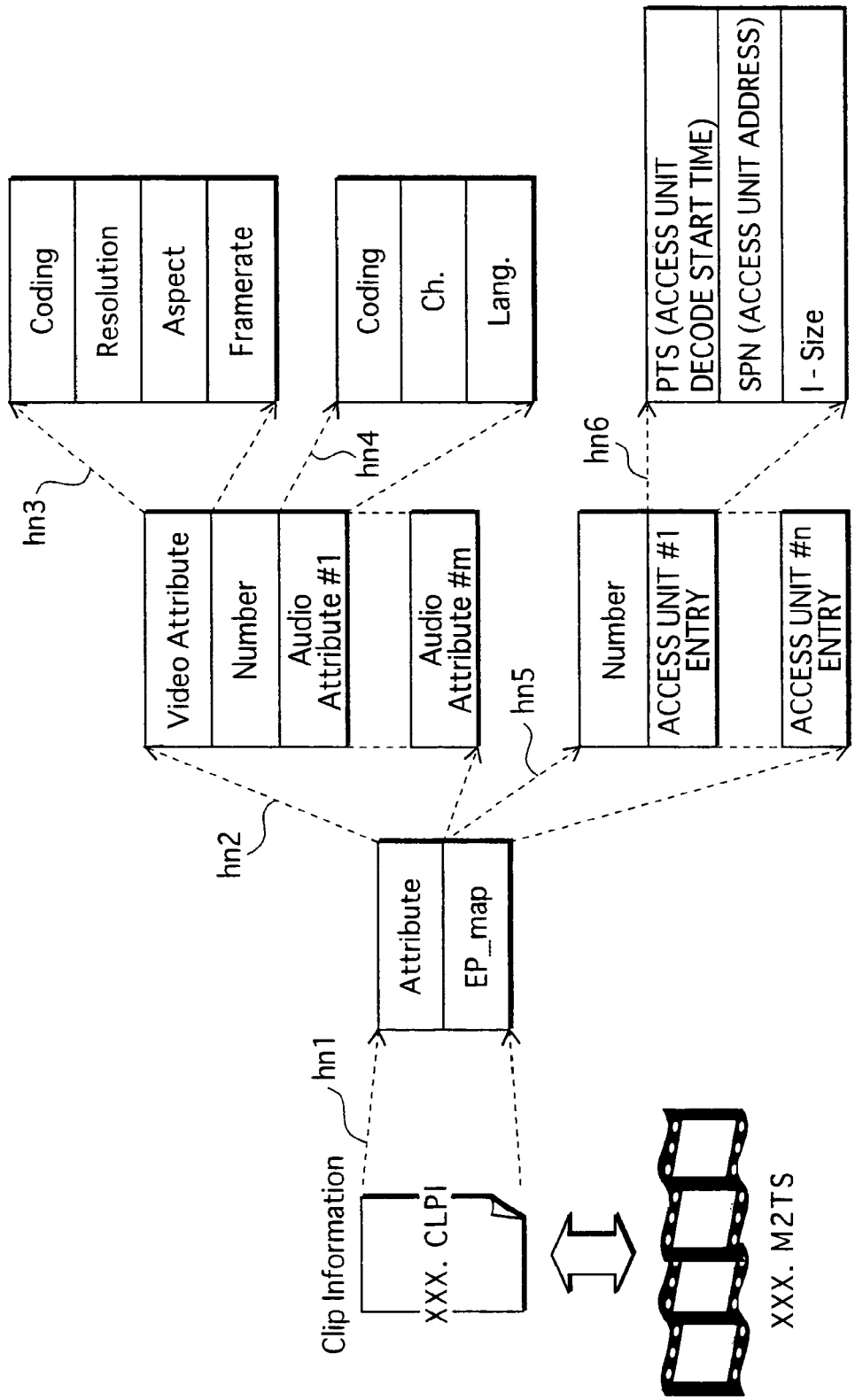
FIG. 5 is a view showing an internal structure of Clip information.

Clip information (XXX.CLPI) is management information of each AV Clip. FIG. 5 shows an internal structure of Clip information. Since an AV Clip is obtained by multiplexing a video stream and an audio stream and accessible at random in the units called Access Units, the Clip information includes information, such as the attributes of video and audio streams and the points within the AV Clip to which a skip operation may be performed. In the figure, the doted lines indicate that the structure of Clip information is excerpted to be shown in detail. As indicated by the doted lines hn1, the Clip information (XXX.CLPI) is composed of "attribute information" of the video and audio streams, and "EP_map" that is a reference table for searching Access Units.

As doted lines hn2 indicate, the attribute information is composed of an attribute of the video stream (Video Attribute), the number of attributes (Number), and attributes (Audio Attribute #1-#m) of all the audio streams multiplexed in the AV Clip. As doted lines hn3 indicate, the video attribute is composed of information showing the coding method in which the video stream is coded (Coding), the resolution of pictures constituting the video stream (Resolution), the aspect ratio (Aspect), and the frame rate (Framerate).

As doted lines hn4 indicate, each of the attributes of audio streams (Audio Attribute #1-#m) is composed of information showing the coding method in which a corresponding audio stream is coded (Coding), the channel number of the audio stream (Ch.), the language of the audio stream (Lang.), and the sampling frequency.

The EP_map is a reference table for indirectly referencing by time the addresses of accessible points in skip operations.

As doted lines hn5 indicate, the EP_map is composed of a plurality of entries (Access Unit #1 entry, Access Unit #2 entry, Access Unit #3 entry and the number of entries (Number). As doted lines hn6 indicate, each entry shows the reproduction start time and the address of a corresponding Access Unit (Note that the size of a first I picture in the Access Unit (I-size) may be additionally shown). The reproduction start time is shown by a time stamp for a picture located at the beginning of the Access Unit (Presentation Time Stamp). The address is shown by a serial number of a corresponding TS packet (SPN: Source Packet Number). Due to the variable-length coding, the Access Units each containing a GOP are not uniform both in size and reproduction time period. Yet, with reference to the entries corresponding to the Access Units, an Access Unit located at a point corresponding to any given reproduction time can be searched, so that the reproduction can be started from the first picture in the searched Access Unit. Note that "XXX" in the file name "XXX.CLPI" is the same as the name of AV Clip to which the Clip information corresponds. In the figure, the file name of the AV Clip is "XXX", which means that the Clip information (XXX.CLPI) corresponds to the AV Clip (XXX M2TS). This concludes the description of Clip information. Next, PlayList information will be described.

Figure 6:
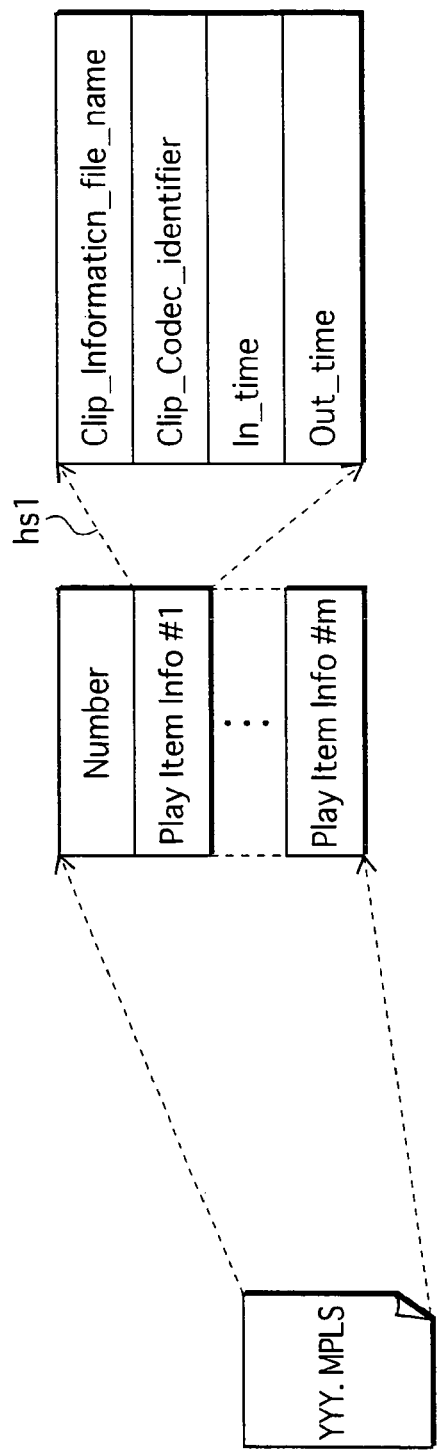
FIG. 6 is a view showing an internal structure of PlayList information.

YYY.MPLS (PlayList Information) is a table serving as a PlayList defining reproduction paths, and is composed of a plurality of pieces of PlayItem information (PlayItem Information #1, #2, #3, . . . #n) and the number of PlayItem information pieces (Number). FIG. 6 shows an internal structure of the PlayList information. PlayList information shows one or more logical segments for reproduction each defined by PlayItem information. As the doted lines hs1 indicate, the structure of PlayItem information is excerpted to be shown in detail. As shown in the figure, the PlayItem information is composed of: "clip_information_file_name" showing the file name of a reproduction segment within the AV Clip to which the in_time and out_time of the reproduction segment belong; "clip_codec_identifier" showing the coding method by which the AV Clip is coded; "in_time" showing the time corresponding to the start point of the reproduction segment; and "out_time" showing the time corresponding to the end point of the reproduction segment.

Figure 7:
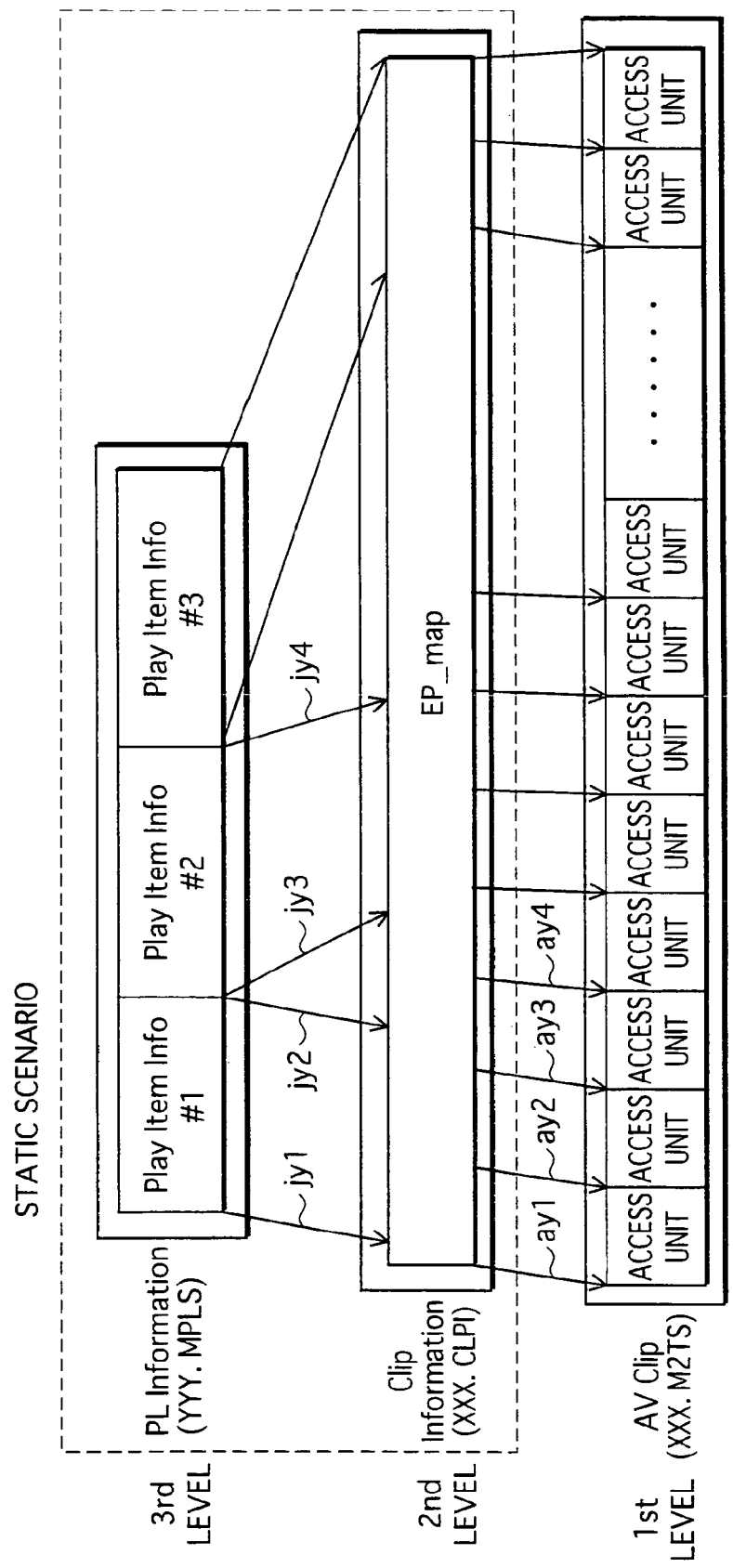
FIG. 7 is a view schematically illustrating indirect references by the PlayList information.

One feature of the PlayItem information lies in its notational conventions. That is, a reproduction segment is defined by the indirect reference by time, using the EP_map as a reference table. FIG. 7 is a view schematically illustrating the indirect reference by time. In the figure, the AV Clip is composed of a plurality of Access Units. The EP_map in the Clip information specifies the sector address of each Access Unit as indicated by arrows ay1, ay2, ay3, and ay4. Each of the arrows jy1, jy2, jy3, and jy4 is a schematic representation of an indirect reference to an Access Unit. In short, each piece of PlayItem Information has a reference (arrows jy1, jy2, jy3, and jy4) specifying by time via the EP_map, the address of a corresponding Access Unit contained in the AV Clip.

A reproduction segment on the BD-ROM specified by a set of PlayItem information—Clip information—AV Clip is called "PlayItem". A logical unit of reproduction on the BD-ROM specified by a set of PL information—Clip information—AV Clip is called "PlayList (hereinafter, PL)". A movie recorded on the BD-ROM is segmented into the logical units of PLs. Since the movie is segmented into the logical units, it is possible to define such a PL specifying scenes in all of which a specific character makes an appearance. In this way, separately from the main movie, another movie is readily made in which the character appears at all times.

Since movies recorded on BD-ROM have the logical structure as described above, an AV Clip of a specific scene in a movie may be readily "recycled" or used in another movie.

Next, a description is given to an interactive graphical stream. FIG. 8A is a view showing a structure of the graphical stream. On the first level, a string of TS packets constituting an AV Clip is shown. On the second level, a string of PES packets constituting a graphics stream is shown. The PES packets shown on the second level are formed by concatenating payloads of TS packets having a predetermined PID within the TS packet string shown on the first level. Note that no description is given to a presentation graphics stream because it is not the gist of the present invention.

On the third level, a structure of the graphics stream is shown. The graphics stream is composed of functional segments that include an ICS (Interactive Composition Segment), a PDS (Palette Definition Segment), an ODS (Object Definition Segment), and an END (End of Display Set Segment). Of these functional segments, the ICS is a screen composition segment, whereas the PDS, ODS, and END are definition segments. Each functional segment is either in one-to-one or one-to-multiple correspondence with PES packets. That is, one functional segment is recorded on the BD-ROM 100 after being converted to a single PES packet, or fragmented and converted to a plurality of PES packets.

FIG. 8B is a view showing the PES packets obtained by converting functional segment (s). As shown in FIG. 8B, each PES packet is composed of a packet header and a payload. The payload is an entity of a functional segment, and the packet header contains a DTS and PTS associated with that functional segment. Hereinafter, the DTS and PDS contained in the header of a PES packet containing a functional segment are referred to as the DTS and PTS of that functional segment.

These various types of functional segments define a logical structure as shown in FIG. 9. In the figure, the functional segments are shown on the third level, display sets are shown on the second level, and Epochs are shown on the first level.

Each display set (hereinafter "DS") shown on the second level is a group of functional segments which together constitute one complete screen of graphics. Dashed lines hk2 indicate a DS to which the functional segments on the third level belong. As can be seen from the figure, the series of functional segments, ICS-PDS-ODS-END constitutes one DS. Upon reading these functional segments constituting the DS from the BD-ROM, the reproduction apparatus can produce one screen of graphics.

An Epoch shown on the first level refers to a time period during which the continuity in memory management must be maintained on the reproduction time axis of AV Clip, or to a set of data allocated to the time period. Memory mentioned here includes a graphics plane for storing one screen of graphics and an object buffer for storing uncompressed graphics data. The continuous memory management means that throughout the Epoch neither the graphics plane nor the object buffer is flushed, and erasing and rendering of graphics are performed only within a predetermined rectangular area of the graphics plane (to flush means to clear the entire graphics plane and the entire object buffer). The size and position of this rectangular area are fixed throughout the Epoch. So long as erasing and rendering of graphics are performed within this fixed rectangular area of the graphics plane, seamless reproduction is ensured. In other words, the Epoch is a time unit, on the reproduction time axis of the AV Clip, during which seamless reproduction is ensured. To change the graphics rendering area in the graphics plane, it is necessary to define a point of change on the reproduction time axis and set a new Epoch from the point onward. In this case, a boundary between the two Epochs is not seamless.

The seamless reproduction used herein means that the erasing/rendering of graphics is completed with a predetermined number of video frames. In the case of interactive graphics stream, the number of video frames is four to five. The number of video frames is determined based on the ratio of the fixed region to the entire graphics plane and the transfer rate between the object buffer and the graphics plane.

In the figure, dashed lines hk1 and hk2 indicate an Epoch to which the functional segments shown on the second level belong. It is shown that a series of DSs, which are an Epoch Start DS, an Acquisition Point DS, and a Normal Case DS, constitutes one Epoch on shown on the first level. Here, "Epoch Start", "Acquisition Point", and "Normal Case" are types of DSs. Although the Acquisition Point DS precedes the Normal Case DS in FIG. 9, they may be arranged in the reverse order.

The "Epoch Start" DS provides a display effect "new display", and indicates a start of a new Epoch. The Epoch Start DS thus contains all functional segments needed for the next screen composition. The Epoch Start DS is provided at a point in the AV Clip to which a skip operation may be performed, such as a start of a chapter in a movie.

The Acquisition Point DS provides a display effect "display refresh", and relates to the preceding Epoch Start DS. There are two types of Acquisition Point DS: "Duplicate" and "Inherit". The Duplicate type DS is a completely identical DS to the preceding Epoch Start DS. The Inherit DS inherits the functional segments of the preceding Epoch Start DS but has different button commands. Although not being a start of an Epoch, the Acquisition Point DS contains all functional segments needed for the next screen composition. Thus, when the reproduction is started from an Acquisition Point DS, the graphics are reliably presented. That is to say, the Acquisition Point DS enables a screen composition from a midpoint in the Epoch.

The Acquisition Point DS is provided in a point to which a skip operation may be made. Examples of such points include one that may be designated by a time search. The time search is an operation of locating a reproduction point corresponding to a time inputted by a user in minutes/seconds. Since the user input is made in a relatively large unit such as ten minutes and ten seconds, searchable reproduction points are located at intervals of 10 minutes or 10 seconds. By providing the Acquisition Point DS in such a point searchable by a time search, the graphics stream can be smoothly presented when a time search is conducted.

The Normal Case DS provides a display effect "display update", and contains only a difference from the previous screen composition. For example, if a button defined by a DS (v) has the same graphical representation as a button defined by an immediately preceding DS (u), but has a different state control. In this case, the DS (v) contains ICS or ICS and PDS only, and serves as a Normal Case DS. With this arrangement, the Normal Case DS is not required to contain overlapping ODSs, which leads to the reduction in the amount of data stored on the BD-ROM. Since the Normal Case DS only contains the difference, graphics cannot be displayed with the Normal Case DS alone.

The interactive display defined by the above-described DSs presents GUI elements. The interactivity of DSs refers to the capability of changing the state of each GUI element in accordance with a user operation. In this embodiment, GUI elements interacted by user operations are referred to as buttons. Each button has the normal state, the selected state, and the activated state. Each button state is rendered using a plurality of pieces of uncompressed graphics data, which is referred to as a "graphics object". One state of one button is associated with a plurality of graphics objects for presentation in animation.

Now, a description is given to Definition Segments (ODS: Object Definition Segment and PDS: Palette Definition Segment).

The ODS is information defining a graphics object, which will be described later. Since AV Clips recorded on a BD-ROM feature its high image quality comparable to high-definition television, the graphics objects have a high resolution of 1920×1080 pixels. The color of each pixel is defined by 8-bit long index values showing a red color difference component (Cr value), a blue color difference component (Cb value), a luminance component (Y value), and a transparency (T value). This structure allows each pixel to be set to one of arbitrary 256 colors out of 16,777,216 colors.

Figure 10A:
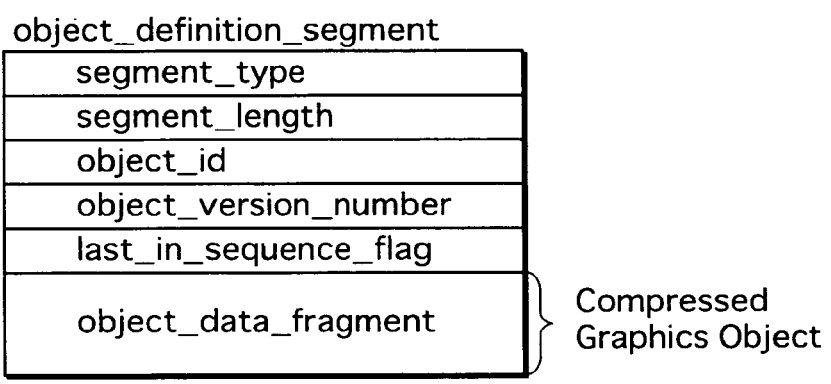
FIG. 10A is a view showing a data structure of an ODS defining a graphics object.

The ODS has a data structure shown in FIG. 10A. As shown in the figure, the ODS is composed of the following fields: "segment_type" showing that the type of this segment is an ODS; "segment_length" showing the data length of the ODS; "object_id" uniquely identifying a graphics object within the Epoch, associated with the ODS; "object_version_number" showing the version of the ODS within the Epoch; "last_in_sequence_flag"; and "object_data_fragment" carrying a consecutive sequence of bytes corresponding to part or all of the graphics object.

The object_id field uniquely identifies a graphics object within the Epoch, associated with the ODS. In the case where a plurality of graphics objects defined by a plurality of ODSs constitutes a sequence of animation, these ODSs are assigned serial object_id values.

Referring now to the last_in_sequence_flag field and the object_data_fragment field in more detail. Due to the constraint on a payload of PES packet, there may be a case where a piece of uncompressed graphics data constituting one button can not be carried by a single ODS. If this is the case, the graphics data is fragmented and each fragment is defined by an ODS in the object_data_fragment field. Here, every fragment except the last fragment is of the same size. That is, the last fragment is less than or equal to the size of the preceding fragments. The ODSs carrying these fragments of the graphics object appear in the DS in sequence. The last_in_sequence_flag field indicates an end of the graphics object. Although the above ODS data structure is based on a method of storing fragments in consecutive PES packets without a gap, the fragments may instead be stored in PES packets so as to leave some gaps between the PES packets. This concludes the description of ODS.

Figure 10B:
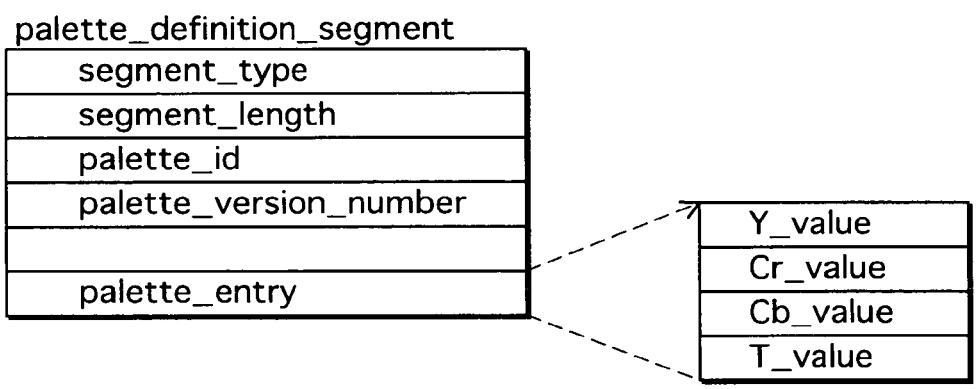
FIG. 10B is a view showing a data structure of a PDS.

Next, the PDS is explained. The PDS is information defining a palette for color conversion. FIG. 10B shows a data structure of the PDS. As shown in the figure, each PDS is composed of the following fields: "segment_type" showing, when set to the value "0x15", that the type of this segment is a PDS; "segment_length" showing the data length of the PDS; "pallet_id" uniquely identifying the pallet contained in the PDS; "palette_version_number" showing the version of the PDS within the Epoch; and "pallet_entry" showing the Color Difference Red (Cr_value), the Color Difference Blue (Cb_value), (Y_value), and Transparency (T_value).

Figure 11:
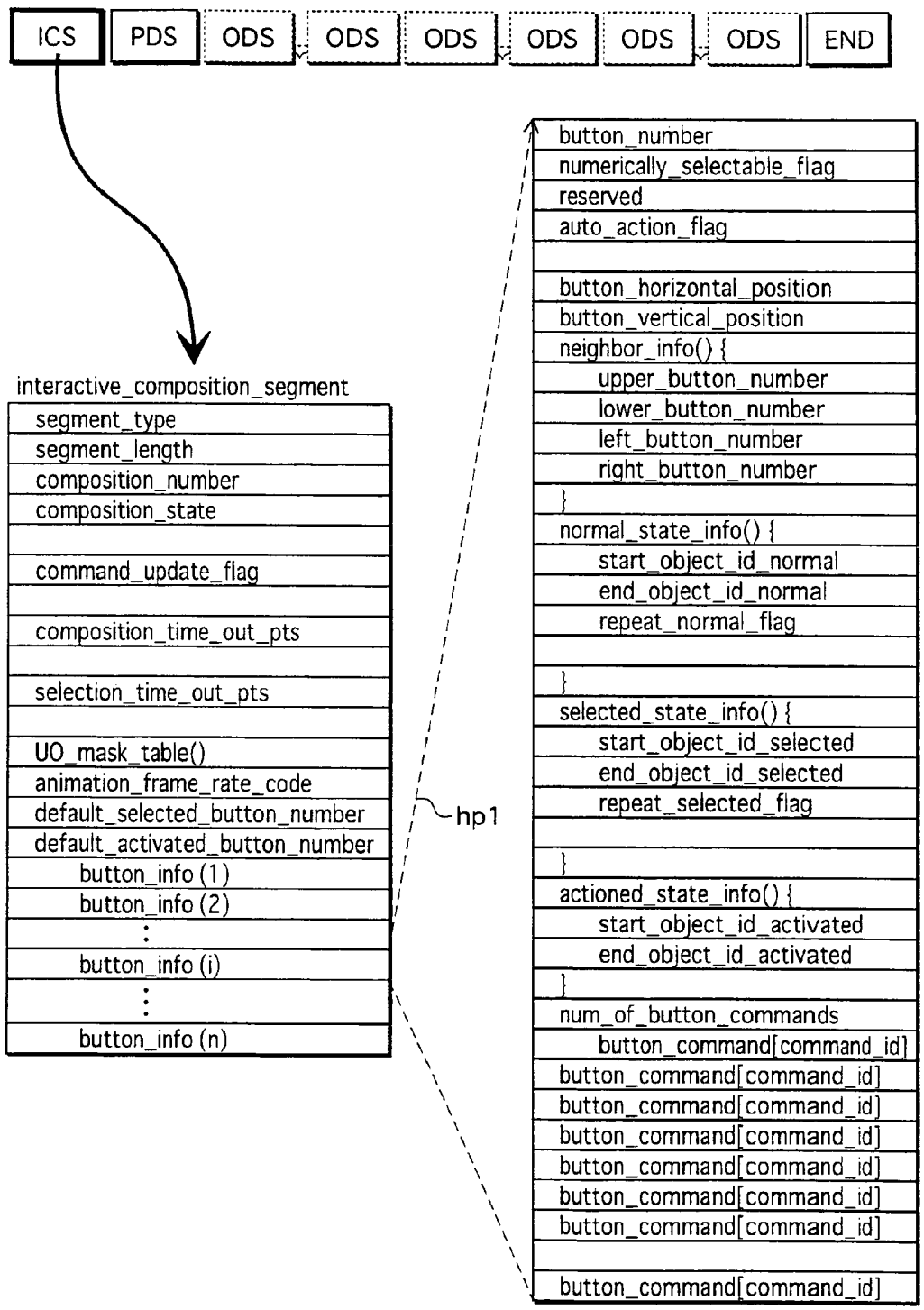
FIG. 11 is a view showing a data structure of an Interactive Composition Segment.

Next, an ICS is explained. The ICS is a functional segment defining the composition of an interactive display. The ICS has a data structure shown in FIG. 11. As shown in the figure, the ICS is composed of the following fields, "segment_type", "segment_length", "composition_number", "composition_state", "command_update_flag", "composition_time_out_pts", "selection_time_out_pts", "UO_mask_table", "animation_frame_rate_code", "default_selected_button_number", "default_activated_button_number", and a group of "button info (1), (2), (3)".

The composition_number field is set to a value out of 0-15 showing that the DS to which the ICS belongs is updated.

The composition_state field shows that the DS beginning with the ICS is the Normal case DS, the Acquisition Point DS, or the Epoch Start DS.

The command_update_flag field indicates that the button commands in the ICS are changed from those defined in the previous ICS. For example, the DS to which an ICS belongs is an Acquisition Point DS, the ICS is normally equal to those defined in the immediately previous ICS. Yet, by setting the command_update_flag to ON, the ICS can define different button commands from those defined in the immediately previous ICS. The command_update_flag is set to ON when different button commands are associated with the same graphics objects.

The composition_time_out_pts field describes the end time of the interactive display. At the end time, the interactive composition is no longer valid and thus no longer displayed. The composition_time_out_pts is preferably described with the frame accuracy of the video stream on the reproduction time axis.

The selection_time_out_pts field describes the termination time of the valid button selection period. At the time of the selection_time_out_pts, the button specified by the default_activated_button_number is activated. The value of the selection_time_out_pts is less than or equal to the value of the composition_time_out_pts. The selection_time_out_pts is described with the frame accuracy of the video stream on the reproduction time axis.

The UO_mask_table determines permissions/prohibitions of User Operations for the duration of DS to which the ICS belongs. When this field is set to "Prohibited", a corresponding User Operation to the reproduction apparatus is invalid.

The animation_frame_rate_code field specifies the frame rate to be applied to animated buttons. The animation frame rate is given by the video frame rate divided by the value of the animation_frame_rate_code field. When this field is set to "00", only the graphics object designated by the start_object_id_xxx is displayed for every button in non-animated state.

The default_selected_button_number field indicates the button number that is selected as default when the presentation of the interactive display begins. When this field is set to the value "0", the button specified by the button number stored in a register of the reproduction apparatus is automatically activated. On the other hand, when this field is set to a value other than "0", the value indicates a valid button number.

The default_activated_button_number field indicates the button which is automatically activated when no button is activated by the user before the time defined by the selection_time_out_pts field. When this field is set to "FF", the currently select button is activated at the time defined by the selection_time_out_pts field. When this field is set to "00", no button is automatically activated. If this field is set to a value other than "FF" and "00", the value is interpreted as a valid button number.

The button_info field provides information defining buttons to be presented on the interactive display. In the figure, the doted lines hp1 indicate that a data structure of button_info (i) is excerpted to be shown in detail. The button_info (i) carries information about the button (i) defined by the ICS. Hereinafter, a description is given to the information items constituting the button_info (i).

The button_number field indicates the value uniquely identifying the button (i) within the ICS.

The numerically_selectable_flag field indicates whether the button (i) can be numerically selected.

The auto_action_flag field indicates whether to automatically activate the button (i). When the auto_action_flag is set to ON (bit value of "1"), the button (i) is transferred not to the selected state but directly to the activated state. On the other hand, when the auto_action_flag is set to OFF (bit value of "0"), the button (i) is transferred not to the activated state but to the selected state when selected by a user.

The button_horizontal_position field and button_vertical_position field respectively specify the horizontal and vertical positions of the top left pixel of the button (i) in the interactive display.

The upper_button_number field specifies the button number of a button to receive the selected state at a push of the Move Up key while the button (i) is in the selected state. If this field is set to the same button number as that of the button (i), the user operation to the Move Up key is ignored.

Similarly, the lower_button_number field, the left_button_number field, the right_button_number field specify the button number of a button to receive the selected state at a push of the Move Down key, Move Left key, and Move Right key, respectively, while the button (i) is in the selected state. If these fields are set to the same button number as that of the button (i), the user operations to the respective keys are ignored.

The start_object_id_normal specifies the first one of object_ids assigned serially to a group of ODSs constituting the animation of button (i) in the normal state.

The end_object_id_normal field specifies the last one of the object_ids assigned serially to the group of ODSs constituting the animation of button (i) in the normal state. If the end_object_id_normal field specifies the same value as that of the start_object_id_normal, the static image of the graphics object identified by the value is presented as the button (i).

The repeat_normal_flag field specifies whether the animation of the button (i) in the normal state is to be continuously repeated.

The start_object_id_selected field specifies the first one of object_ids assigned serially to a group of ODSs constituting the animation of button (i) in the selected state. If the end_object_id_selected field specifies the same value as that of the start_object_id_selected, the static image of the graphics object identified by the value is presented as the button (i).

The end_object_id selected field specifies the last one of the object_ids assigned serially to the group of ODSs constituting the animation of button (i) in the selected state.

The repeat_selected_flag" field specifies whether the animation of the button (i) in the selected state is to be continuously repeated.

The start_object_id_activated field specifies the first one of object_ids assigned serially to a group of ODSs constituting the animation of button (i) in the activated state.

The end_object_id_activated field specifies the last one of the object_ids assigned serially to the group of ODSs constituting the animation of button (i) in the activated state.

Next, a description is given to button commands.

Each button_command is executed when the button (i) is activated.

The button commands may include one instructing the reproduction apparatus to reproduce a PL or PlayItem. Such a command instructing the reproduction apparatus to reproduce a PL and PlayItem is referred to as a LinkPL command.

When this command is executed, reproduction of the PlayList specified by the first argument is started from the point specified by the second argument.

Format: LinkPL (First Argument, Second Argument)

The first argument is the PL number specifying the PL to be reproduced. The second argument specifies, as a reproduction start point, a PlayItem, a Chapter, or a Mark within the PL.

The LinkPL function for specifying a PlayItem as a reproduction start point is "LinkPL at PlayItem ( )".

The LinkPL function for specifying a chapter as a reproduction start point is "LinkPL at Chapter ( )".

The LinkPL function for specifying a mark as a reproduction start point is "LinkPL at Mark ( )".

The button commands may also include a command instructing the reproduction apparatus to obtain or set the state of the apparatus. The state of reproduction apparatus is shown by 64 player status registers (whose values are referred to as PSRs) and 4,096 general purpose registers (whose values are referred to as GPRs). With the following commands (i)-(iv), specific values are set to the registers or the values of the registers are obtained.

(i) Get Value of Player Status Register Command

Format: Get Value of Player Status Register (Argument)

This function returns a value of the player status register specified with the argument.

(ii) Set Value to Player Status Register Command

Format: Set Value of Player Status Register (First Argument, Second Argument)

This function sets a value of the player status register specified with the first argument to the second argument.

(iii) Get Value of General Purpose Register Command

Format: Get Value of General Purpose Register (Argument)

This function retunes a value of the general purpose register specified with the argument.

(iv) Set Value to General Purpose Register Command

Format: Set Value to General Purpose Register (Argument)

This function seta a value of the general purpose register specified with the first argument to the second argument.

This concludes the description of the ICS structure.

Figure 12:
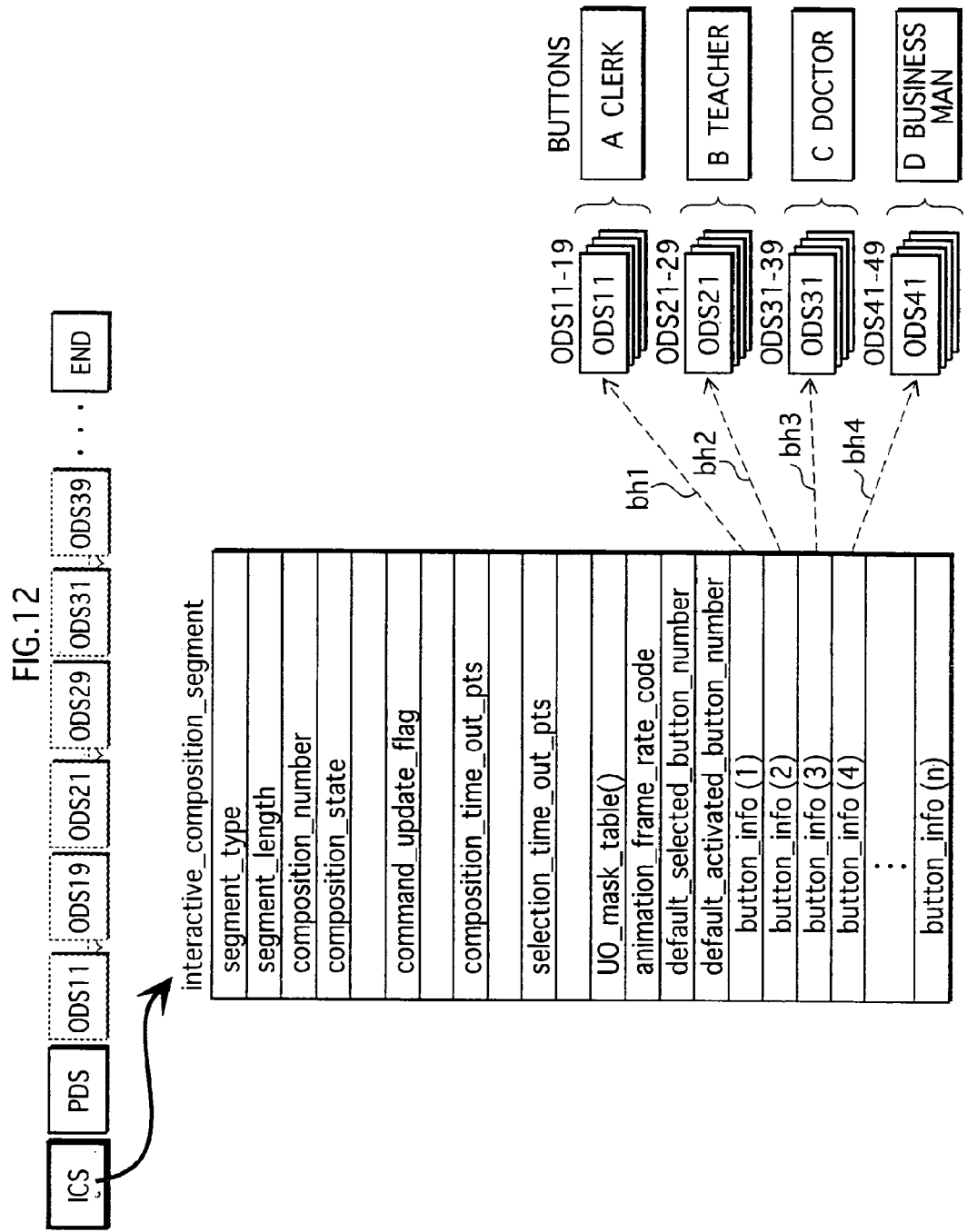
FIG. 12 is a view showing the relation between ODSs and ICS contained within a DS (n)

Next, a description is given to a specific example of interactive control defined by the ICS. The example relates to the ODSs and ICS shown in FIG. 12. FIG. 12 is a view showing the relation between the ODSs and ICS contained within a DS (n). The DS (n) includes the ODSs 11-19, 21-29, 31-39, 41-49. The ODSs 11-19 are for rendering a button A in each of the three states. The ODSs 21-29 are for rendering a button B in each of the three states. The ODSs 31-39 are for rendering a button C in each of the three states. The ODSs 41-49 are for rendering a button D in each of the three states (See the right brackets in the figure). The button_info (1), (2), (3), and (4) in the ICS provide the descriptions of state control of the buttons A-D (See arrows bh1, bh2, bh3, and bh4 in the figure).

Suppose that the control defined by the ICS is to be executed in synchronism with the display timing of a picture pt1 included in the video stream shown in FIG. 13. In this case, an interactive display tm1 composed of the buttons A-D is overlaid (gs1) with the picture pt1 to produce a composite screen gs2. In this way, the interactive display composed of multiple buttons is presented in synchronism with a specific video image. Thus, the ICS makes it possible to present buttons in a way more real to the users.

Figure 14:
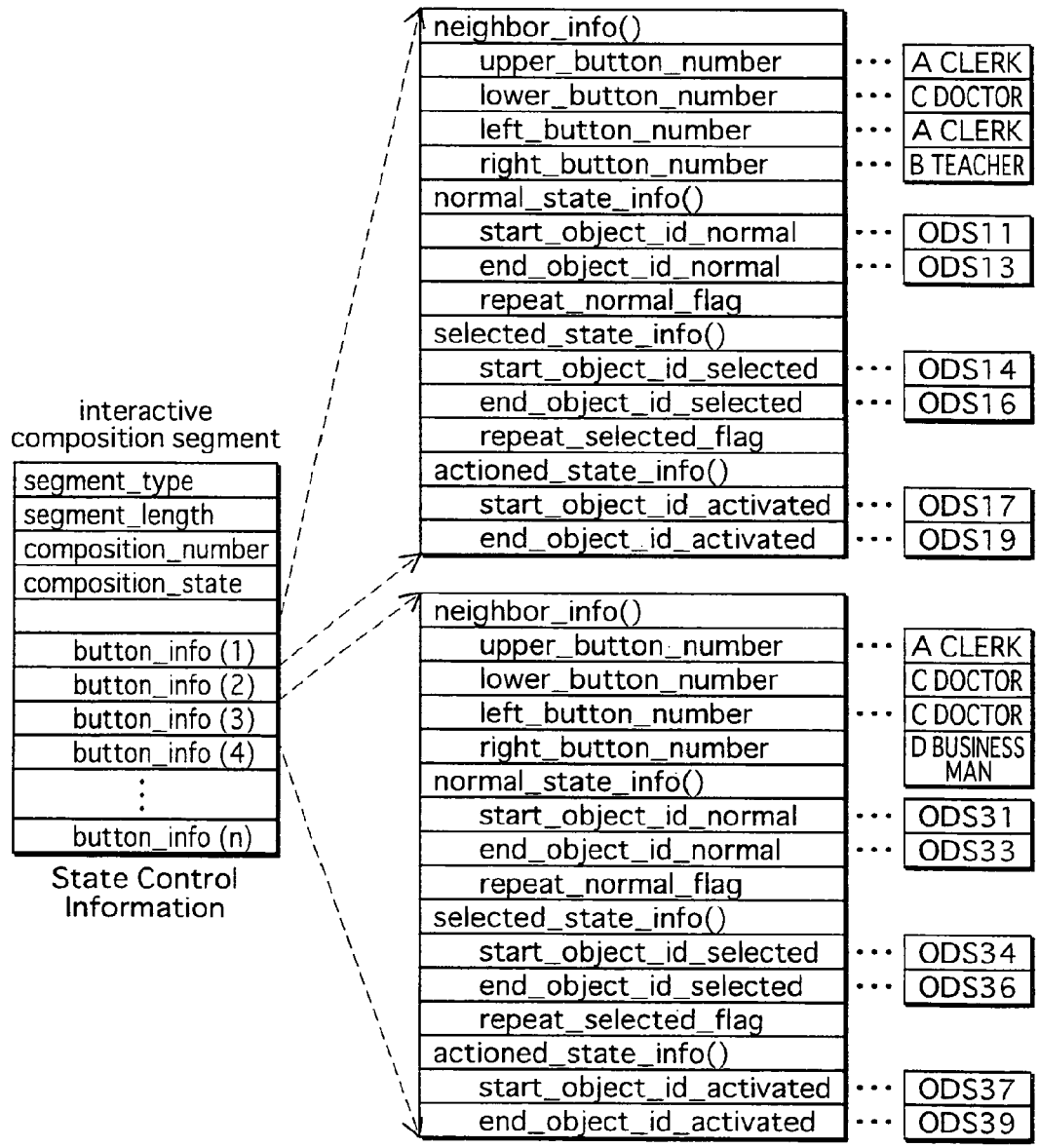
FIG. 14 is a view showing an example of button information setting within an ICS.
Figure 15:
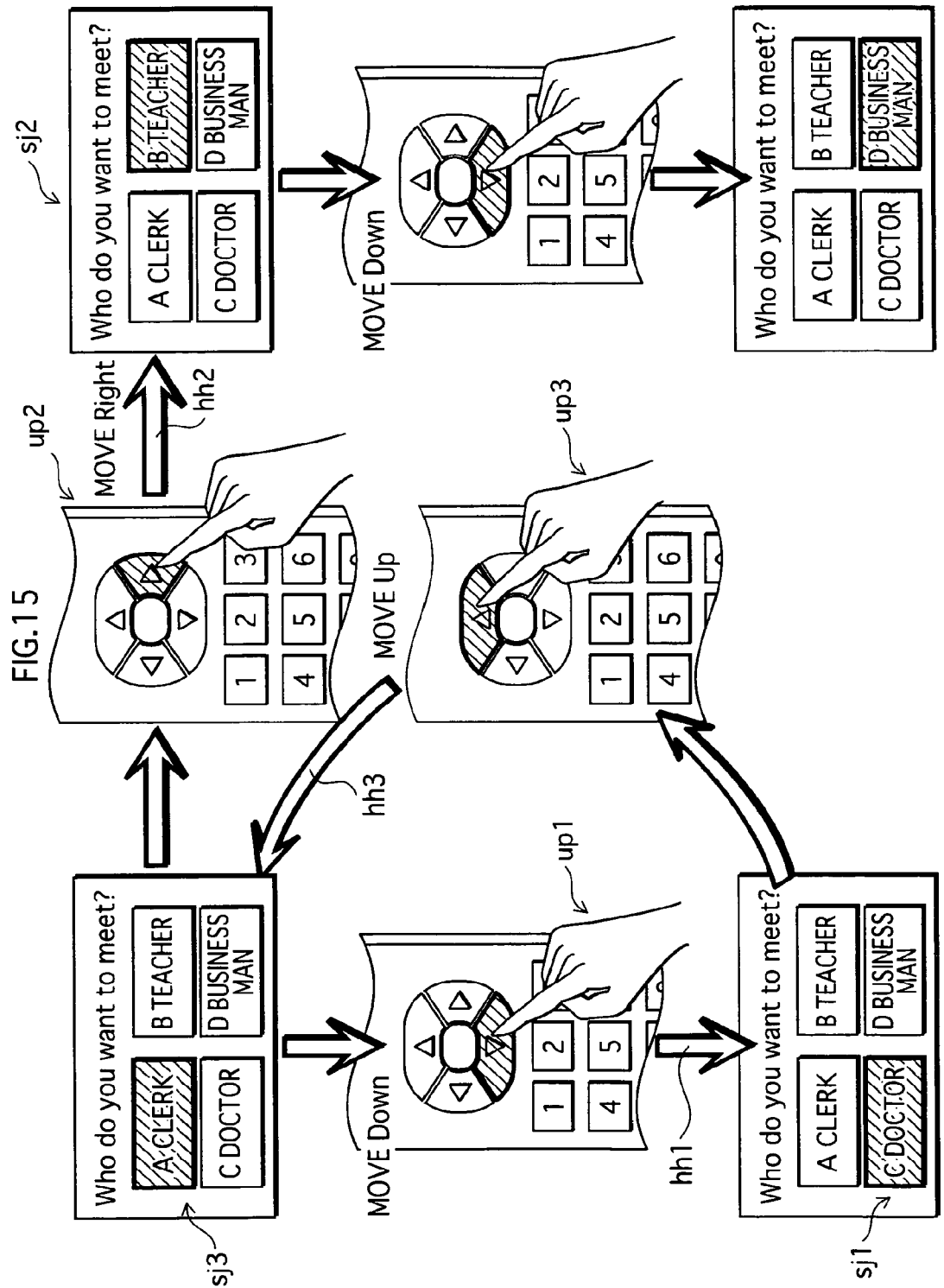
FIG. 15 is a view illustrating button state transitions of buttons A-D.

FIG. 14 shows an example of the description realizing the state transition of buttons A-D as illustrated in FIG. 15. In FIG. 15, the arrows hh1 and hh2 each visually represent the state transition defined by the neighbor_info ( ) within the button info (1). In the neighbor_info ( ), the lower_button_number field specifies the button C. Consequently, a user operation to the Move Down key (up1 in the figure) while the button A is in the selected state, the button C receives the selected state (sj1 in the figure). Similarly, the right_button_number field specifies the button B. Consequently, a user operation to the Move Right key (up2 in the figure) while the button A is in the selected state, the button B receives the selected state (sj2 in the figure).

The arrow hh3 in FIG. 15 visually represent the state trantision defined by the neighbor_info ( ) within the button info (3). In the neighbor_info ( ), the upper_button_number field specifies the button A. Consequently, a user operation to the Move Up key (up3 in the figure) while the button C is in the selected state, the button A is put back into the selected state.

Next, a description is given to graphical representations of the buttons A-D. The ODSs 11, 21, 31, and 41 each present images shown in FIG. 16. The ODSs 11-19 associated with the button A present images shown in FIG. 17. The start_object_id_normal and end_object_id normal fields specify the ODSs 11 and 13, respectively. Consequently, the button A in the normal state is presented in animation by the sequence of the ODSs 11-13. In addition, in the selected state info ( ) of the button_info (1), the start_object_id_selected and end_object_id_selected fields specify the ODSs 14 and 16, respectively. Consequently, the button A in the selected state is presented in animation by the sequence of ODSs 14-16. When a user puts the button A into the selected state, the images presented for the button A is changed from the ODS 11-13 to the ODSs 14-16. By setting the repeat_normal_flag and repeat_selected_flag to the value "1", the animation of the ODSs 11-13 and of the ODSs 14-16 are continuously repeated, as represented in the figure with "→A", "A→", "→B" and "B→.".

As described above, each of the buttons A-B is associated with of a sequence of ODSs which can be presented in animation. Thus, with the ICS describing the control as above, such button state control is realized that a character image serving as a button changes its facial expression in response to user operations.

Figure 18:
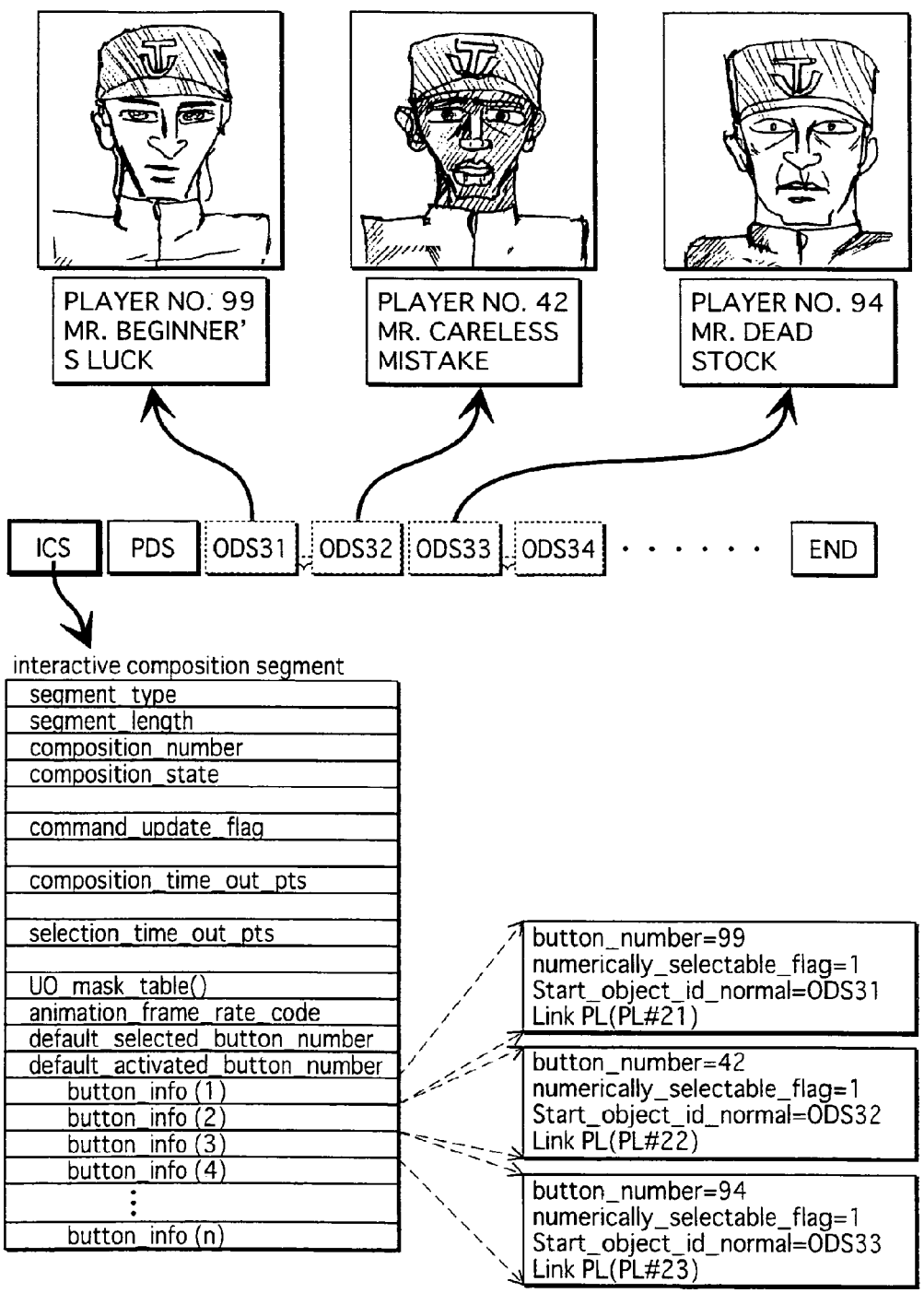
FIG. 18 is a view showing an example of an ICS and ODSs included in a DS.

Next, a description is given to application of the_numerically_selectable_flag field. FIG. 18 is a view showing an example of the ICS and ODSs included in a DS. The ODSs 31-33 represents images of three baseball players along with their names and player numbers, as shown in the upper part of the figure. The ICS belonging to the DS includes three pieces of button information, button_info (1), (2), and (3). The start_object_id fields of button_info (1), (2), and (3) specify the ODS 31, ODS 32, and ODS 33, respectively. Similarly, the button_number fields of the button_info (1), (2), and (3) are set to the values of "99", "42", and "94", respectively. Here, the numerically_selectable_flag fields of the button_info (1), (2), and (3) are all set to the value "1". With the above arrangement, each button defined by button_info (1), (2), and (3) is numerically selectable. When a user inputs the value "99" on the remote controller 400, the button presented with the image of Mr. Beginner's Luck receives the selected state. The value "99" may be inputted by pressing the "4" key and "9" key in a row or by pressing the "9" key once and "+10" key four time in a row. Alternatively, when a user inputs the value "42", the button of Mr. Careless Mistake receives the selected state. When a user inputs the value "94", the button of Mr. Dead Stock receives the selected state.

Here, suppose the auto_action_flag fields of the button_info (1), (2), and (3) are set to the value "1". In this case, the above three buttons receive, when selected, the active state instead of the selected state, and the button commands (LinkPL (PL#21), LinkPL (PL#22), LinkPL (PL#23))

included in the button_info are executed. As a result, PL #21, #22, or #23 to which the executed button command is linked is reproduced. If those PLs define scenes of batting or pitching by the above players, each of these scenes is reproduced at an input of the numeric value corresponding to one of the player numbers. Since the buttons are selectable with an input of the player numbers, which are easy for the users to recognize, there is provided improved user operability.

Next, a description is given to the order of ODSs in the DS. As already described above, the ODSs belonging to one DS are associated by the ICS with each state of one button. The order of ODSs in the DS is determined in accordance with the button state with which each ODS is associated.

In more detail, the ODSs belonging to one DS are grouped into (1) ODSs for presentation of a button in the normal state, (2) ODSs for presentation of the button in the selected state, and (3) ODSs for presentation of the button in the activated state. Each group for presentation of a respective state is referred to as a "button-state group". The button-state groups are arranged in the order, for example, of the normal state→the selected state→the activated state. As above, the order of ODSs within the DS is determined according to the button state with which the ODSs are associated.

Figure 19:
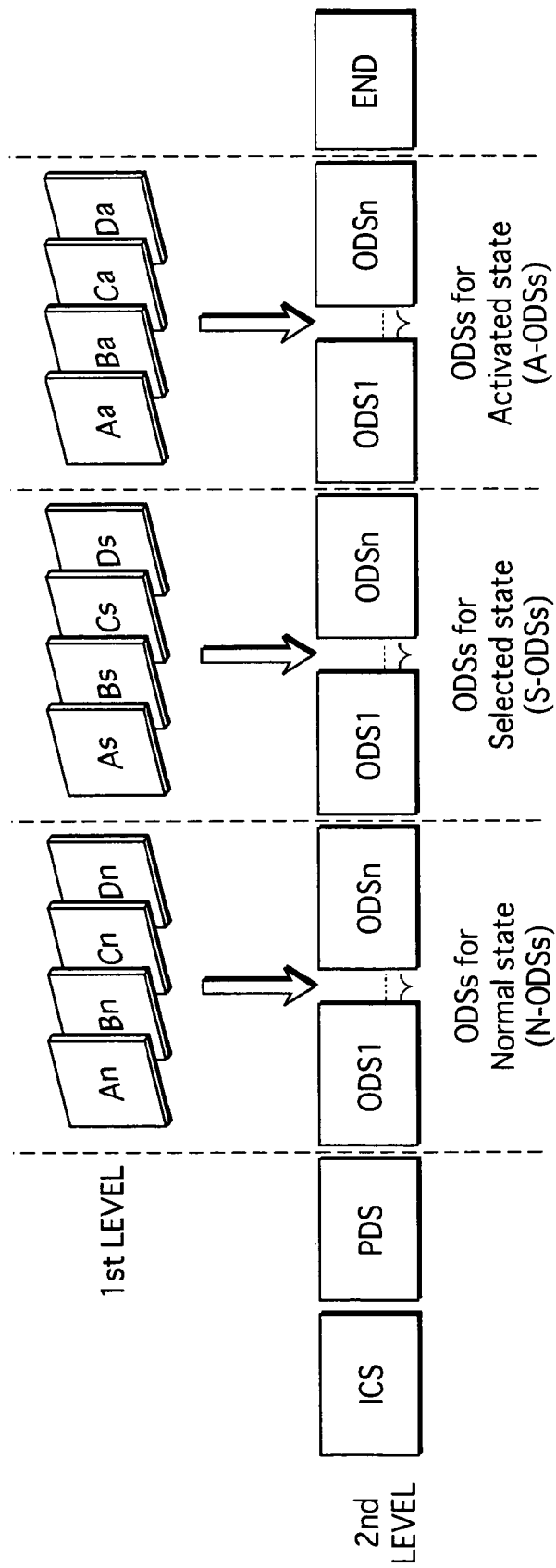
FIG. 19 is a view showing the order of ODSs and button-state groups within a DS.

FIG. 19 is a view showing the order of ODSs within a DS. In the figure, the following three button-state groups within the DS are shown on the second level: the button state group for presentation of the normal state (ODSs for Normal state); the button state group for presentation of the selected state (ODSs for Selected state); and the button state group for presentation of the activated state (ODSs for Activated state). In the figure, the button-state groups are arranged in the order of the normal state→the selected state→the activated state. This order is determined so that the reproduction apparatus first reads the interactive composition constituting the first interactive display, and then reads the interactive composition to be presented only after update.

FIG. 19 shows on the first level the graphics objects An, Bn, Cn, Dn, As, Bs, Cs, Ds, Aa, Ba, Ca, and Da that are referenced by the button-state groups. The numerical subscript n as in An, Bn, Cn, and Dn indicates a respective button in the normal state. Similarly, the numerical subscript s as in As, Bs, Cs, Ds indicates a respective button in the selected state, and the numerical subscript a as in Aa, Ba, Ca, and Da indicates a respective button in the activated state. The figure shows on the second level the button-state groups to which the graphics objects shown on the first level belong. In the figure, there are more than one ODS appended with the numerical subscripts, such as "1" and "n", to read "ODS 1" and "ODS n". Yet, it should be noted that each ODS 1 included in N-ODS, S-ODS and A-ODS is different. The same holds to the drawings with similar reference numerals.

Figure 20:
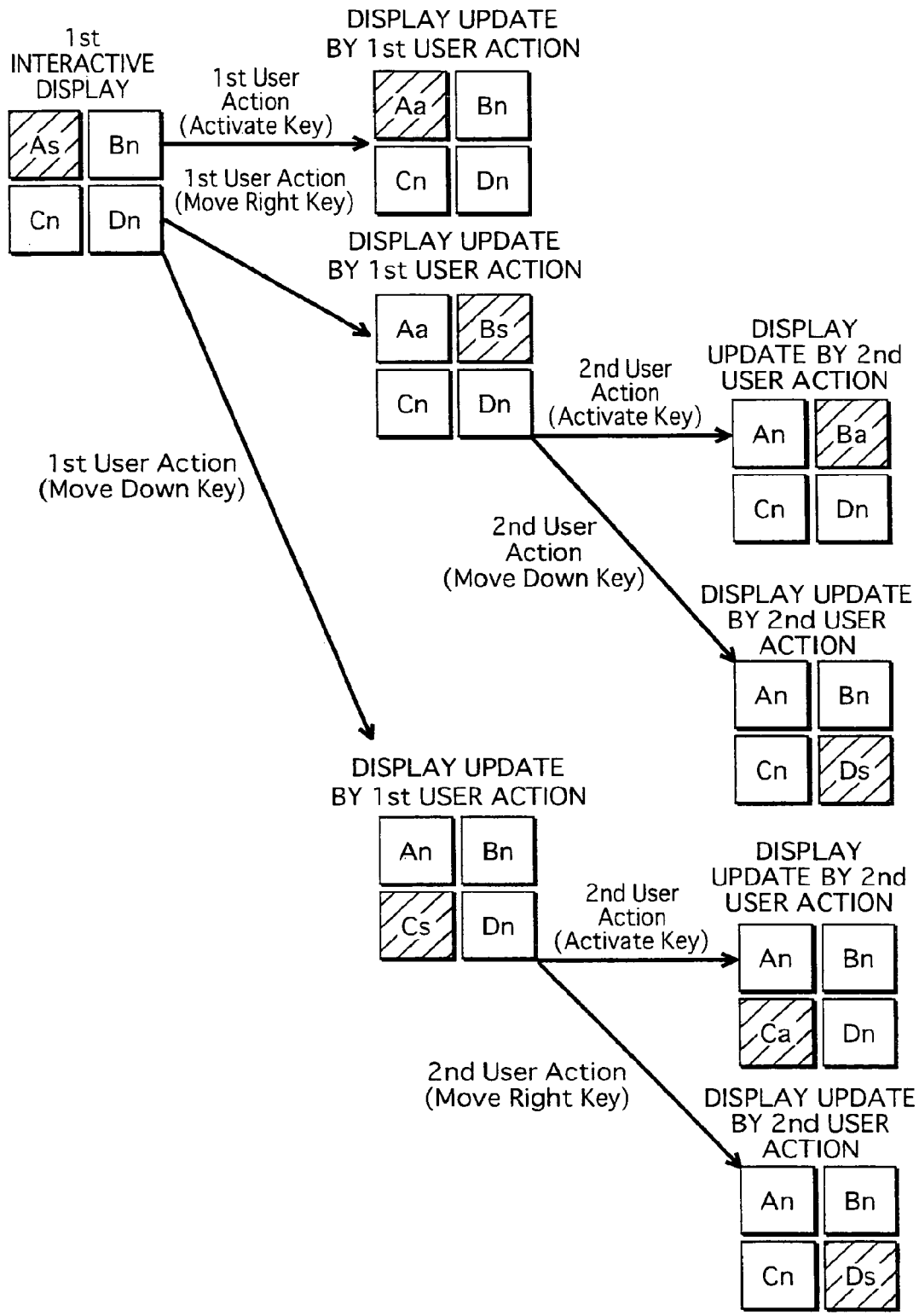
FIG. 20 a view illustrating button state transitions on an interactive display defined by the button-state groups shown in FIG. 19.

FIG. 20 is a view illustrating the button state transition on the interactive display defined by the button-state groups shown in FIG. 19.

As shown in the figure, the interactive display has a plurality of states including "initial state", "display update by 1st user action", and "display update by 2nd user action". The arrows in the figure represent user actions triggering the state transition. The four buttons A, B, C, and D each have the normal state, the selected state, and the activated state. In order to present the initial interactive display, the graphics objects for the three buttons in the normal state and one button in the selected state need to be ready for presentation.

When a default selected button is not specified, it is not determined which of the buttons A-D will be selected first. Even so, the initial interactive display can be made upon completion of decoding the graphic objects for the normal and selected states of each button. In view of this observation, the button-state groups in this embodiment are arranged in the order of the normal state→the selected state→the activated state, as shown in FIG. 19. With this arrangement, the initial interactive display can be presented even if the ODSs for the activated state are not yet read and decoded. As a result, the duration is shortened between the reading of DS is commenced and the presentation of initial interactive display is completed.

Figure 16:
FIG. 16 is a view showing examples of graphical reorientations defined by ODSs 11, 21, 31, and 41.
Figure 17:
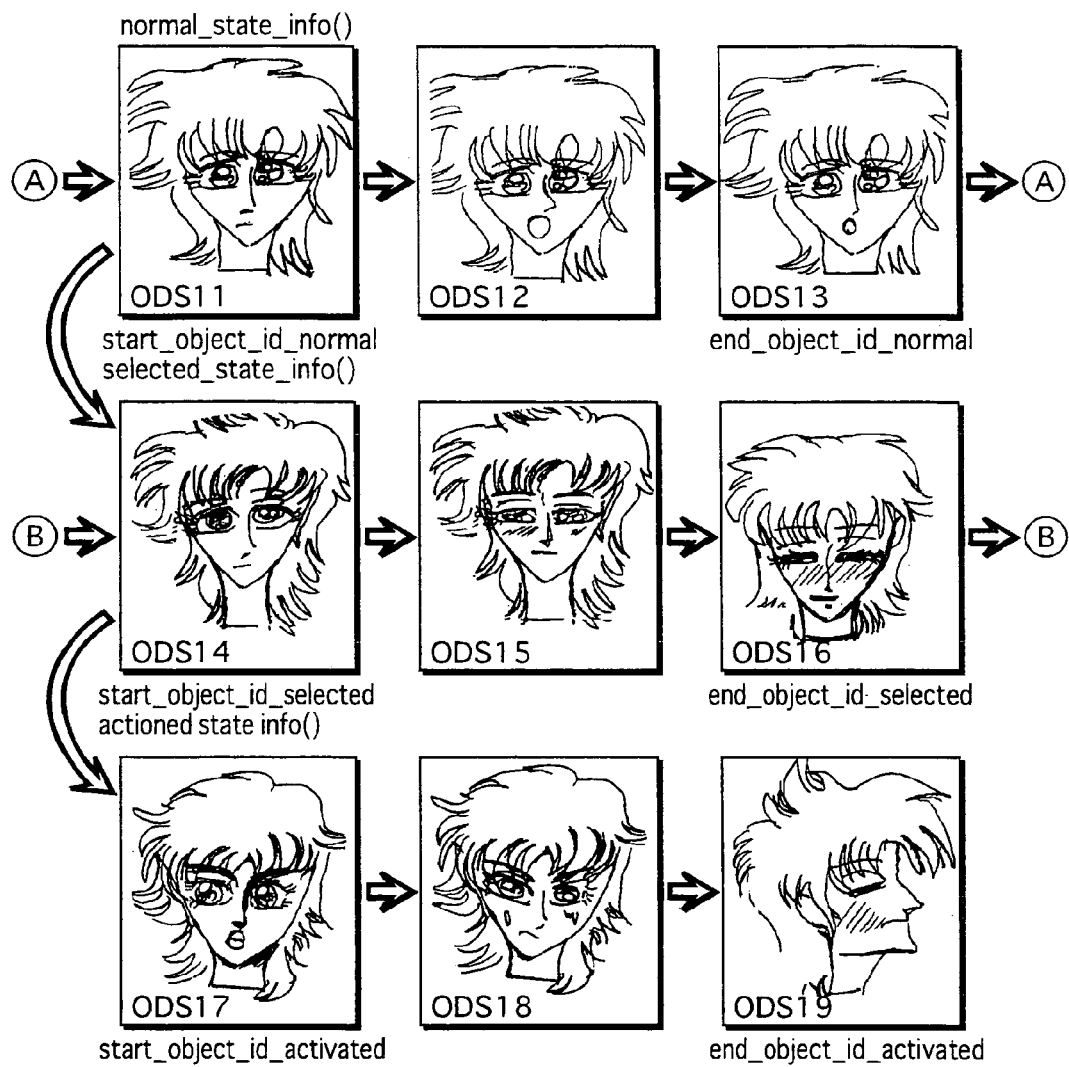
FIG. 17 is a view showing examples of graphical representations defined by ODSs 11-19 associated with the button A.
Figure 21:
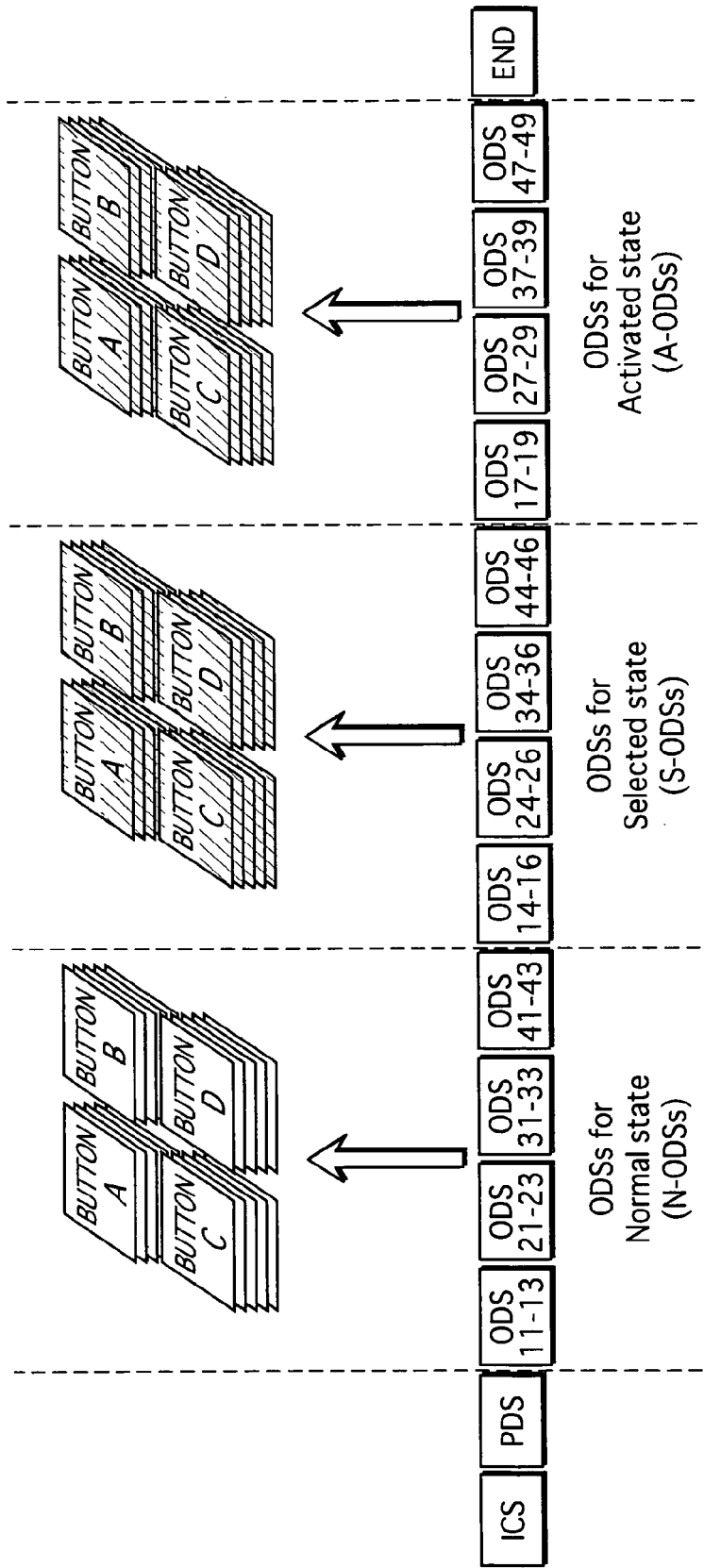
FIG. 21 is a view showing the order of ODSs within a DS.

With reference to FIG. 21, a description is given to the order of ODSs that are shown in FIGS. 16 and 17. FIG. 21 is a view showing the order of ODSs within a DS. In the figure, the ODSs for normal state include ODSs 11-13, 21-23, 31-33, and 41-43. The ODSs for selected state include ODSs 14-16, 24-26, 34-36, and 44-46. The ODSs for activated state includes ODSs 17-19, 27-29, 37-39, and 47-49. The ODSs 11-13 are for animated presentation of the character image shown in FIG. 17. Similarly, the ODSs 21-23, 31-33, and 41-43 are for animated presentation of other character images. Thus, by placing the button-state group composed of the above ODSs (ODS 11-13, 21-23, 31-33, 41-43) as the first button state group in the DS, the initial interactive display is ready for presentation even before the reading of the DS is completed. This ensures that the interactive display composed of animated buttons is displayed without delay.

Next, a description is given to the order of ODSs when there are multiple references thereto from a plurality of button-state groups. The term multiple references means that the same object_id is referenced by two or more pieces of normal_state_info, selected_state_info, and activated_state_info within the ICS. With the multiple references, for example, a specific graphics object used to render a button in the normal state is commonly used to render another button in the selected state. In other words, the graphics object is shared, so that the number of ODSs can be reduced. Here, a problem arises as to which button-state group an ODS with multiple references belongs. Specifically, when one ODS is associated with one button in the normal state as well as another button in the selected state, it needs to be determined whether the ODS belongs to the button-state group for the normal state or the button-state group for the selected state. In such a case, the ODS is placed in the button-state group that first appears. For example, if the button-state groups appear in the order of the normal state→the selected state→, the activated state, an ODS referenced by both the normal-state and selected-state groups is placed in the normal-state group. Also, an ODS referenced by both the selected-state and activated-state groups is placed in the selected-state group. This concludes the description of the order of multiple referenced ODSs.

Now, a description is given to the order of ODSs within the button-state group for the selected state. In the button-state group for the selected state, which of the ODSs should be placed at the beginning depends on whether a default selected button is determined. The default selected button is specified when the default_selected_button_number field is set to a valid value other than "00". In this case, the ODS associated with the default selected button is placed at the beginning of the button-state group.

No default selected button is specified when the default_selected_button_number field in ICS is set to the value "00". The default_selected_button_number field is set to the value "00" in the case, for example, where an AV Clip into which the DS is multiplexed serves as a merge point of a plurality of reproduction paths. Suppose that the preceding reproduction paths correspond to Chapters 1, 2, and 3, a DS serving as a merge point is for presentation of buttons associated with Chapters 1, 2, and 3. In such a case, no specific button can be specified in the default_selected_button_number field.

Ideally, when the interactive display is presented after reproduction of Chapter 1, the button associated with Chapter 2 should be selected as default. Similarly, after reproduction of Chapter 2, the button associated with Chapter 3 should be selected as default, and the button associated with Chapter 4 after reproduction of Chapter 3. In other words, the default_selected_button_number field is set to the value "0" to be invalidated when a different button needs to be selected as default depending on which reproduction path has been taken. In this case, it is not necessary to place a specific button-state group ODSs at the beginning because no specific button is selected as default.

This concludes the description of the order of ODSs. Next, a description is given to how DSs having above-described ICSs and ODSs are allocated on the reproduction time axis of AV Clip. An Epoch is a time period on the reproduction time axis during which memory management is continuous. Since each Epoch is composed of one or more DSs, it is important to how to allocate those DSs on the reproduction time axis of AV Clip. The reproduction time axis of AV Clip mentioned here is a time axis for defining decoding timing and presentation timing of individual pictures which constitute the video stream multiplexed in the AV Clip. The decoding timing and presentation timing on the reproduction time axis are expressed with a time accuracy of 90 KHz. This time accuracy of 90 KHz corresponds to a common multiple of NTSC signal, PAL signal, Dolby AC-3, and the frame frequency of MPEG audio. A DTS and a PTS attached to ICS and ODS within a DS specify timings on this reproduction time axis for achieving synchronous control. In other words, the DSs are allocated on the reproduction time axis by exercising synchronous control using DTS and PTS attached to ICS and ODS.

First, a description is given to the synchronous control exercised using DTS and PTS of an ODS.

The DTS shows a time, with the time accuracy of 90 KHz, at which the decoding of ODS needs to be started. The PTS shows a deadline for completing the decoding.

The decoding of ODS can not be completed instantly, and takes a certain duration. In order to explicitly show the start and end times of decoding the ODS, the DTS and PTS of the ODS show the decoding start time and decoding deadline.

The value of PTS shows the deadline by which the decoding of ODS (j) needs to be completed and the resulting uncompressed graphics object needs to be available in the object buffer of the reproduction apparatus.

The decoding start time of an arbitrary ODS (j) belonging to a DS (n) is shown by DTS (DSn [ODS]) with the time accuracy of 90 KHz. Thus, the decoding deadline of the ODS (j) is determined by adding to the DTS (DSn [ODS]) value, a maximum time which may be taken for the decoding.

Let SIZE (DSn [ODSj]) denote the size of ODS (j), and Rd denote the ODS decoding rate. Then the maximum time required for the decoding (in seconds) is SIZE (DSn[ODSj])//Rd.

By converting this maximum time to the accuracy of 90 KHz and adding the result to the DTS of the ODS (j), the decoding deadline to be shown by the PTS is calculated with the accuracy of 90 KHz.

The PTS of the ODS (j) belonging to the DS (n) can be expressed by the following formula:

$$PTS(DS[ODSj])=DTS(DSn[ODSj])+90{,}000\times(SIZE(DSn[ODSj])//Rd)$$

Next a description is given to the value of PTS within an ICS.

The PTS within the ICS is set to the value obtained by adding (1) the PTS value of the ODS of which decoding time is latest among all the ODSs needed for the initial display of the DS (n), (2) the time taken to clear the graphics plane, and (3) the time taken to transfer the decoded graphics object to the graphics plane.

When the default_selected_button_number is specified in the ICS, the initial interactive displayed can be presented upon completion of the decoding of ODSs associated with each button in the normal state and the specified default selected button in the selected state. The ODSs for rendering each button in the selected state are referred to as S-ODSs, and the S-ODS of which decoding start time is earliest (i.e. the ODS for rendering the default selected button, in this case) is referred to as S-ODSsfirst. The PTS value of this S-ODSsfirst is designated as the PTS value of the ODS of which decoding start time is latest, and used as a reference value for the PTS within the ICS.

When the default_selected_button_number is not specified in the ICS, it is not known which of the buttons will be first selected. Thus, the initial interactive display is not available for presentation until it is ready to render every button in the normal state as well as the selected state. Among the S-ODSs for rendering the selected state of each button included in the initial interactive display, the ODS of which decoding start time is latest is referred to as the S-ODSslast. The PTS value of this S-ODSslast is designated as the PTS value of the ODS of which decode start time is latest, and used as a reference value for the PTS within the ICS.

Let PTS (DSn [S-ODSsfirst]) denote the decoding deadline of S-ODSsfirst, then PTS (DSn[ICS]) is set to the value obtained by (2) the time taken to clear the graphic plane and (3) the time taken for rendering the decoded graphics object to the graphics plane.

Let video_width and video_height denote the width and height of a rectangular area of graphics plane within which graphics objects are rendered. When the rendering rate to the graphics plane is 128 Mbps, the time taken to clear the graphics plane is obtained by 8×video_width×video_height//128,000,000. With the time accuracy of 90 KHz, the above-mentioned time (2) taken to clear the graphics plane is expressed by 90,000×(8×video_width×video_height//128,000,000).

Let ΣSIZE(DSn[ICS.BUTTON[i]] denote the total size of graphics objects specified by each piece of button information contained in the ICS. When the rendering rate to the graphics plane is 128 Mbps, the time taken to render the graphics plane is obtained by ΣSIZE(DSn[ICS.BUTTON[i]])//128,000,000. With the time accuracy of 90 KHz, the above-mentioned time (3) taken to render the graphics plane is expressed by 90,000×(ΣSIZE(DSn[ICS.BUTTON[i]])//128,000,000).

With the above formulas, PTS (DSn[ICS]) is expressed by the following formula:

$$PTS(DSn[ICS]) \geq PTS(DSn[S\text{-}ODSs\text{first}])+90{,}000\times(8\times video\_width\times video\_height//128{,}000{,}000)+90{,}000\times(\Sigma SIZE(DSn[ICS.BUTTON[i]])//128{,}000{,}000)$$

Note that the above formula is applicable when the default_selected_button_number in the ICS is valid. If not, the following formula needs to be satisfied.

$$PTS(DSn[ICS]) \geq PTS(DSn[S\text{-}ODSs\text{last}])+90{,}000\times(8\times video\_width\times video\_height//128{,}000{,}000)+90{,}000\times(\Sigma SIZE(DSn[ICS.BUTTON[i]])//128{,}000{,}000)$$

Figure 22:
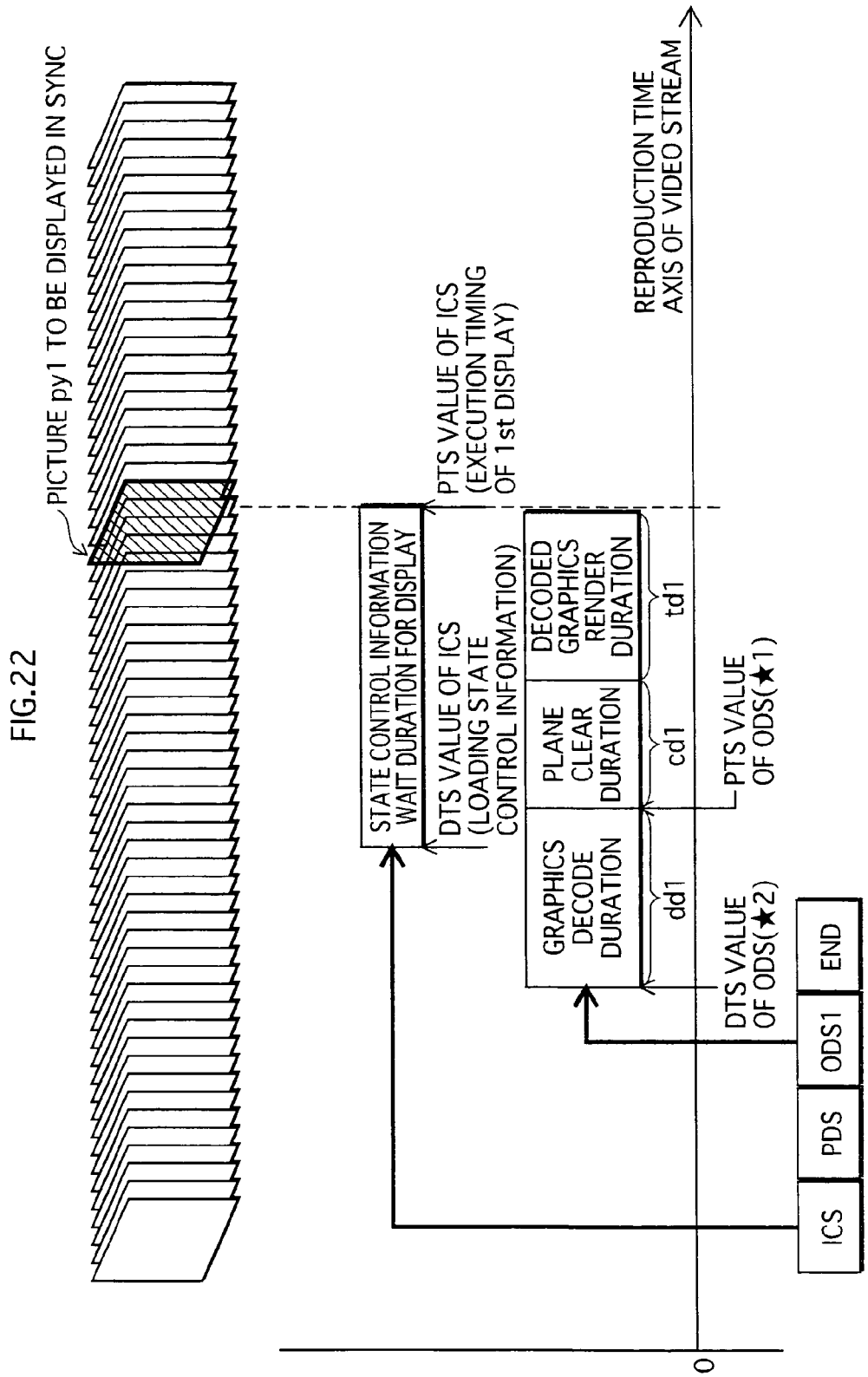
FIG. 22 is a view illustrating the timing of synchronous display defined by an ICS.

By setting the PTS and DTS in the above manner, synchronous display is realized. FIG. 22 illustrates an example of such control. In this example, buttons are to be displayed in synchronization with the display timing of a picture py1 in the video stream. To this end, the PTS within the ICS needs to be set to the value corresponding to the display point of picture data py1. Note that the DTS within the ICS is set to show the time prior to the time shown by the PTS.

The decoding of ODSs constituting the initial interactive display of DS (n) needs to be completed by the time calculated by subtracting from the time shown by the PTS in the ICS, the plane clear duration cd1 and the object transfer duration td1. Thus, the PTS of the ODS of which decoding time is the latest needs to be set to the value corresponding to a point of time marked in the figure with a black star. Further, a duration dd1 is taken for decoding the ODS, so that the DTS of the ODS needs to be set to a time earlier than the PTS by the duration dd1.

The example illustrated in FIG. 22 is a simplified case in that only one ODS is used for overlay with the video data. In the case where a plurality of ODSs are used for presentation of the initial interactive display, the PTS and DTS of the ICS and of ODS need to be set as illustrated in FIG. 23.

Figure 23:
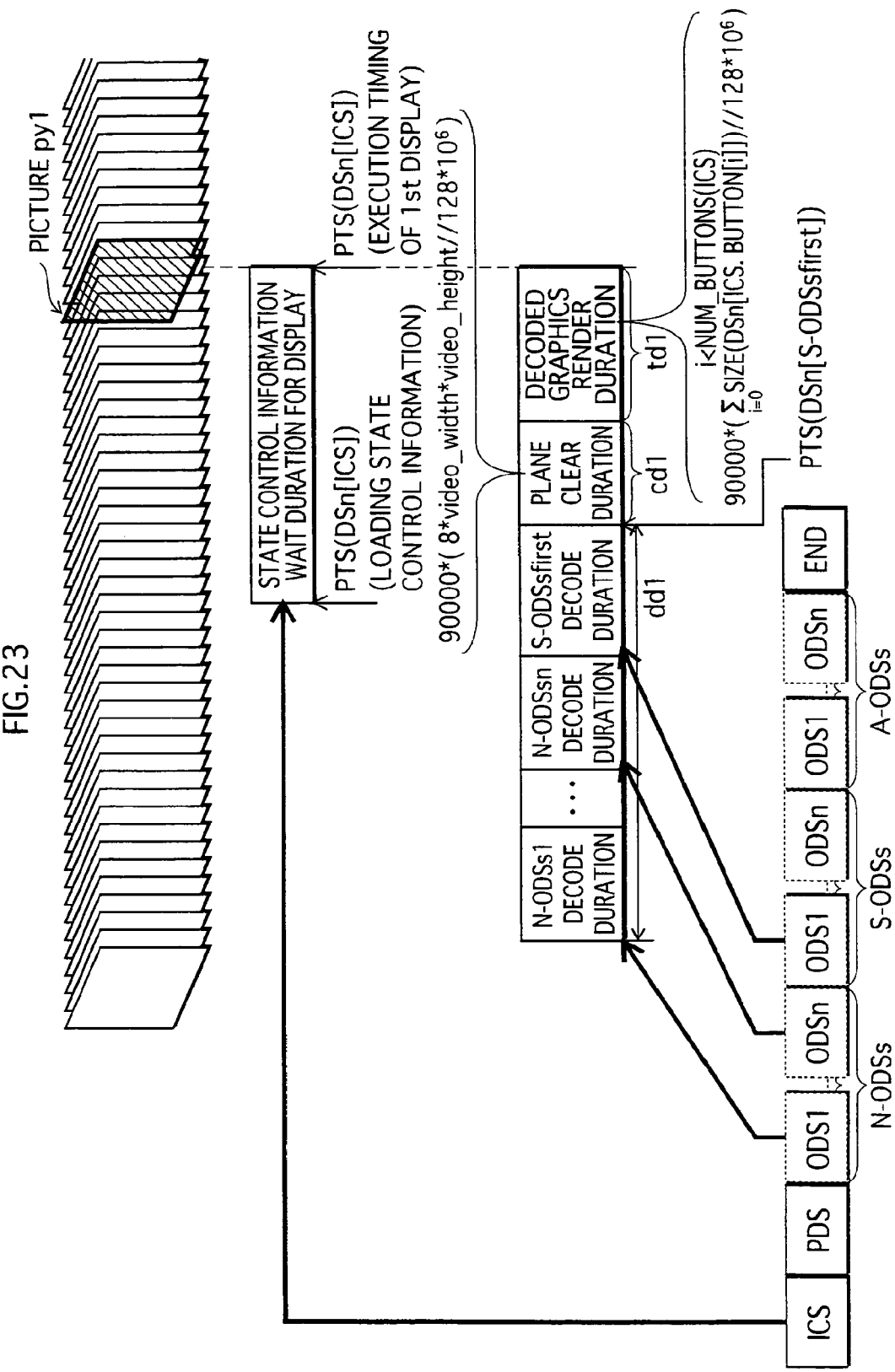
FIG. 23 is a view illustrating the DTS and PTS setting in the case where a plurality of ODSs constitutes an initial interactive display and a default_selected_button_number is valid.

FIG. 23 is a view illustrating the DTS and PTS setting in the case where the initial interactive display is constructed by a plurality of ODSs and a default selected button is specified. Suppose that the duration dd1 is taken for decoding S-ODSsfirst, which is the ODS of which decoding time is latest among all ODSs needed for presentation of the initial interactive display. The PTS (DSn[S-ODSsfirst]) of this S-ODSsfirst is set to the value corresponding to the end of the duration dd1.

Further, for presentation of the initial interactive display, the graphics plane must be cleared and the decoded graphics objects must be transferred. Thus, the PTS (DSn[ICS]) of the ICS must be set to the value corresponding to the time, at the earliest, calculated by adding to the value of PTS(DSn[S-ODSsfirst]), the plane clear duration (90,000×(8×video_width×video_height//128,000,000) and the decoded object transfer duration (90,000×(ΣSIZE(DSn [ICS.BUTTON[i]])//128,000,000)).

Figure 24:
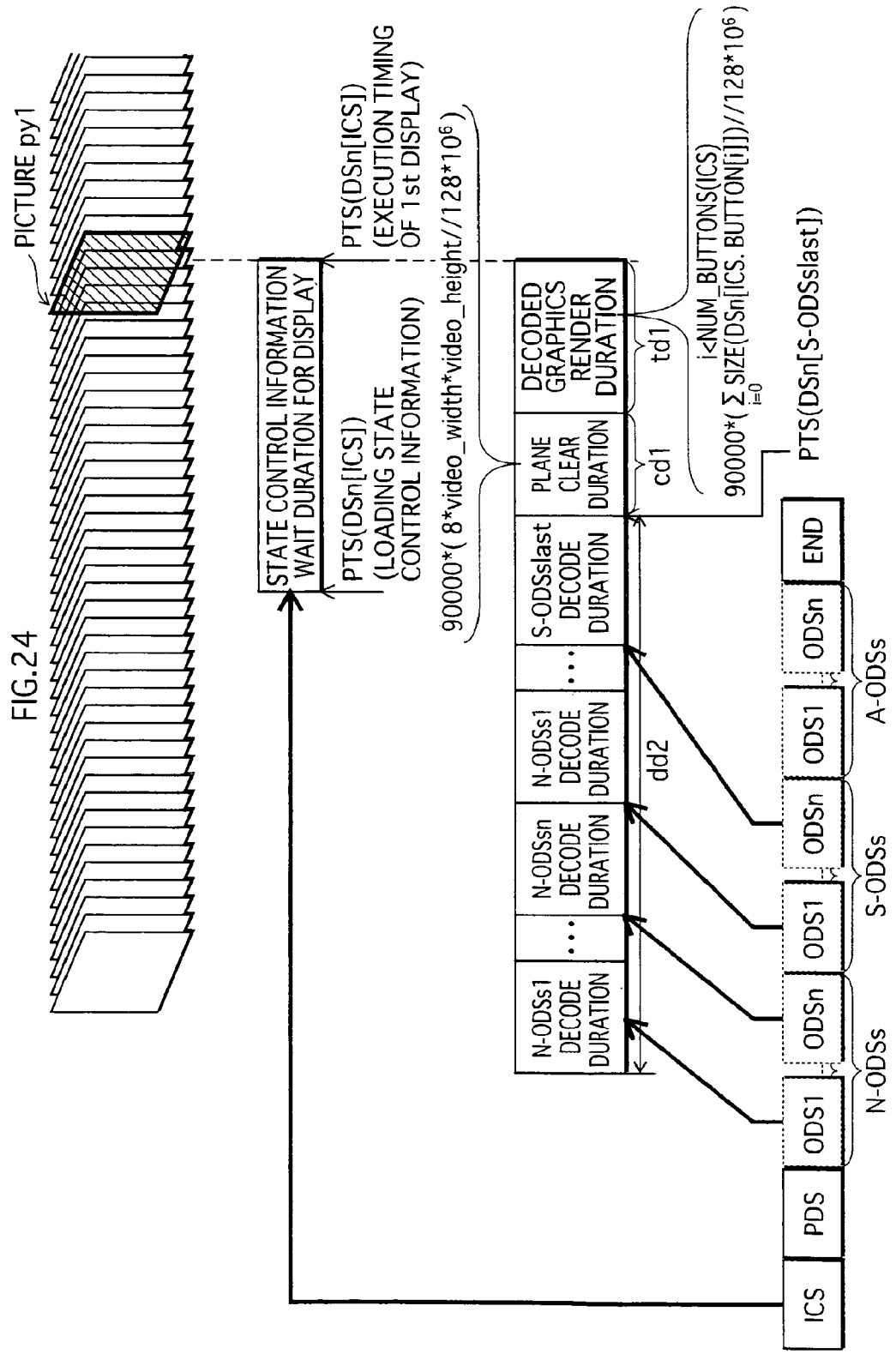
FIG. 24 is a view illustrating the setting of DTS and PTS in the case where an initial interactive display is constituted by a plurality of ODSs and a default_selected_button_number is invalid.

FIG. 24 is a view illustrating the DTS and PTS setting in the case where the initial interactive display is constructed by a plurality of ODSs and no default selected button is specified. Here, the PTS(DSn [S-ODSslast]) is set to the value corresponding to an end of a duration dd2 taken for decoding the S-ODSslast, which is the ODS of which decoding time is latest among all S-ODSs needed for presentation of the initial interactive display.

Further, for presentation of the initial interactive display, the screen must be cleared and decoded graphics objects must be transferred. Thus, the PTS(DSn[ICS]) of the ICS needs to be set to the value corresponding to the time, at the earliest, calculated by adding to the value of PTS(DSn[S-ODSslast]), the screen clear duration (90,000×(8×video_width×video_height//128,000,000) and the decoded object transfer duration (90,000×(ΣSIZE (DSn [ICS.BUTTON[i]])//128,000,000)). This concludes the description regarding the synchronization control defined by the ICS.

In the case of DVDs, the interactive control is valid during the time of VOBU, which corresponds to GOP of the video stream. In the case of BD-ROMs, however, the valid period of interactive control can be arbitrarily set with the use of the PTS and DTS of the ICS included in an Epoch. That is to say, the interactive control of BD-ROM is independent of GOP.

Note that synchronous control by the PTS of the ICS includes not only displaying a button at a specific point on the reproduction time axis, but also making a Popup Menu available for presentation during a specific time period on the reproduction time axis. The Popup Menu is a menu displayed at a push of a menu key of the remote controller 400. The Popup menu becomes available for presentation at the display timing of a specific picture within the AV Clip. Such control is also included in the synchronous control defined by the PTS of the ICS. Similarly to ODSs used for presentation of buttons, ODDS for presentation of the Popup menu are decoded and the decoded objects are rendered on the graphics plane. Unless the rendering to the graphics plane is completed, no response can be made to a menu call from users. In order to allow the synchronous display of the Popup menu, the PTS of the ICS shows the time upon which the Popup display becomes available.

Figure 25:
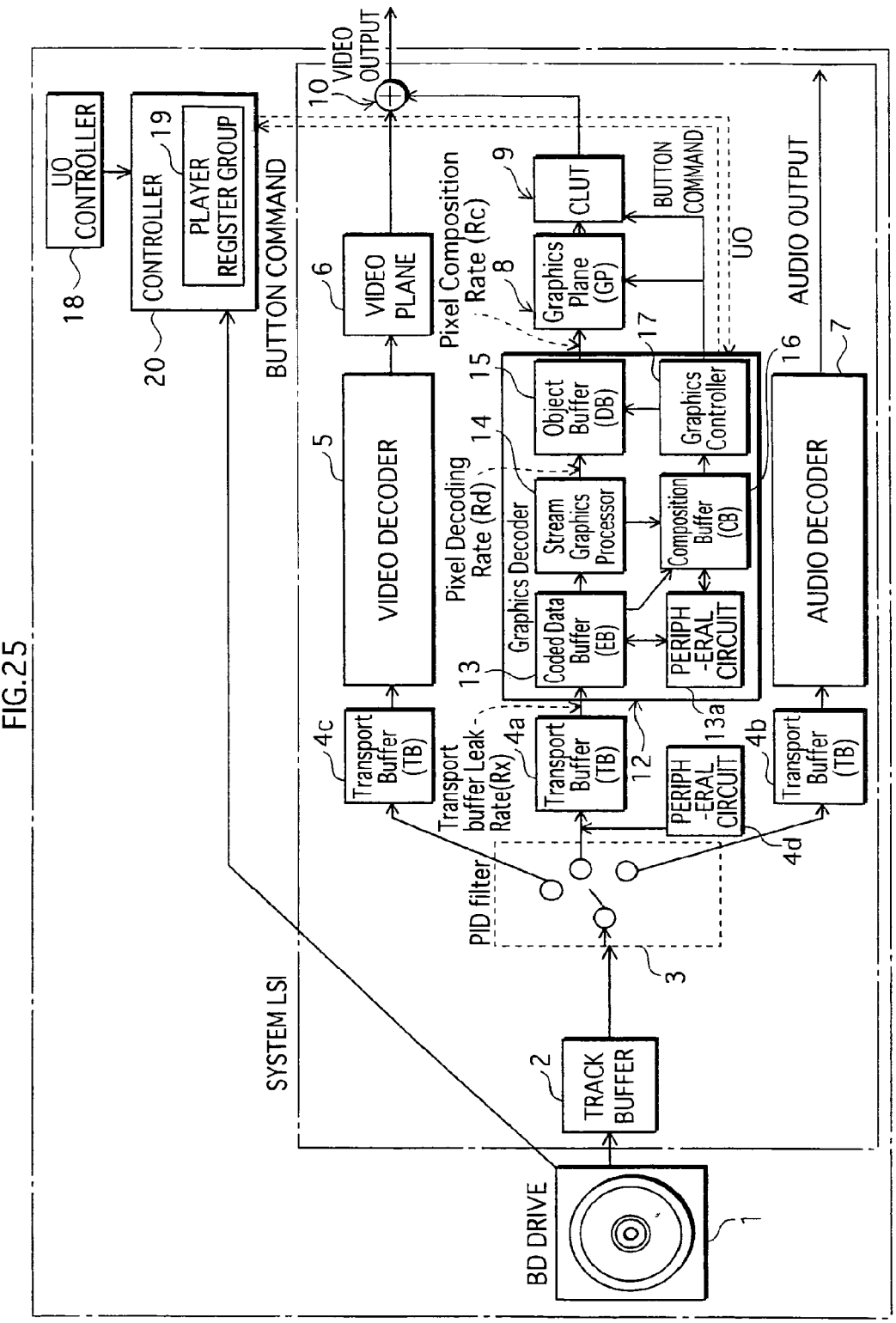
FIG. 25 is a view showing an internal structure of a reproduction apparatus.

This concludes the description of the recording medium according to the first embodiment of the present invention. The following describes a reproduction apparatus according to the first embodiment of the present invention. FIG. 25 shows an internal structure of a reproduction apparatus. The reproduction apparatus according to the present invention is industrially manufactured based on this internal structure. The reproduction apparatus is roughly made up of three parts that are a system LSI, a drive device, and a microcomputer system. The reproduction apparatus can be manufactured by mounting these parts on a cabinet and substrate of the apparatus. The system LSI is an integrated circuit including various processing units for achieving the functions of the reproduction apparatus. The reproduction apparatus manufactured in the above manner is composed of a BD drive 1, a track buffer 2, a PID filter 3, transport buffers 4a, 4b, and 4c, a peripheral circuit 4d, a video decoder 5, a video plane 6, an audio decoder 7, a graphics plane 8, a CLUT unit 9, an adder 10, and a graphics decoder 12, a coded data buffer 13, a peripheral circuit 13a, a Stream Graphics Processor 14, an object buffer 15, a composition buffer 16, a graphics controller 17, a UO controller 18, a player register group 19, and a controller 20.

The BD drive 1 performs loading, reading, and ejecting of the BD-ROM so as to access the BD-ROM.

The track buffer 2 is a FIFO memory. Accordingly, TS packets read from the BD-ROM are removed from the track buffer 2 in the same order as they arrive.

The PID filter 3 performs filtering on TS packets output from the track buffer 2. In more detail, the PID filter 3 passes only TS packets having predetermined PIDs to the transport buffers 4a, 4b, and 4c. There is no buffering required inside the PID filter 3. Accordingly, TS packets entering the PID filter 3 are written to the transport buffers 4a, 4b, and 4c without delay.

The transport buffers 4a, 4b, and 4c are FIFO memories for storing TS packets output from the PID filter 3.

The peripheral circuit 4d has a wired logic for converting TS packets read from the transport buffers 4a, 4b, and 4c to functional segments. The functional segments are then stored to the coded data buffer 13.

The video decoder 5 decodes TS packets output from the PID filter 3 to obtain uncompressed pictures, and writes the obtained pictures onto the video plane 6.

The video plane 6 is a plane memory for video data.

The audio decoder 7 decodes TS packets output from the PID filter 3, and outputs uncompressed audio data.

The graphics plane 8 is a plane memory having a memory area of one screen, and is capable of storing uncompressed graphics of one screen.

The CLUT unit 9 converts index colors of the uncompressed graphics on the graphics plane 8, based on Y, Cr, and Cb values defined in a PDS.

The adder 10 multiplies the uncompressed graphics converted by the CLUT unit 9, by a T value (transparency) defined in the PDS. The adder 10 then performs addition for corresponding pixels in the resulting uncompressed graphics and the uncompressed picture data on the video plane 6 to output a composite image.

The graphics decoder 12 decodes a graphics stream to obtain uncompressed graphics, and renders the uncompressed graphics to the graphics plane 8 as graphics objects. As a result of decoding the graphics stream, subtitles and menus appear on the screen. This graphics decoder 12 is composed of the coded data buffer 13, the peripheral circuit 13*a*, the stream graphics processor 14, the object buffer 15, the composition buffer 16, and the graphical controller 17.

The coded data buffer 13 is used for storing functional segments together with their DTSs and PTSs. The functional segments are obtained by removing a TS packet header and a PES packet header from each TS packet stored in the transport buffers 4*a*, 4*b*, and 4*c*, and arranging the payloads in sequence. The DTSs and PTSs contained in the removed TS packet headers and PES packet headers are stored in correspondence with the PES packets.

The peripheral circuit 13*a* has a wired logic for transferring data from the coded data buffer 13 to the stream graphics processor 14, as well as from the coded data buffer 13 to the composition buffer 16. In more detail, when the current time reaches the DTS of an ODS, the peripheral circuit 13*a* transfers the ODS from the coded data buffer 13 to the stream graphics processor 14. Also, when the current time reaches the time shown by the DTS of an ICS or of a PDS, the peripheral circuit 13*a* transfers the ICS or PDS from the coded data buffer 13 to the composition buffer 16.

The stream graphics processor 14 decodes an ODS to obtain uncompressed graphics having index colors, and transfers the uncompressed graphics to the object buffer 15 as a graphics object. The decoding by the stream graphics processor 14 begins at the time shown by the DTS associated with the ODS and ends by the decoding deadline shown by the PTS also associated with the ODS. The decode rate Rd of the graphics object decoding mentioned above is equal to the output rate of the stream graphics processor 14.

The object buffer 15 stores graphics objects decoded by the stream graphics processor 14.

The composition buffer 16 is used for storing an ICS and a PDS.

The graphics controller 17 decodes an ICS stored in the composition buffer 16, and carries out control based on a decoding result at the timing specified by the PTS attached to the ICS.

The UO controller 18 detects a user operation made on the remote controller and the front panel of reproduction apparatus, and outputs information showing the detected user operation (hereinafter referred to as a UO (User Operations)) to the controller 20.

The player register group 19 is a group of registers provided within the controller 20, and includes 32 player status registers and 32 general purpose registers. The meanings of player status register values (PRS) are shown below. The expression "PSR(x)" represents the value of the xth player status register.

PSR(0): Reserved
PSR(1): Audio Stream Number to be decoded
PSR(2): Subtitle Graphics Stream Number to be decoded
PSR(3): Angle Number set by User
PSR(4): Title Number being Current Reproduction Target
PSR(5): Chapter Number being Current Reproduction Target
PSR(6): PL Number being Current Reproduction Target
PSR(7): PlayItem Number being Current Reproduction Target
PSR(8): Time Information showing Current Reproduction Point
PSR(9): Count of Navigation Timer
PSR(10): Button Number Currently in Selected State
PSR(11)-(12): Reserved
PSR(13): Parental Level set by User
PSR(14): Reproduction Apparatus Setting for Video
PSR(15): Reproduction Apparatus Setting for Audio
PSR(16): Language Code for Audio
PSR(17): Language Code for Subtitles
PSR(18): Language Code for Menu Description
PSR(19)-(63): Reserved The PSR (8) is updated each time a picture belonging to the AV Clip is displayed. That is, when the reproduction apparatus displays a new picture, the PSR(8) is updated so as to hold the value corresponding to the display start time (i.e. Presentation Time) of the newly displayed picture. With reference to PRS(8), the current reproduction point is known.

The controller 20 performs integral control through the bi-directional data exchanges with the graphics decoder 12. The data outputted from the controller 20 to the graphics decoder 12 is UOs received by the UO controller 18. The data outputted from the graphics decoder 12 to the controller 20 is button commands included in an ICS.

The components of reproduction apparatus having the above structure perform processing in a pipeline.

Figure 26:
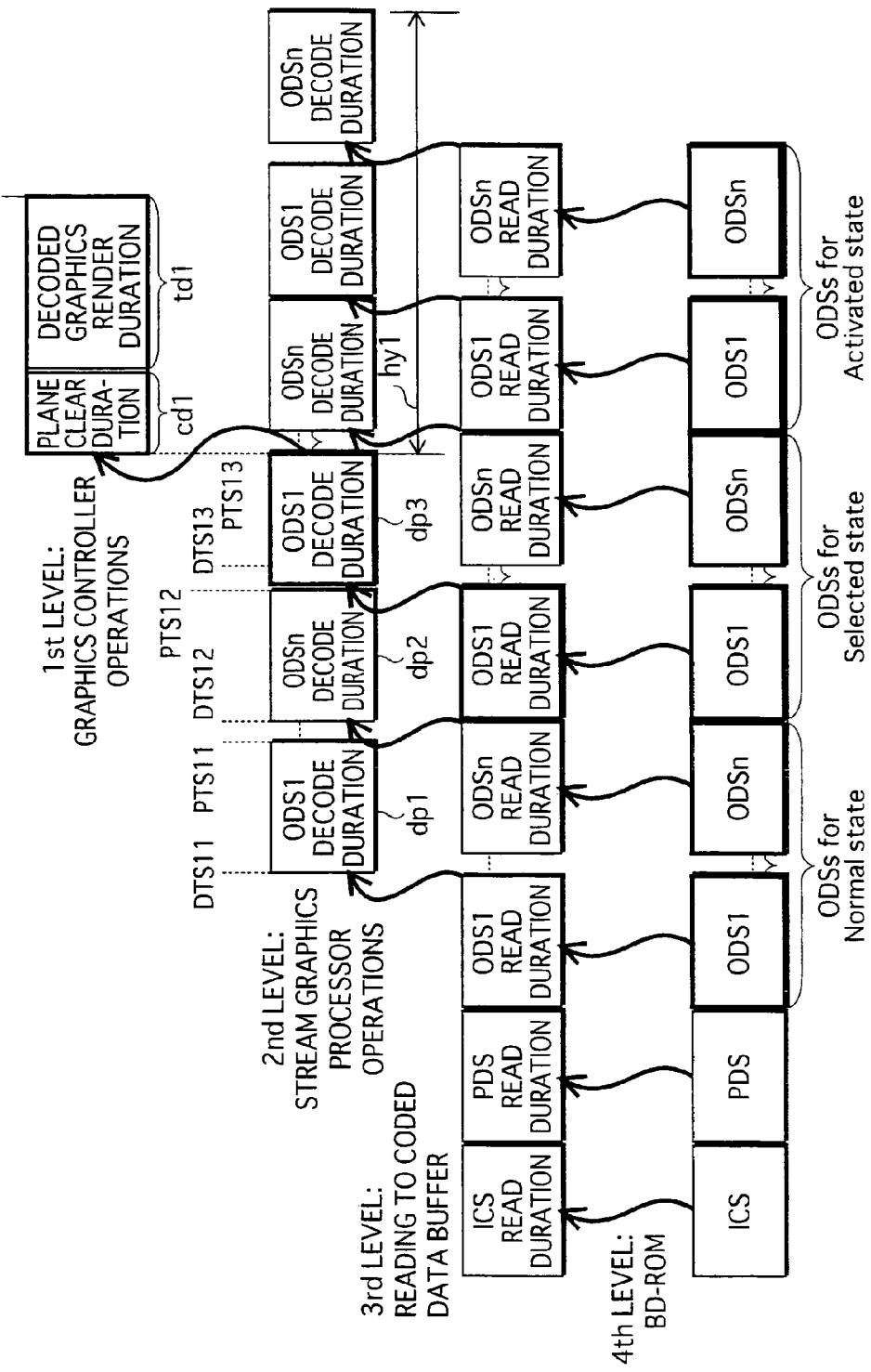
FIG. 26 a timing chart of the pipeline processing performed by the reproduction apparatus.

FIG. 26 is a timing chart showing decoding of ODSs. In the figure, the forth level shows DSs recorded on the BD-ROM. The third level shows the read durations of ICSs, PDSs, and ODSs by the coded data buffer 13. The second level shows the decode durations of the ODSs by the stream graphics processor 14. The first level shows durations of processing by the graphics controller 17. The decoding start time of each ODS is shown in the figure as DTS11, DTS12, and DTS13. Each ODS needs to be read to the coded data buffer 13 by the decoding start time specified by a respective DTS. Therefore, the reading of ODS1 is completed, at the latest, immediately before the decode duration dp1 of the ODS1 to the coded data buffer 13. Similarly, the reading of ODS (n) is completed, at the latest, immediately before the decode duration dp2 of the ODS2.

The decoding deadline of each ODS is shown in the figure as PTS11, PTS12, and PTS13. The decoding of ODS1 by the stream graphics processor 14 is completed by the time shown by the PTS11, and the decoding of ODS (n) is completed by the time shown by the PTS12. As above, each ODS is read to the coded data buffer 13 by the time shown by a respective DTS of the ODS, and the read ODS is decoded and loaded to the object buffer 15 by the time shown by a respective PTS of the ODS. The above processing is performed in pipeline by the single stream graphics processor 14.

In the case where a default selected button is specified, all of the graphics objects necessary for presentation of the initial interactive display become available on the object buffer 15 upon completion of the decoding of all of the ODSs for the normal state and the first ODS for the selected state. In the figure, at the time shown by the PTS13, all of the graphics objects necessary for presentation of the initial interactive display become available.

On the first level, the duration cd1 is needed for the graphics controller 17 to clear the graphics plane 8, and the duration td1 is needed for rendering the graphics on the object buffer 15 to the graphics plane 8. The position within the graphics plane 8 for rendering is specified by the button_horizontal_position and button_vertical_position fields in the ICS. That is to say, uncompressed graphics constituting an interactive display is obtained on the graphics plane 8 at the end of time calculated by adding to the PTS13 value of the ODS, the plane clear duration cd1 and the rendering duration td1 of the decoded graphics objects. The CLUT unit 9 performs color conversion on the uncompressed graphics, and the adder 10 overlays the graphics on an uncompressed picture stored with the video plane 6. As a result, a composite image is produced.

With the above arrangement, the initial interactive display is presented without waiting for completion of the decoding of the ODSs belonging to the button-state groups for the selected state and the activated state. Thus, in comparison with the case where the initial interactive display is presented only after all the ODSs within the DS are decoded, the presentation is earlier by the duration hy1 shown in the figure.

Note in the figure, there are more than one ODS appended with the numerical subscripts, such as "1" and "n", to read "ODS1" and "ODS n". Yet, each ODS1 included in N-ODSs, S-ODSs and A-ODSs is different. The same holds to the drawings with similar reference numerals.

In the graphics decoder 12, the stream graphics processor 14 continues decoding while the graphics controller 17 is clearing or rendering the graphics plane 8 (the decode durations of ODS (n), ODS1, ODS (n) shown on the second level). Since the decoding of the remaining ODSs are continued even during the graphics controller 17 is clearing or rendering the graphics plane 8, the decoding of the remaining ODSs are completed earlier than would otherwise be the case. Thus, updates of the interactive display using those remaining ODSs can be carried out immediately upon a user operation. As a result of such pipeline processing, presentation of the initial interactive display and updates to the display can be carried out speedily.

Figure 27:
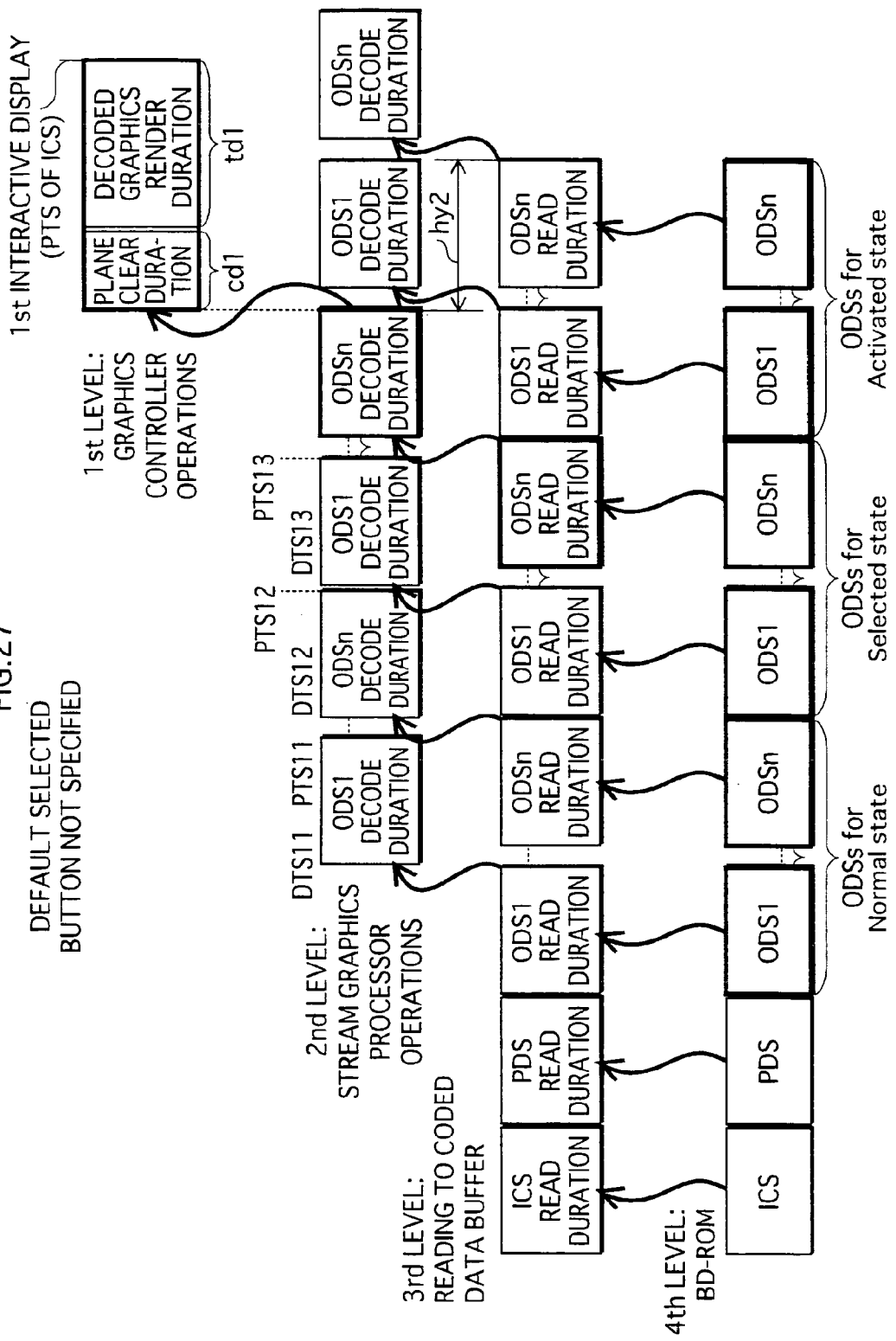
FIG. 27 a timing chart of the pipeline processing performed by the reproduction apparatus in the case where a default selected button is not specified.

The example in FIG. 26 relates to the case where a default selected button is specified. FIG. 27 is a timing chart showing the pipeline processing performed by the reproduction apparatus in the case where no default selected button is specified. In such a case, all of the graphics objects needed for presentation the initial display become available upon completion of decoding all the ODSs for the normal state and for the selected state, and loading the resulting objects to the graphics plane 8. With this arrangement, the initial interactive display is presented without waiting for completion of the decoding of the ODSs for the activated state. Thus, in comparison with the case where interactive display is presented only after all of the ODSs within the DS are decoded, the presentation is earlier by the duration hy2 shown in the figure.

This concludes the disruption of the internal structure of reproduction apparatus. Next, a description is given to implementation of the controller 20 and the graphics decoder 12. The controller 20 can be implemented by a general-purpose CPU executing a program of the steps shown by FIGS. 28 and 29. Hereinafter, a description is given to operations performed by the controller 20 with reference to FIGS. 28 and 29.

Figure 28:
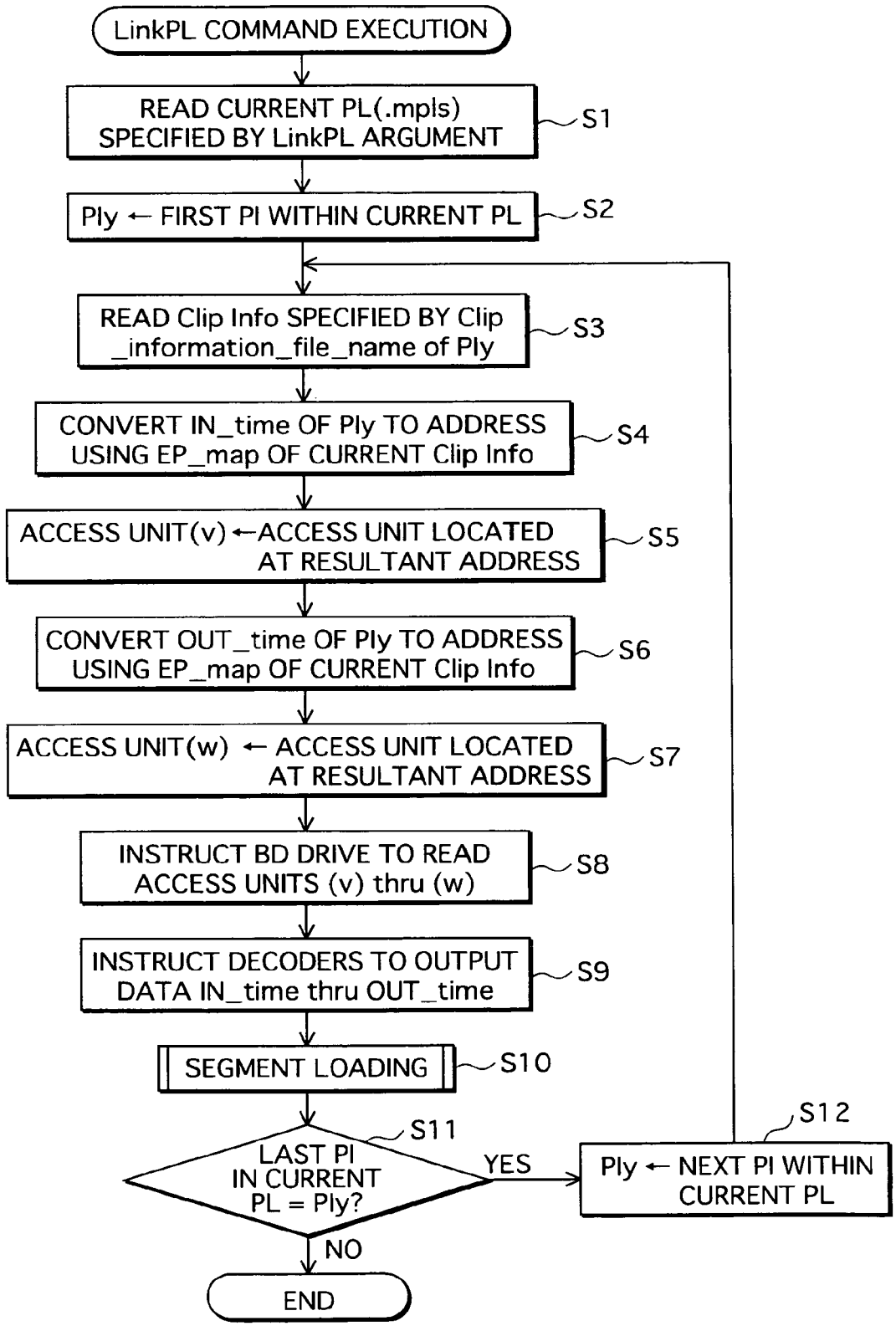
FIG. 28 is a flowchart of the operations of a controller 20 for executing a LinkPL function.

FIG. 28 is a flowchart of the operations performed by the controller 20 for executing a LinkPL function. Upon decoding a command including a LinkPL function, the controller 20 operates as shown in FIG. 20.

In this flowchart, the PlayItem and Access Unit to be processed are denoted as PI (y) and Access Unit (v), respectively. As shown in the flowchart, the reproduction apparatus reads the PL (.mpls) specified by the argument of the LinkPL (step S1), and designates the first PI in the current PL as a PI (y) (step S2). The reproduction apparatus then reads Clip information specified by the Clip_information_file_name field in the PI (y) (step S3).

Upon reading the Clip information, the reproduction apparatus converts the value of IN_time field within the PI (y) to an address using the EP_map included in the Clip information (step S4). The Access Unit specified by the resulting address is designated as an Access Unit (v) (step S5). The reproduction apparatus also converts the value of Out_time field to the address using the EP_map included in the Clip information (step S6). The Access Unit specified by the resulting address is designated as an Access Unit (w) (step S7).

Once the Access Units (v) and (w) are designated, the reproduction apparatus instructs the BD drive to read the Access Units from (v) through (w) (step S8), and also instructs the video decoder 5, the audio decoder 7, the graphics decoder 12 to decode the data residing at the addresses corresponding to the In_time through Out_time fields of the PI (y) (step S9).

In a step S11, an end judgment of this flowchart is made to see if the PI (y) is equal to PI (z). If the step S11 results in "YES", the processing of this flowchart is terminated. If not, the next PlayItem is designated as a new PI (y) (step S12), and the processing goes back to the step S3. The steps S1-S10 are repeated until the step S11 results in "YES".

In a step S10, a function segment is loaded to the coded data buffer 13 simultaneously with the reading of Access Units.

Figure 29:
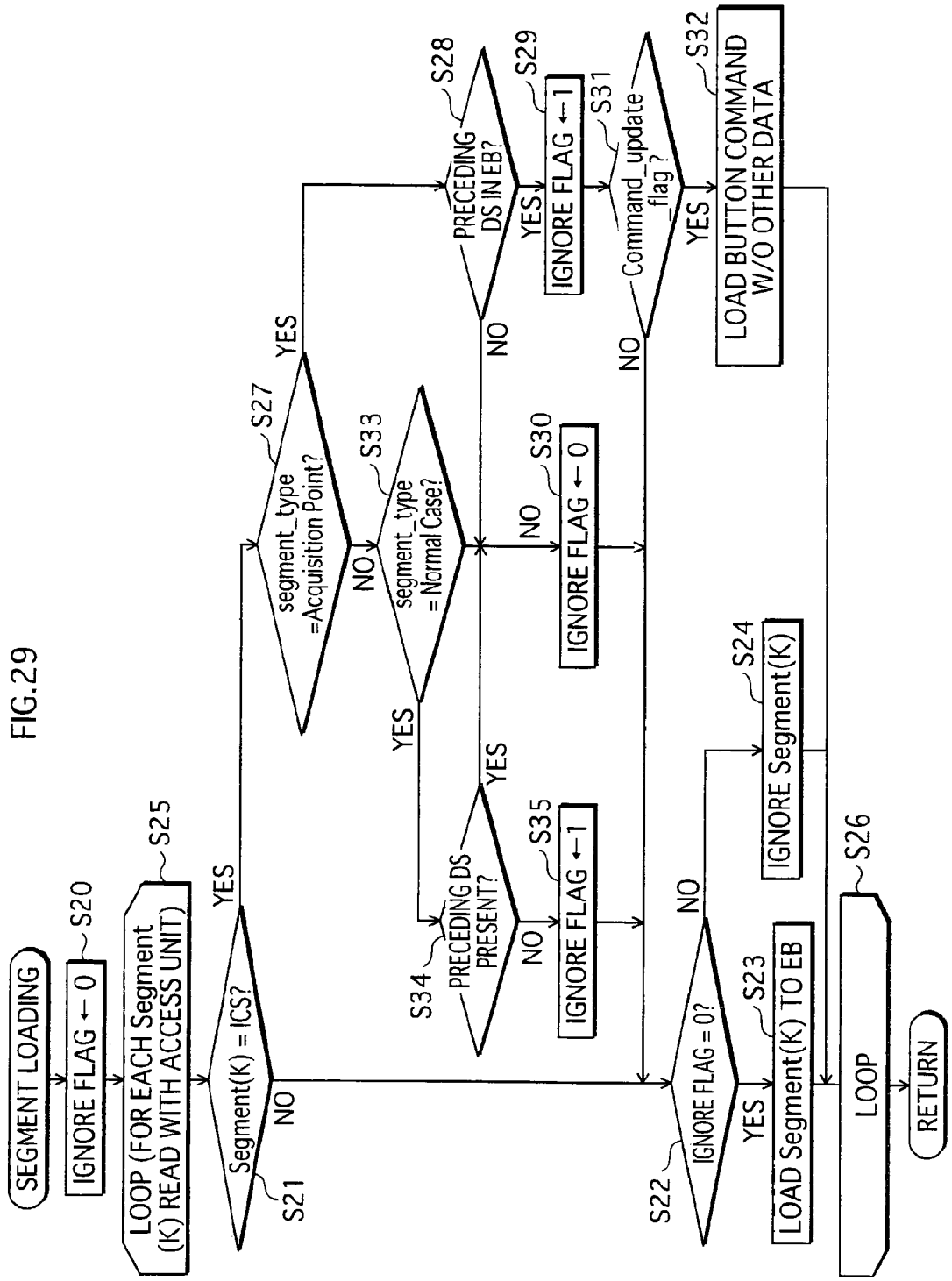
FIG. 29 is a flowchart of the load processing of functional segments.

FIG. 29 is a flowchart of the operations preformed for loading functional segments. In the flowchart, a Segment (K) is a variable indicating a segment (ICS, ODS, or PDS) read with an Access Unit, and an ignore flag indicates whether the Segment (K) is to be ignored or loaded. In this flowchart, after the ignore flag is initialized to 0 (step S20), a loop of steps S21 to S24 and S27 to S35 is performed for the Segment (K) (S25 and S26).

In the step S21, the reproduction apparatus judges whether the Segment (K) is an ICS. If the Segment (K) is an ICS, the processing goes to the judgments in the steps S27 and S28.

In the step S27, a judgment is made as to whether the segment_type field within the ICS is set to a value indicating an Acquisition Point DS. If the Segment (K) belongs to an Acquisition Point DS, the processing goes to the step S28. On the other hand, if the Segment (K) belongs to either an Epoch Start or Normal Case DS, the processing goes to the step S33.

In the step S28, a judgment is made as to whether the immediately preceding DS is stored in the coded data buffer 13. The step S28 is performed if the step S27 results in "YES". The immediately preceding DS is not stored in the coded data buffer 13 if a skip operation is performed. In this case, the presentation needs to be started from an Acquisition Point DS, so that the processing goes to the step S30 (S28: NO).

On the other hand, in the case where the immediately preceding DS is stored in the coded data buffer 13 (step S28: YES), the ignore flag is set to "1" (step S29), and the processing goes to the step S31.

In the step S31, a judgment is made as to whether the command_update_flag field is set to "1". If set to "1" (step S31: YES), the button command of the button information is loaded to the coded data buffer 13 while the other data is ignored (step S32). If the command_update_flag field is set to "0", the processing goes to the step S22. Consequently, the ICS indicating an Acquisition Point is ignored (step S24).

With the ignore flag set to "1", the step S22 results in "NO", so that all the functional segments belonging to an Acquisition Point DS is ignored.

In a step S33, a judgment is made as to whether the segment_type field within the ICS indicates a Normal Case DS. If the Segment (K) belongs to an Epoch Start DS, the ignore flag is set to "0" in the step S30.

If the ignore flag is set to "0" (Step S22: YES), the Segment (K) is loaded to the coded data buffer 13 (step S23).

On the other hand, if the Segment (K) belongs to a Normal Case DS, the processing goes to the step S34. Similarly to the step S28, in the step S34, a judgment is made as to whether the immediately preceding DS is stored in the coded data buffer 13. If the immediately preceding DS is stored, the ignore flag is set to "0" (step S30). If not, the ignore flag is set to "1" (step S35). With the ignore flag set as above, the functional segments belonging to a Normal Case DS are ignored if the immediately preceding DS is not stored in the coded data buffer 13 of the reproduction apparatus.

In the case where the auto_action_flag field in each piece of button information (1), (2), and (3) is set to "1", the three buttons go into the activated stated instead of the selected state, and the button commands (LinkPL (PL#21), LinkPL (PL#22), and LinkPL (PL#23)) within the pieces of button information are executed. Suppose, for example, PL#21, PL#22, and PL#23 to which the button commands are linked are butting and pitching scenes of baseball players, those scenes are reproduced upon a numeric input of a corresponding player number. Since the selection is made with an input of a player number, which is easy to recognize for users, the user operability is further enhanced.

Figure 30:
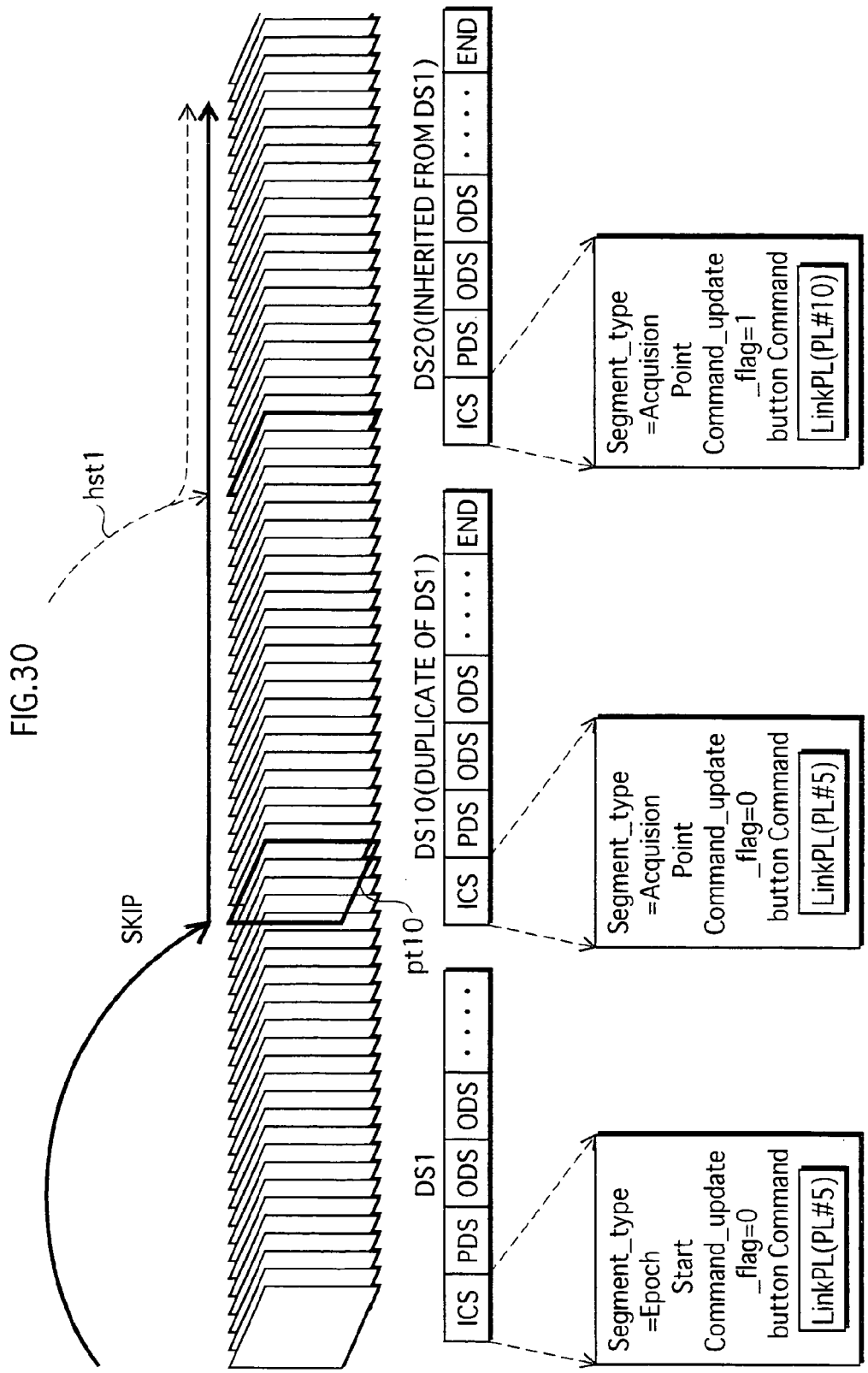
FIG. 30 is a view illustrating how the load processing is performed at the time of a skip operation.

Now, a description is given to how DSs are read in the example shown in FIG. 30. In this example, three DSs (DS1, DS10, and DS20) are multiplexed with video data. In the DS1, which is the first of the three DSs, the segment_type field shows Epoch Start, the command_update_flag field is set to "0", and the button command LinkPL (PL#5) is included.

The DS10 is a duplicate of the DS1. In the DS10, the segment_type field is set to a value indicating an Acquisition Point DS, the command_update_flag is set to "0", and the button command LinkPL (PL#5) is included.

The DS20 is inherited from the DS1 and its segment_type field value indicates an Acquisition Point DS. The DS20 differs from the DS1 in the button command (LinkPL (PL#10)), so that the command_update_flag is set to "1" to signal that the button command is different.

Figure 31:
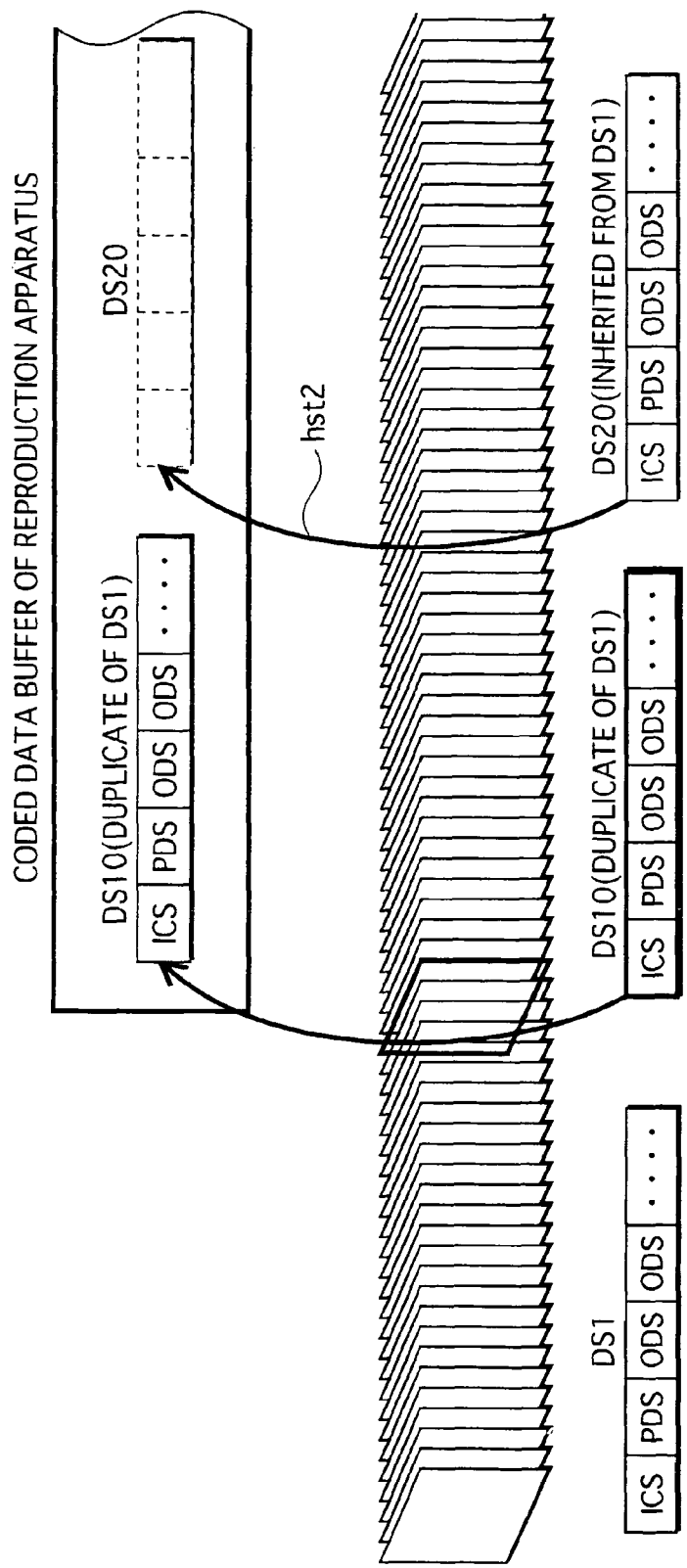
FIG. 31 is a view illustrating how a DS 10 is loaded to a coded data buffer 13 of the reproduction apparatus.

Suppose a skip operation is made to a picture pt10 in the AV Clip in which the above three DSs are multiplexed with video data. In such a case, the DS10 which is closest to the skip destination point is subjected to the processing shown in FIG. 29. Specifically, the judgment in the step S27 results in that the segment_type is an Acquisition Point DS, but the immediately preceding DS is not stored in the coded data buffer 13. Accordingly, the ignore flag is set to 0. As a result, the DS10 is loaded to the coded data buffer 13 as shown in FIG. 31. Suppose, on the other hand, a skip operation is made to a picture which is located at a later point than the DS10 (arrow hst1 in FIG. 30). In this case, the DS20 which follows the DS10 is loaded to the coded data buffer 13 (arrow hst2 in FIG. 31)).

Figure 32:
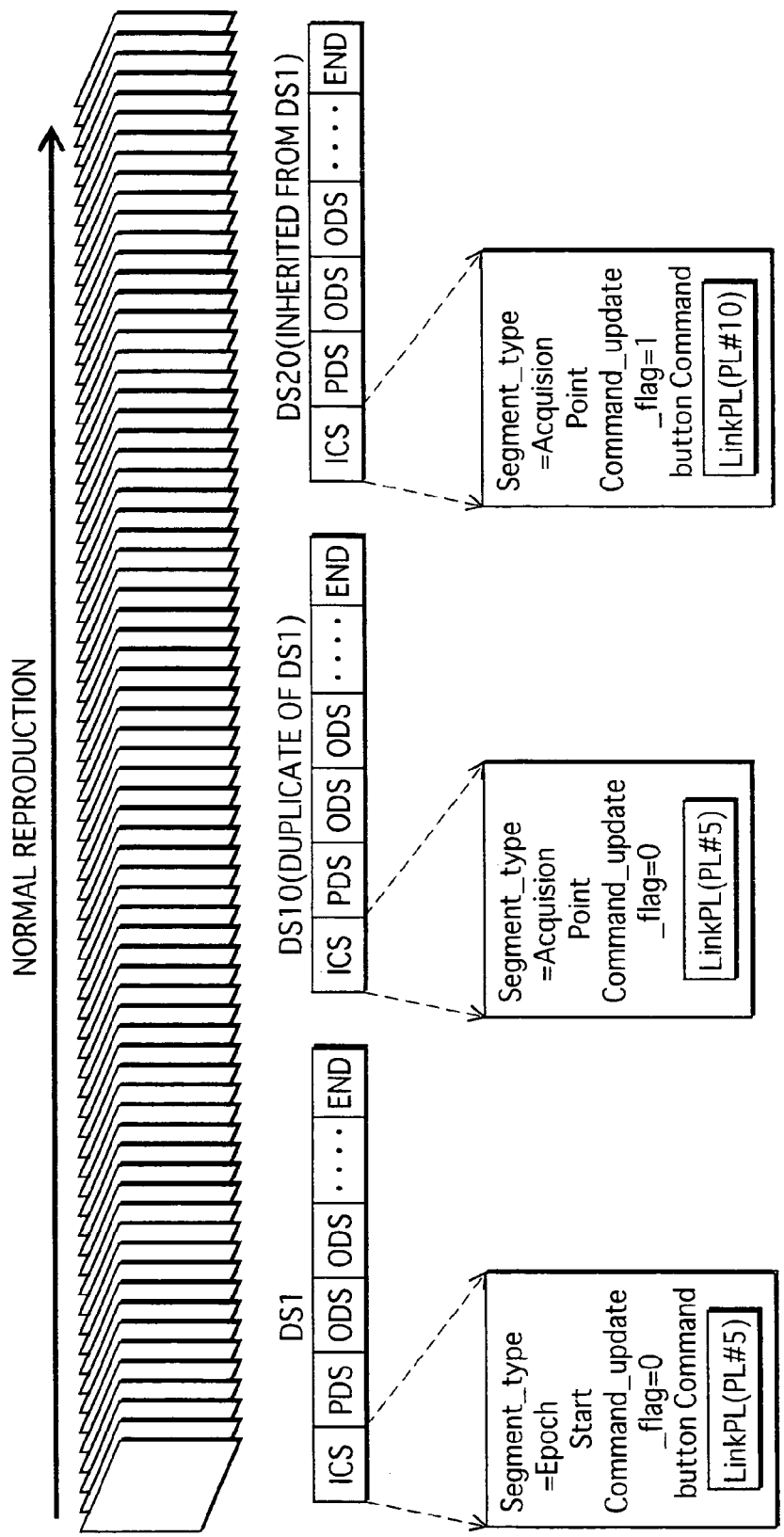
FIG. 32 is a view illustrating normal reproduction.
Figure 33:
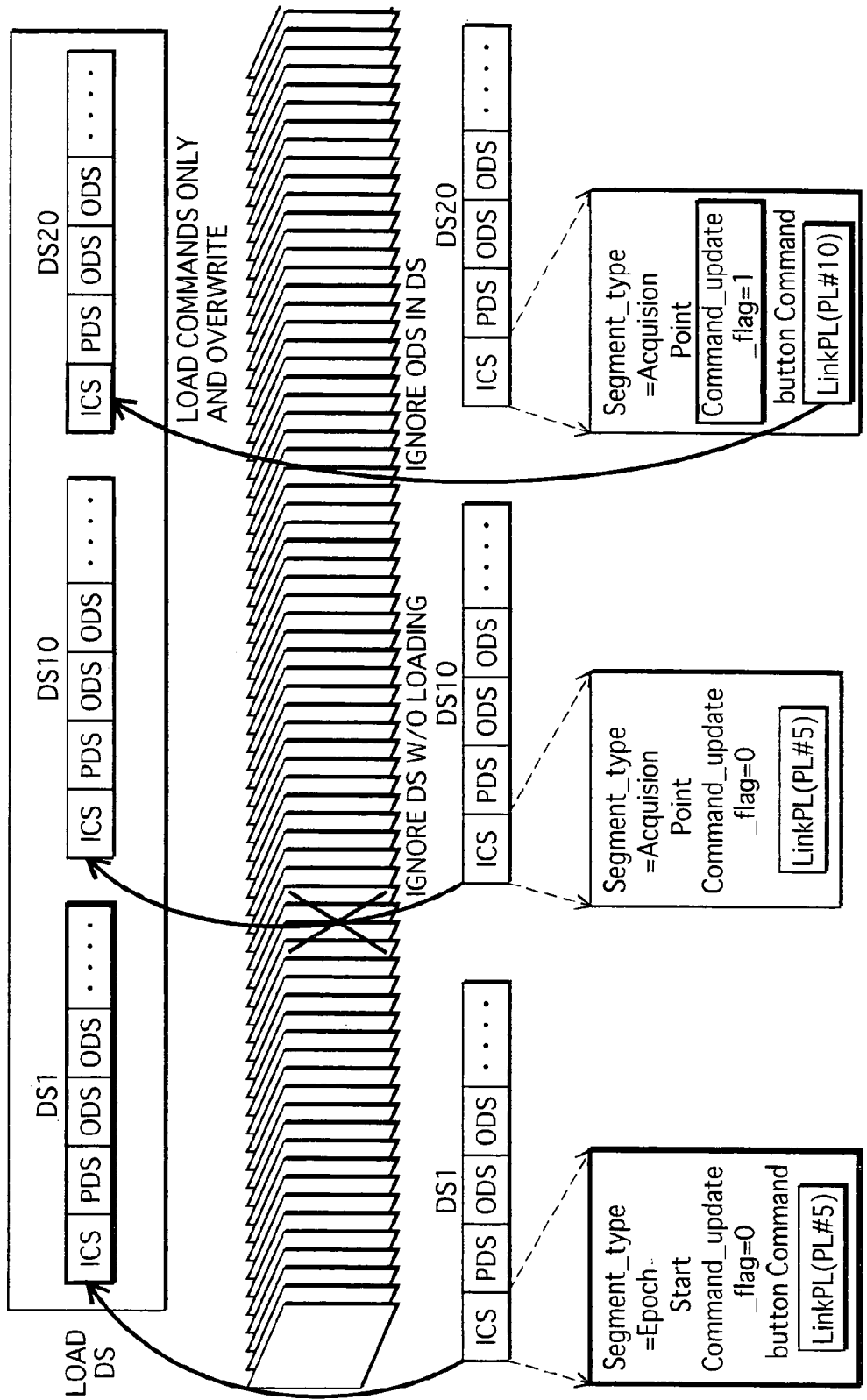
FIG. 33 is a view illustrating how DSs 1, 10, 20 are loaded when the normal reproduction is performed as illustrated in FIG. 32.

FIG. 33 shows how the DS1, DS10, and DS20 are loaded when normal reproduction is performed as shown in FIG. 32. Of the three DSs, the DS1 of which segment_type field shows an Epoch Start DS is loaded to the coded data buffer 13 (step S23). However, for the DS10 of which segment_type field shows an Acquisition Point DS, the ignore flag is set to "1" (step S29). Consequently, the functional segments of DS10 are not loaded to the coded data buffer 13 but ignored (step S24). As for the DS20, the segment_type field shows an Acquisition Point DS, but the command_update_flag is set to "1". Thus, the step 31 results in "YES". Consequently, the button command is loaded to the coded data Buffer 13, thereby replacing the currently stored button command within the ICS of the DS. Yet, the ignore flag is set to "1", and thus other data than the button command is not loaded but ignored.

With the above operations, by the time the DS20 is presented, the button command LinkPL (#5) associated with the same graphics as DS10 has been replaced by LinkPL (#10). With this replacement, such control is possible that the button command associated with the same button changes as the reproduction proceeds.

Figure 34:
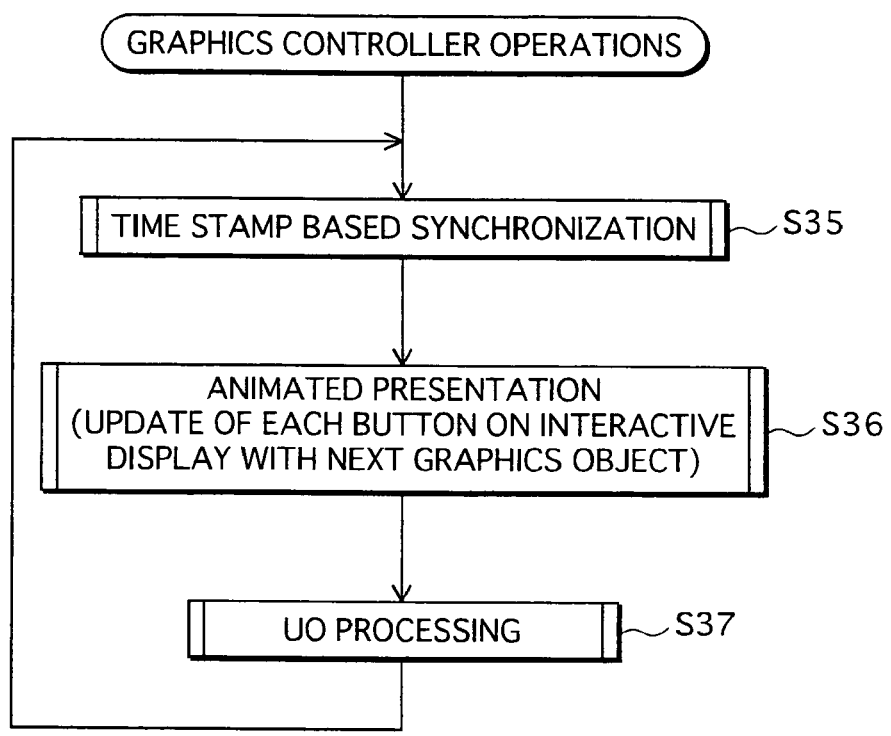
FIG. 34 is a flowchart of the main routine of processing performed by the graphics controller 17.

Next, a description is given to the processing performed by the graphics controller 17. FIG. 34 shows the main routine of the processing performed by the graphics controller 17. The flowchart shows that the following three operations are repeated: time stamp synchronization (step S35); animation presentation (step S36); and UO processing (step S37).

Figure 35:
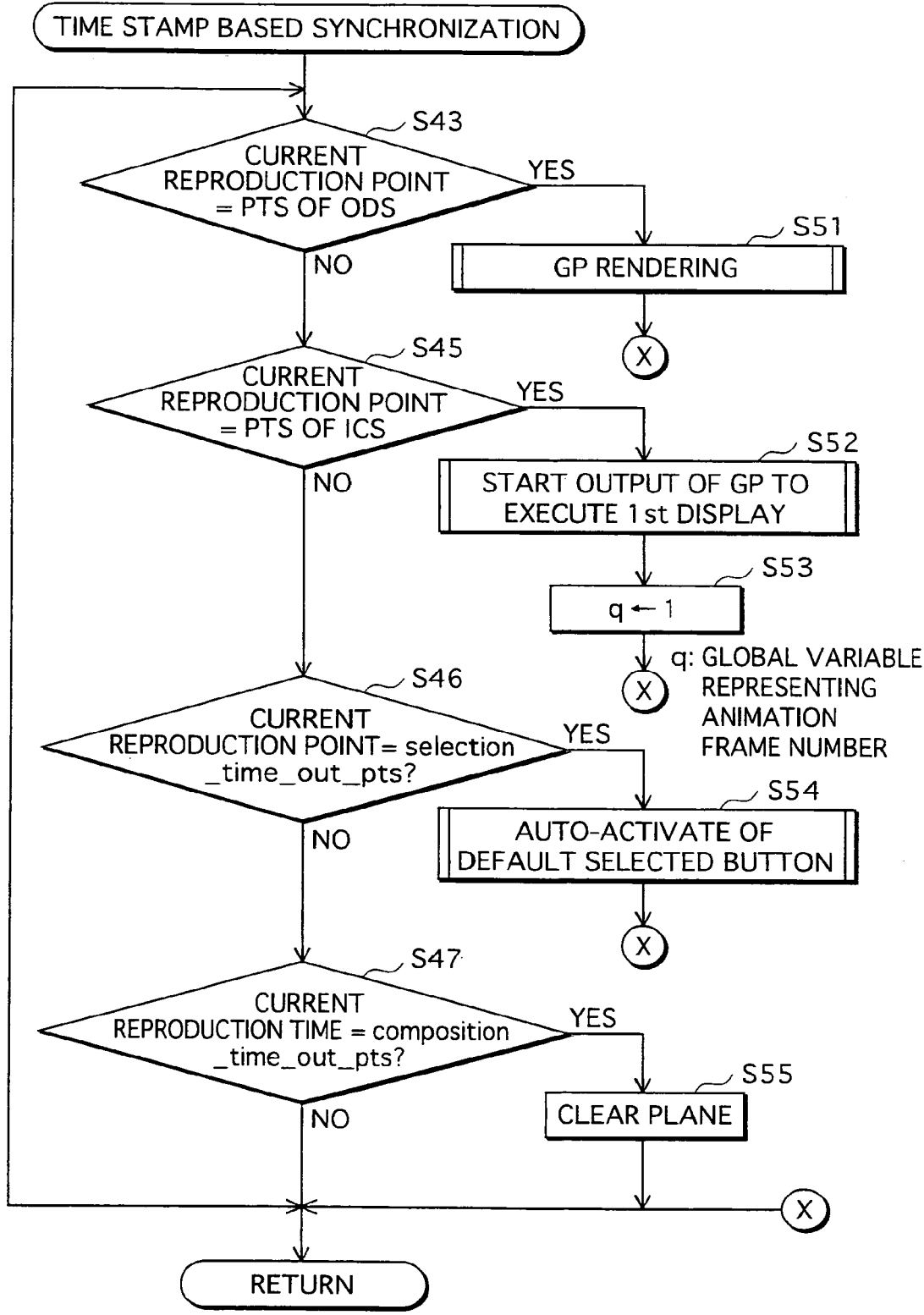
FIG. 35 is a flowchart of the synchronization control based on time stamps.

FIG. 35 is a flowchart of the synchronization control carried out based on the time stamps. In the flowchart, judgments are made in the step S43-S47 as to whether specific events have occurred. An occurrence of each event calls a respective subroutine which retunes to the main routine after predetermined steps are performed.

In the step S43, a judgment is made as to whether the current reproduction point has reached the time shown by the PTS of the ODS. If judged in the affirmative, the rendering to the graphics plane 8 is performed (step S51), and then the processing goes back to the main routine.

In the step S45, a judgment is made as to whether the current reproduction point has reached the PTS of the ICS. If judged in the affirmative, the graphics plane 8 is started to output the stored content. The output is made to the CLUT unit 9 where color conversion is made. After the color conversion, the interactive compotation is overlaid with the content stored in the video plane 6, thereby an initial interactive display is presented (step S52). Then, a variable q is set to the value "1" (step S53), and the processing returns to the main routine. Note that the variable q is a global variable (i.e. variable valid throughout a plurality of flowcharts) and its meaning is described later.

In the steps S46 and S47, judgments are made as to whether the current reproduction point has reached the time specified by the time information within the ICS.

In the step S46, the judgment is made as to whether the current reproduction point has reached the time shown by the selection_time_out_pts. If the judgment results in the affirmative, the button specified by the default_activated_button_number is activated, and then the processing goes back to the main routine (step S54).

In the step S47, the judgment is made as to whether the current reproduction point has reached the time specified by the composition_time_out_pts. If the judgment results in the affirmative, the processing retunes to the main routine after clearing the graphics plane (step S55). This concludes the description of the synchronization based on the time stamps. In the synchronization, the steps 51 and 54 call subroutines. The subroutine of the step S51 is described below with reference to FIG. 36.

Figure 36:
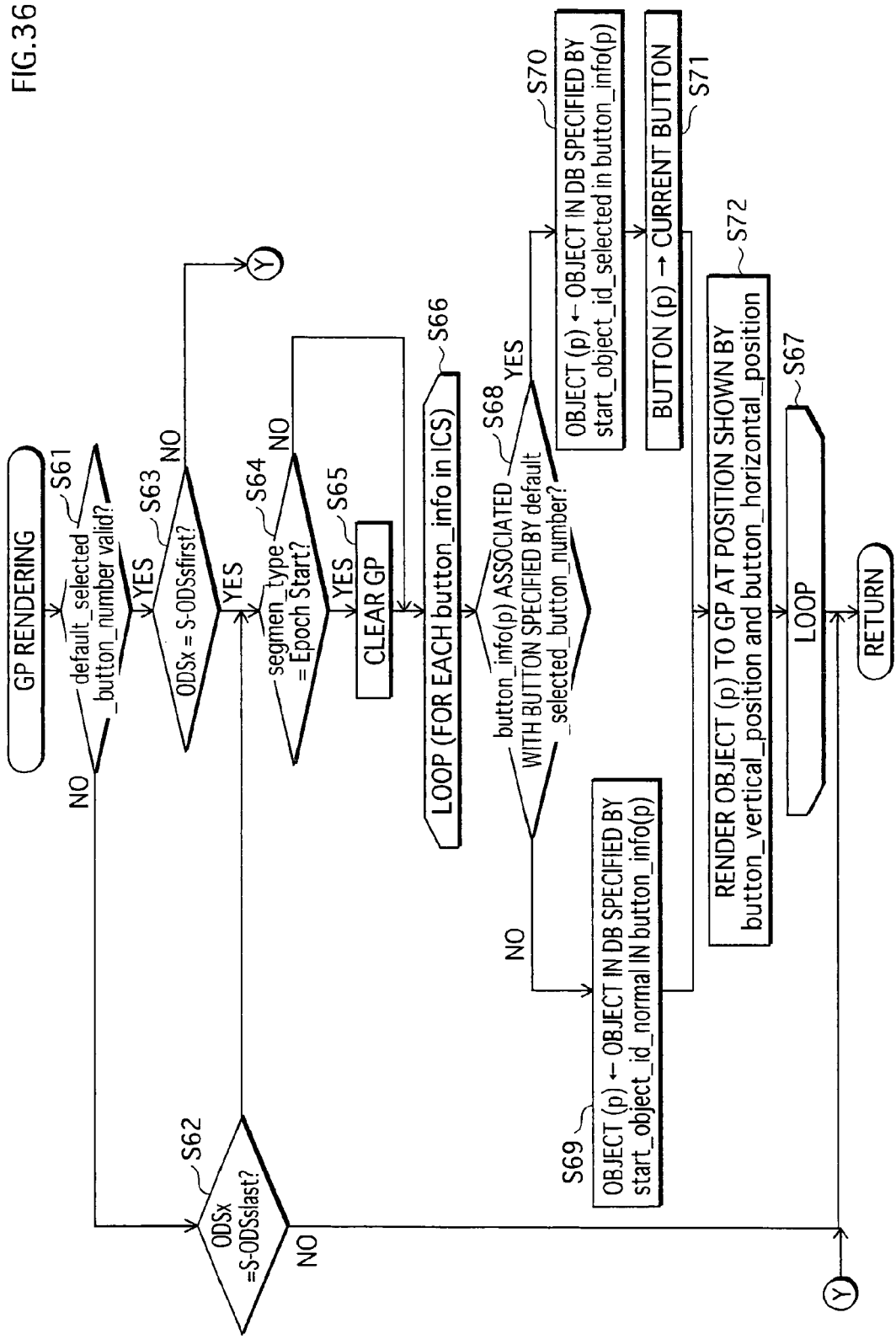
FIG. 36 is a flowchart of the rendering to the graphics plane 8.

FIG. 36 is a flowchart of the rendering to the graphics plane 8. The rendering to the graphics plane 8 needs to be completed before the presentation of initial interactive display. In the figure, the ODSx represents the ODS having the PTS corresponding to the current reproduction point, which is shown by the PRS(10). Insteps S61-S63, judgments are made as to whether the ODS is the last one of the ODSs necessary for the initial interactive display. If the ODS is the last one, the steps S64-S72 are performed.

In the step S61, a judgment is made as to whether the default_selected_button_number field has a valid value. If it is valid, a judgment is made in the step S63 as to whether ODSx is S-ODSsfirst. If the step S63 results in "NO", the processing of this flowchart is terminated and returns to the main routine.

If the step S61 results in "NO", a judgment is made in the step S62 as to whether the ODSx is S-ODSslast. If the step S62 results in "NO", the processing of this flowchart is terminated and returns to the main routine.

In the step S64, a judgment is made as to whether the segment_type field within the ICS shows an Epoch Start DS. If an Epoch Start DS is shown, the step S65 is performed to clear the graphics plane 8, and the steps S66-72 are performed. The duration taken for clearing the graphics plane 8 is the duration cd1 shown in FIGS. 23 and 24. If the segment_type field does not show an Epoch Start DS, the step S65 is skipped to the steps S66-72.

The steps S66-S72 form a loop in which each piece of button information in the ICS is sequentially processed (steps S66 and S67). In the loop, the current piece of button information to be processed is denoted as button_info (p). In the step S68, a judgment is made as to whether the button_info (p) corresponds to a default selected button specified by the default_selected_button_number.

If the button_info (p) does not corresponding to the default selected button, out of the graphics objects stored in the object buffer 15, the one specified in the start_object_id_normal field of the button_info (p) is designated as the graphics object (p) (step S69).

On the other hand, if the button_info (p) corresponds to the default selected button, out of the graphics objects stored in the object buffer 15, the one specified by the start_object_id_selected field of the button_info (p) is designated as the graphics object (p) (step S70). Then, the button (p) is designated as the current button (step S71). The current button refers to the one having the selected state in the currently presented interactive display. The reproduction apparatus stores the ID of the current button in the PRS(10).

Once the graphics object (p) is designated through the steps S69 and S70, the graphics object (p) is rendered onto the graphics plane 8 at the position shown by the button_horizontal_position and button_vertical_position fields (step S72). The above processing is repeated for each piece of button information within the ICS. In doing so, of a plurality of graphics objects associated with each button state, the first graphics object is rendered for each button on the graphics plane 8. The duration taken for rendering all the graphics object stored in the object buffer 15 is the duration td1 shown in FIGS. 23 and 24. This concludes the description of the step S51. Next, with reference to FIG. 37, a description is given to the subroutine called in the step S54.

Figure 37:
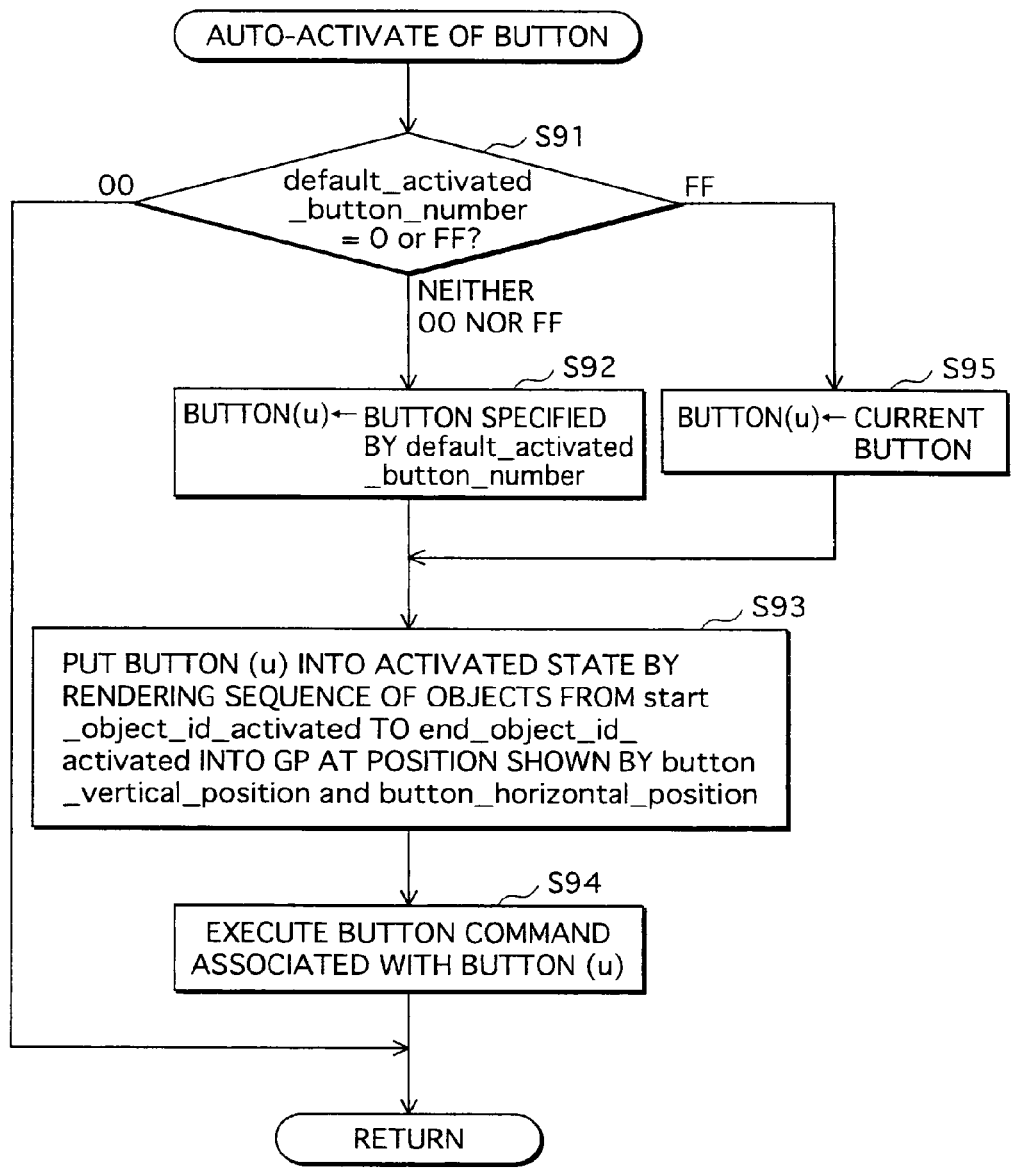
FIG. 37 is a flowchart of the processing for automatic activation of a default selected button.

FIG. 37 is a flowchart of the processing for automatic activation of the default selected button. First of all, a judgment is made as to whether the default_activated_button_number field is set to "00" or "FF" (step S91). If the field is set to "00", the processing returns to the main routine without performing any operation. On the other hand, if the default_activated_button_number is set to "FF", the current button is designated as the button (u) (step S95).

If the field value is neither "00" nor "FF", the button specified by the default_activated_button_number field is designated as the button (u) (step S92) and activates the button (u) (step S93). This button state transition is carried out by rendering the sequence of graphics objects from the one specified by the start_object_id_activated field and to the one specified by the end_object_id_activated field in the button_info (u). The rendering position on the graphics plane 8 is shown by the button_horizontal_position and button_vertical_position fields. Then, the button command associated with the button (u) is executed (step S94), and the processing returns to the main routine.

With the above operations, the button in the selected state goes into the activated state at the end of a predetermined duration. This concludes the description of the flowchart shown in FIG. 37.

Figure 38:
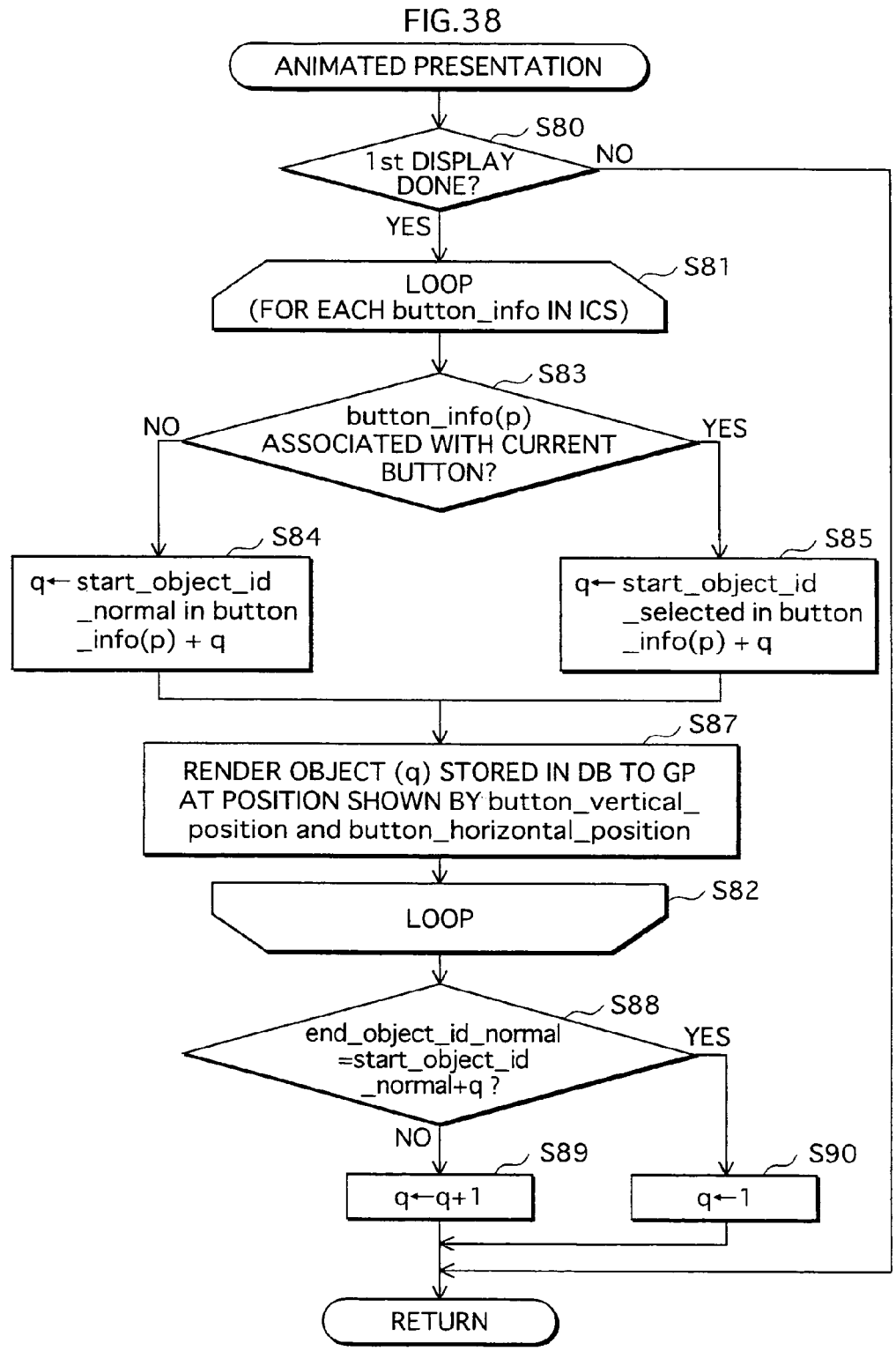
FIG. 38 is a flowchart of the processing for animated presentation.

Next, a description is given to the animated presentation of buttons in the menu (step S36). FIG. 38 is a flowchart of the processing for animated presentation.

The initial display has been presented by rendering onto the graphics plane 8, the graphics objects specified in the start_object_id_normal and start_object_id_selected fields of each piece of button_info. To present the buttons in animation, for each iteration of the loop of the steps S35-S37, the graphics plane 8 is updated by overwriting each button with an arbitrary frame (the (q)th graphics object) of the button. To be more specific, the update is made to the graphics plane 8 by sequentially rendering the graphics objects specified by the normal_state_info and selected_state_info in each piece of button_info. Here, the variable q is used to refer to an individual graphics object specified in the normal_state_info and selected_state_info fields in each piece of button information.

Now, a description is given to the processing for making the animated presentation, with reference to FIG. 38. In the flowchart, the rendering processing is described on the precondition that animation of every button is presented with the same number of frames. This is for the sake of simplicity in the description. The presentation of buttons with different numbers of frames requires more complex processing. Further, also for the sake of simplicity in the description, the repeat_normal_flag and repeat_selected_flag fields are both assumed to be set to the value requiring the animation to be continuously repeated.

In a step S80, a judgment is made as to whether the initial display has been presented. If the initial display has not yet presented, the processing returns to the main routine without performing and operation. If the initial display has been presented, steps S81-S90 are performed. The steps S81-S90 form a loop in which the steps S83-S87 are repeated for each piece of button_info included in the ICS (steps S81 and S82).

In the step S83, a judgment is made as to whether the button_info (p) corresponds to the current button.

If the button_info (p) does not correspond to the current button, the variable q is added to the value of start_object_id_normal in the button_info (p) to obtain an ID (q) (step S84).

If the button_info (p) corresponds to the current button, the variable q is added to the value of start_object_id_selected field in the button_info (p) to obtain an ID (q) (step S85).

Out of the graphics objects stored in the object buffer 15, the graphics object (q) is rendered onto the graphics plane 8 at the position specified by the button_horizontal_position and the button_vertical_position fields of the button_info (p) (step S87). The above operations are repeated for every piece of button_info within the ICS (steps S81 and S82).

Through the above loop, among the graphics objects for presentation of the current button in the selected state and other buttons in the normal state, the (q)th graphics objects are rendered on the graphics plane 8 for each button.

In the step S88, a judgment is made as to whether the value of the end_object_id_normal field has reached the value obtained by the start_object_id_normal field+q (step S89). If judged in the affirmative, the variable q is initialized to "0" and the processing returns to the main routine (step S89). If judged in the negative, the variable q is incremented by 1, and the processing returns to the main routine (step S90).

Through the steps S80-S90, the presentation of each button on the interactive display is updated using a new graphics object each time the loop of steps S35-S37 is executed. By repeating the steps S35-S37 for multiple times, each button is presented in animation. When presenting the buttons in animation, the graphics controller 17 makes the adjustment so as to present the graphics objects at the rate shown by the animation_frame_rate_code. Such adjustment is made also in the other flowcharts when applicable. This concludes the description of processing for animated presentation. Next, a description is given to the UO processing shown in the step S37 of the main routine, with reference to FIG. 39.

Figure 39:
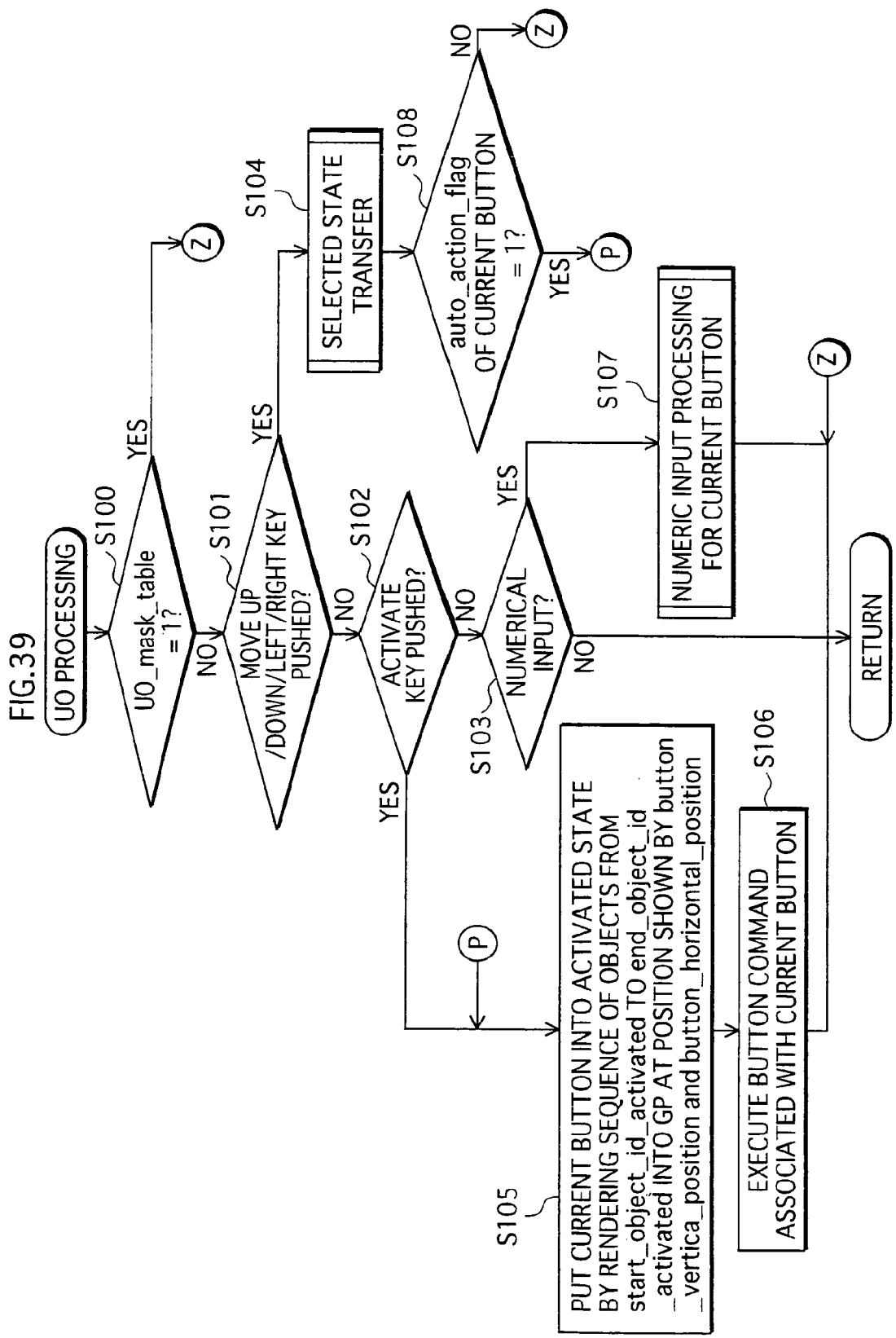
FIG. 39 is a flowchart of the UO processing.

FIG. 39 is a flowchart of the UO processing. In the flowchart, judgments are made in steps S100-S103 as to whether specific events have occurred. An occurrence of each event calls a respective subroutine which returns to the main routine after predetermined steps are performed. In the step S100, a judgment is made as to whether the UO_mask_table field is set to "1". If the filed is set to "1", the processing returns to the main routine without performing any operation.

In the step S101, the judgment is made as to whether any of the Move Up, Down, Left, and Right keys is pushed. At a push of any of the keys, another button is designated as the current button accordingly (step S104), followed by the judgment as to whether the auto_action_flag of the newly designated current button is set to "01" (step S108). If the auto_action_flag is not set to "01", the processing returns to the main routine. On the other hand, if the auto_action_flag is set to "01", the processing goes onto the step S105.

In the step S102, a judgment is made as to whether the Activate key is pushed. At a push of the Activate key, the current button is activated in the step S105. This button state transition is carried out by rendering onto the graphics plane 8 the sequence of graphics objects from the one specified by the start_object_id_activated field and the one specified by the end_object_id_activated field of the current button. The rendering position in the graphics plane 8 is specified by the button_horizontal_position and the button_vertical_position fields of the current button. With this arrangement, such control is realized that the character serving as a button appears to make motion in response to a user operation. After the button state transition, the button command associated with the current button is executed (step S106).

Figure 40:
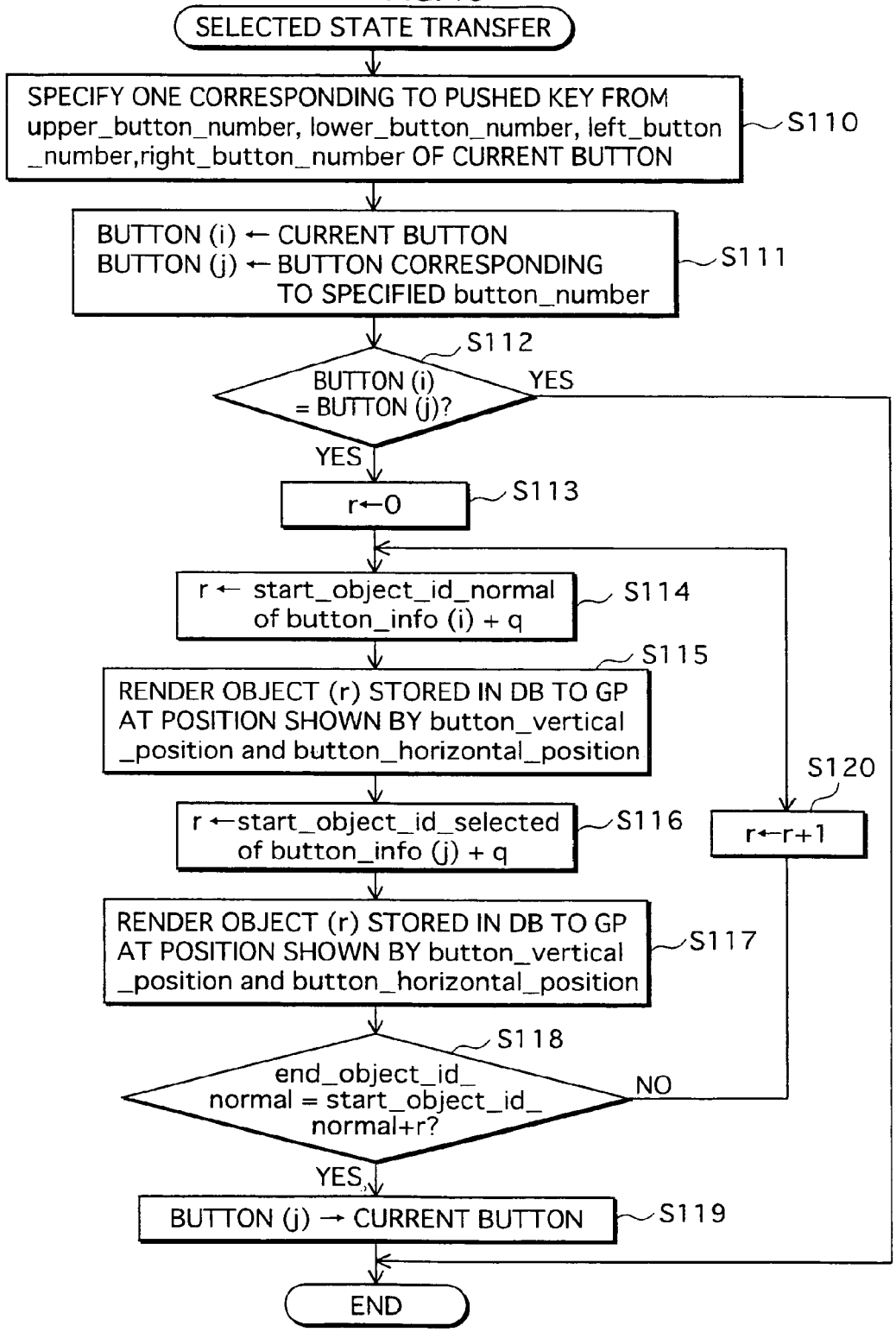
FIG. 40 is a flowchart of the current button change processing.
Figure 41:
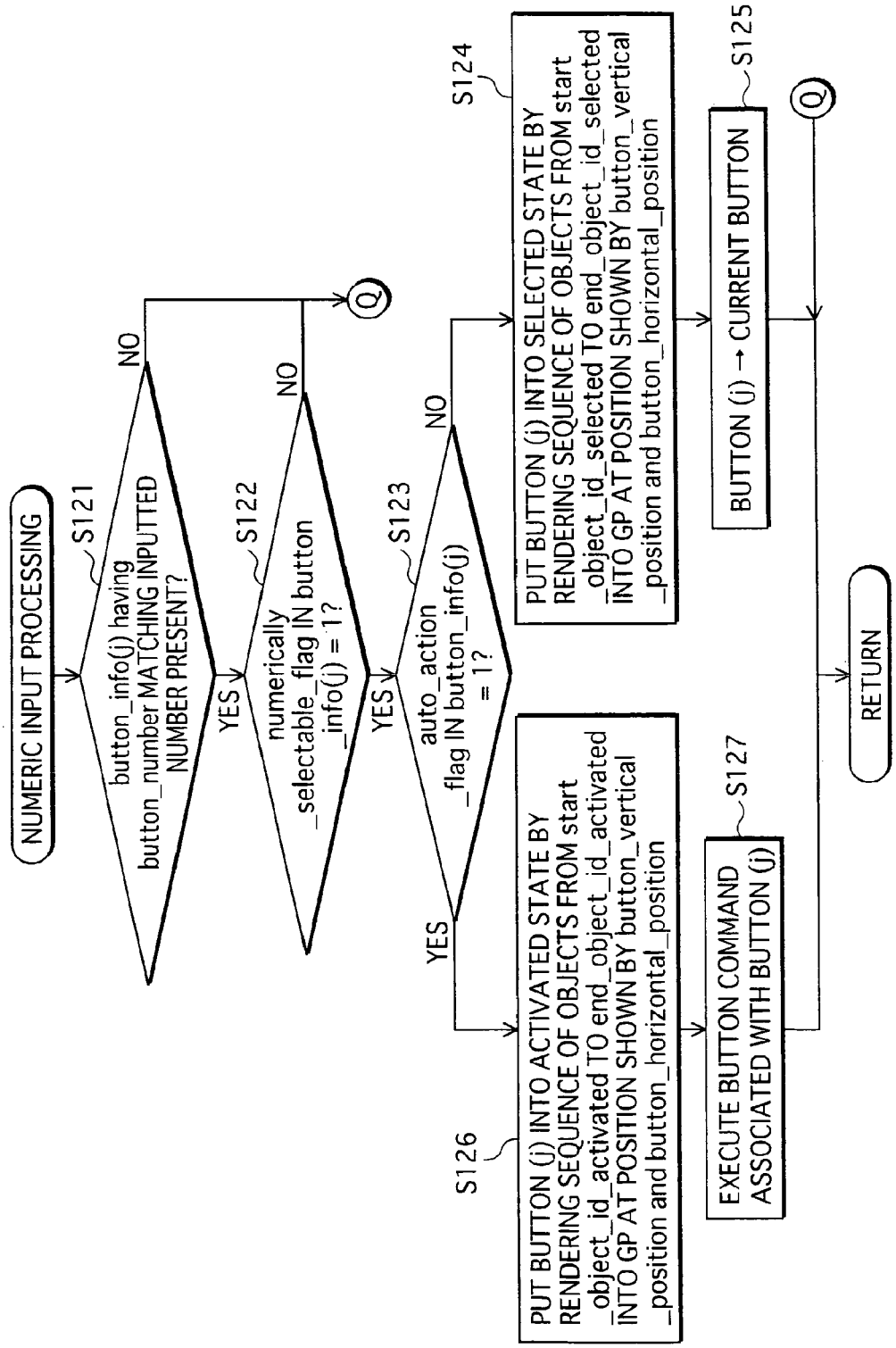
FIG. 41 is a flowchart of the numeric input processing.

In a step S103, a judgment is made as to whether a numeric input is made. If a numeric input is made (step S107), operations are performed according to the inputted numeral (step S107), and the processing returns to the main routine. In FIG. 39, the steps S104 and S107 each call a subroutine. FIGS. 40 and 41 show the subroutines. Now, a description is given to those flowcharts.

FIG. 40 is a flowchart of the current button change processing. The flowchart is described on the precondition that animation of every button is presented with the same number of frames. This is for the sake of simplicity in the description. The presentation of buttons with different numbers of frames requires more complex processing. First, it is determined which of upper_button_number, lower_button_number, left_button_number, and right_button_number in the neighbor_info of the current button corresponds to the pushed key (step S110).

Let the button (i) denote the current button and the button (j) denote the button to be designated next as the current button (step S111). In a step S112, a judgment is made as to whether the button (j) designated in the step S111 is equal to the button (i). If so, the processing returns to the main routine without performing any operation. If not, steps S113-S120 are performed. In the steps S113-S120, the button (j) is put into the selected state and the button (i) is put back to the normal state. Each button state is presented in animation. To this end, a variable r is first initialized to "0". The variable r is used to refer to an individual frame of the animation. In the step S113-S119, the (r)th one of the graphics objects associated with the button (i) in the normal state and the (r)th one of the graphics objects associated with the button (j) in the selected state is repeatedly rendered onto the graphics plane.

Specifically, the ID(r) is calculated by adding the variable r to the value of the start_object_id_normal field of button info (i) (step S114). After calculating the ID(r) in the above manner, out of the graphics objects stored in the object buffer 15, the one having the ID(r) is rendered onto the graphics plane 8 at the position shown in the button_horizontal_position and button_vertical_position fields of the button_info(i) (step S115).

Next, the ID (r) is then calculated by adding the variable r to the value of the start_object_id_selected field of the button info (j) (step S116). After obtaining the ID(r) in the above manner, out of the graphics objects stored in the object buffer 15, the one having the ID(r) is rendered onto the graphics plane 8 at the position shown in the button_horizontal_position and button_vertical_position fields of the button_info(j) (step S117).

In the step S118, a judgment is made as to whether the ID obtained by adding the variable r to the value of start_object_id_normal field is equal to the value of end_object_id_normal field. If the values are not equal, the variable r is incremented (step S120), and the processing goes back to the step S114. The steps S114-S120 are repeated until the judgment in the step S118 results in "YES". By repeating the above steps, the button state transition is achieved such that characters serving as buttons make motion in response to a user operation. When the judgment in the step S118 results in "YES", the button (j) is now designated as the current button (step S119) and the processing returns to the main routine.

FIG. 41 is a flowchart of the numeric input processing. First, a judgment is made as to whether there is a piece of button_info (j) having the button_number matching the inputted numeral (step S121). Next, a judgment is made as to whether the numerically_selectable_flag field in the button_info (j) is set to "1" (step S122). If both the steps S121 and S122 result in "YES", a judgment is made as to whether the auto_action_flag field in the button_info (j) is set to "01" (step S123).

If the auto_action_flag field value is not "01", the sequence of graphics objects from the one specified by the start_object_id_selected field to one specified by the end_object_id_selected field associated with the button (j) is sequentially rendered at the position specified by the button_horizontal_position and button_vertical_position fields associated with the button (j) (step S124). As a result, the button (j) is put into the selected state. Then, the button (j) is designated as the current button (step S125), and the processing returns to the main routine.

On the other hand, if the auto_action_flag field value is "01", the current button is activated in the step S126. This button state transition is carried out by sequentially rendering the sequence of graphics objects from the one specified by the start_object_id_activated field to the one specified by the end_object_id_activated field associated with the current button onto the graphics plane 8 at the position specified by the button_horizontal_position and button_vertical_position fields associated with the current button. In a step S127, the button command associated with the button (j) is executed, and the processing returns to the main routine.

If either of the steps S121-S123 results in "NO", the processing returns to the main routine.

This concludes the processing performed by the graphics controller 17 for synchronous display. For presentation of interactive display, such as popup display, triggered by a user operation, the stream graphics processor 14 and the graphics controller 17 perform the following operations, which are similar to those performed for synchronous display. By doing so, the graphics plane 8 obtains necessary graphics objects. After obtaining the graphics objects, no operation is performed until the current reproduction point reaches the time specified by the PTS attached to the ICS. If the UO controller 18 receives a user operation of a menu call after the current reproduction point has passed the time specified by the PTS, the graphics objects stored in the graphics plane 8 are outputted to the CLUT unit 9 where the outputted graphics objects are overlaid with the video plane. The output performed in synchronization with the UO leads to presentation of the Popup display in response to the menu call.

As described above, according to the present embodiment, Epochs each composed of an ICS and ODSs are multiplexed in an AV Clip. With such an AV Clip, interactive control is readily described such that the reproduction apparatus performs a specific operation in synchronization with the presentation of a specific frame of the video. In short, the AV Clip of the present invention is suitable for describing interactive control closely bound to the presentation timing of video frames. Furthermore, since the Epochs are multiplexed within the AV Clip, even when reproduction of hundreds of video segments is requested, it is not necessary to store all the related Epochs to the memory. Epochs are sequentially read from the BD-ROM with video packets. Thus, the ICS associated with the video segment currently reproduced stays resident in the memory throughout the duration of that video segment. Upon completion of the video segment, the Epoch having been reproduced is removed from the memory and an ICS corresponding to the next video segment is then loaded to the memory. Since the Epochs are multiplexed in the AV Clip, the required size of memory is kept to a minimum even if the number of Epochs exceeds several hundreds.

Second Embodiment

A second embodiment of the present invention relates to the improvement on a click sound reproduced at the time when the button state is changed to the selected state and the activated stated. Suppose, for example, a user interact with the characters appearing in the movie serve as buttons as shown in FIGS. 16 and 17. In such a case, if the voice of a respective character is reproduced as a click sound in response to the user operations, the user can instinctively recognize which of the buttons the user is operating. With this arrangement, it is easier for users to recognize the button operations. Here, a problem arises as to how to simultaneously reproduce the click sound and the main sound. The main sound used herein refers to the sound of the movie, such as the speech of the characters and background music in the movie. The audio stream carrying the main sound is multiplexed into the AV Clip with the video and graphics streams. The audio decoder 7 decodes the audio stream. At the time of reproducing the click sound, the main audio needs to be muted. To this end, the operations of audio decoder 7 need to be suspended. However, the suspension of audio decoder 7 involves the risk of producing noise.

Figure 42:
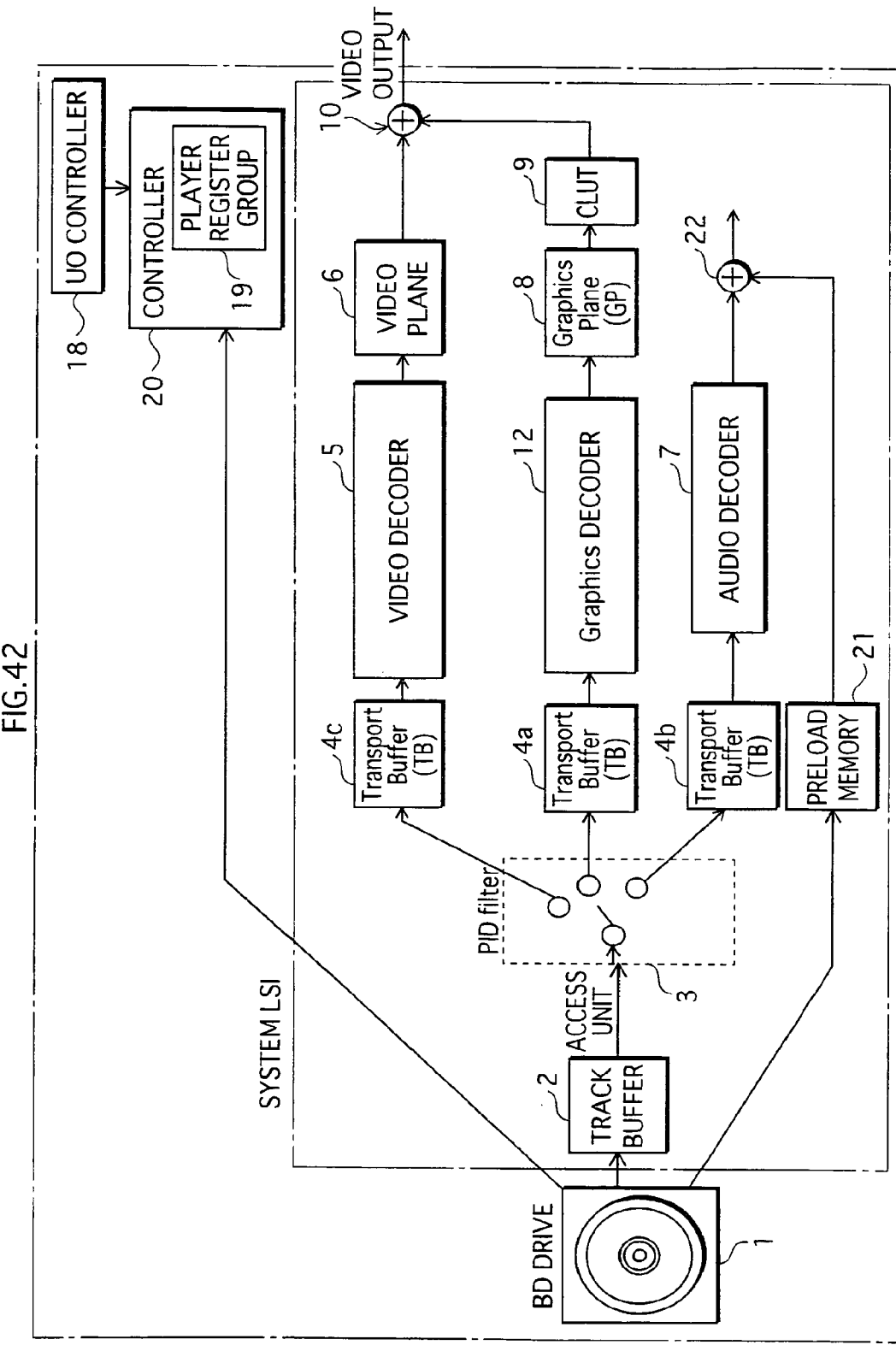
FIG. 42 is a view showing an internal structure of the reproduction apparatus capable of producing a click sound.

In order to avoid the production of noise due to the suspension of audio decoder 7, the reproduction apparatus has the internal structure as shown in FIG. 42. The structure shown in this figure is similar to the one shown in the FIG. 25 with the addition of a preload memory 21 and a mixer 22.

The preload memory 21 stores in advance uncompressed LPCM data to be reproduced as s click sound.

The mixer 22 mixes the uncompressed LPCM data stored in the preload memory 21 with the output of the audio decoder 7. The data is mixed at the rate instructed by the graphics controller 17 included in the graphics decoder 12 (see FIG. 25). Since a click sound is reproduced in accordance with the mixing parameters, it is not necessary to suspend the output of audio decoder 7.

This concludes the description of the reproduction apparatus structure according to the second embodiment.

In order to simultaneously reproduce the main sound and the click sound, the decompressed LPCM data recorded on the BD-ROM needs to be loaded to the preload memory 21 in advance. Unfortunately, however, the size of decompressed LPCM data is relatively large. For example, less than ten seconds of 16-bit/48 kHz LPCM audio data has the size of one megabyte.

Figure 43:
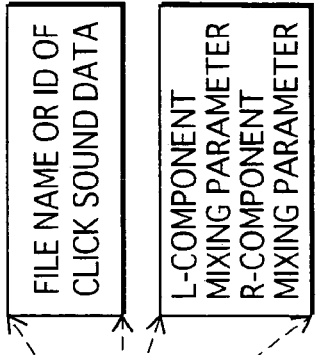
FIG. 43 is a view showing a data structure of an ICS for reproducing a click sound.

In order to meet the demands for reducing the size of preload memory 21, the ICS according to the present invention has the data structure as shown in FIG. 43. FIG. 43 shows the data structure of ICS for reproducing the click sound in the above manner. The data structure in the figure differs from the one shown in FIG. 11 in the button_info. In each piece of button info, the selected_state_info( ) and the activated_state_info( ) each additionally have "audio_specification_info" field and "audio_reproduction_control_info" field.

The audio_specification_info field shows a file name or ID of audio data to be read and reproduced as a click sound by the reproduction apparatus when the button associated with the button_info is put into a different state. The click sound data to be loaded to the preload memory 21 is specified by the selected_state_info( ) and activated_state_info( ) of the button_info. The click sound data loaded to the preload memory is supplied to the mixer 22.

The audio_reproduction_control_info is composed of a plurality of mixing parameters. Each mixing parameter shows the rate at which each audio component is to be mixed with the main sound. Each mixing parameters takes on a value within a range of 0-1.0. The click sound data is multiplied by the values shown by the mixing parameters before being reproduced. In the case where the audio data is composed of R and L components, the audio_reproduction_control_info field shows separate mixing parameters for R and L components, so that the mixer 22 is instructed to mix the audio data at the mixing rates shown by those parameters.

With the provision of the audio_reproduction_control_info, the L component of the uncompressed LPCM data may represent the click sound of button A, while the R component representing the click sound of button B. In this way, two different click sounds for two different buttons may be collectively stored as one piece of uncompressed LPCM data.

In addition to the collectively stored click sounds as described above, the button_info (1) includes the audio_reproduction_control_info set for output of the R component only, whereas the button_info (2) includes the audio_reproduction_control_info set for output of the L components only. With this arrangement, simultaneously with the state transition of the button A to the selected state, the L component of uncompressed LPCM data is reproduced according to the audio_reproduction_control_info of the button_info (1), so that the click sound of button A is reproduced.

Similarly, simultaneously with the state transition of the button B to the selected state, the R component of uncompressed LPCM data is reproduced according to the audio_reproduction_control_info of the button_info (2), so that the click sound of button B is reproduced.

Figure 44A:
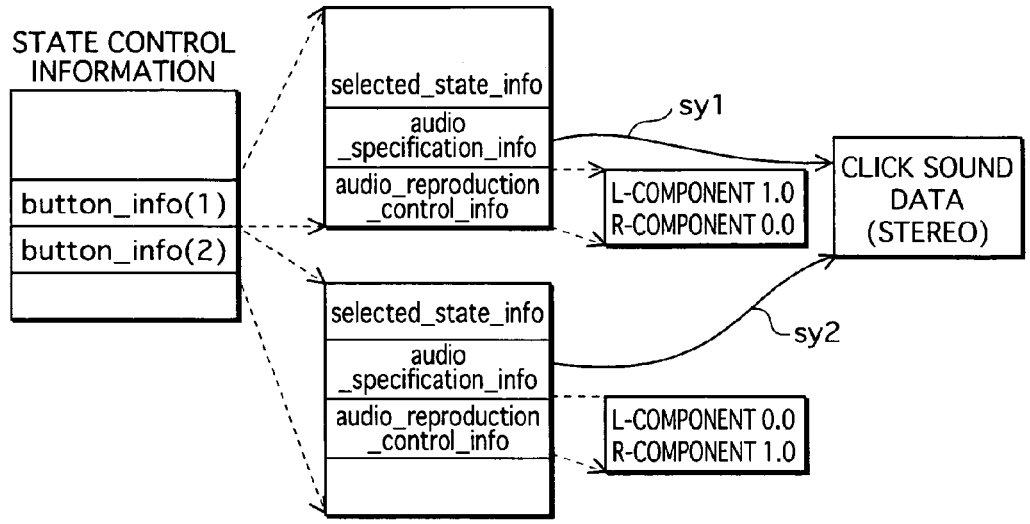
FIG. 44A is a view showing the state control information including button_info (1) and button_info (2)
Figure 44B:
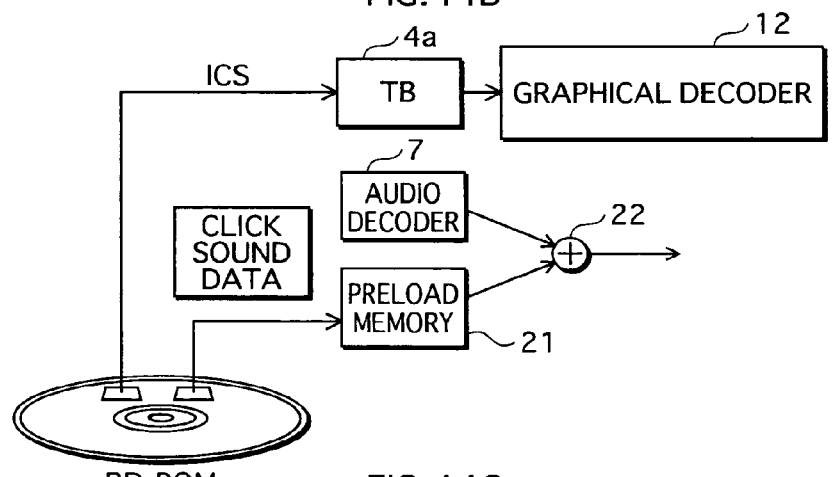
FIG. 44B is a view showing the reading process of the ICS including the state control information.

With reference to FIGS. 44 and 45, a description is given to a specific example of the click sound reproduction using the above ICS and reproduction apparatus. The example related to the state control information shown in FIGS. 44A and 44B. The state control information shown in FIG. 44A includes button_info(1) and button_info(2). As shown by the arrows sy1 and sy2 in the figure, both the button_info (1) and button_info 2) specify the same piece of click sound data, which is stereo sound. The audio_reproduction_control_info of the button_info(1) includes the mixing parameter for L component, whereas the audio_reproduction_control_info of the button_info(2) includes the mixing parameter for R component.

FIG. 44B shows the reading process of the ICS including the state control information. Prior to the ICS, click sound data is loaded to the preload memory 21.

Figure 45A:
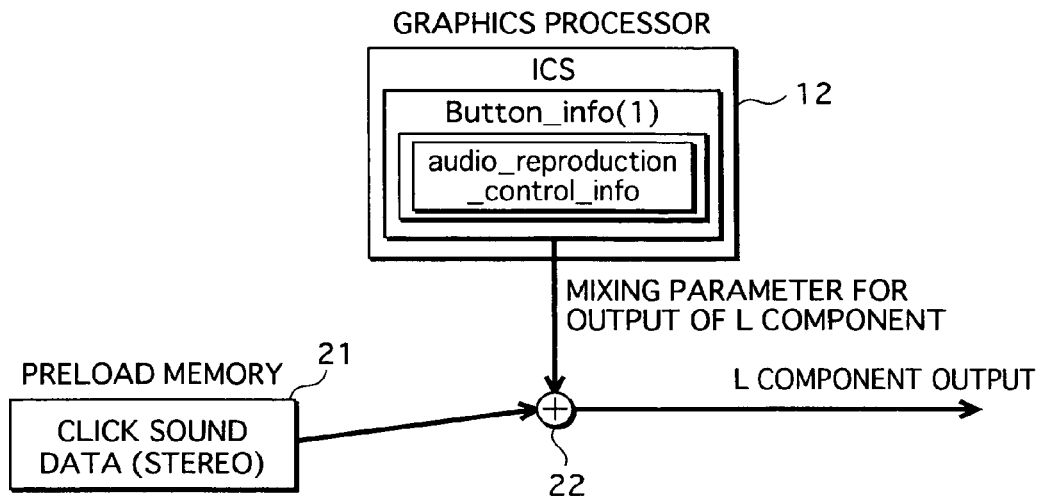
FIGS. 45A and 45B are views illustrating the reproduction control of the click sound data according to the ICs read to the preload memory 21.
Figure 45B:
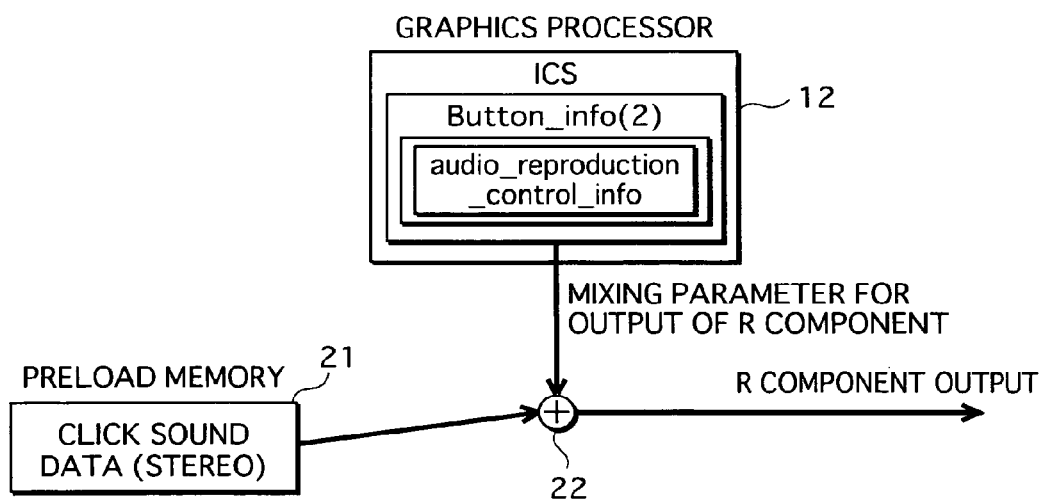

FIGS. 45A and 45B illustrate the reproduction control of the click sound data according to the ICS read to the preload memory 21. In the case where the button A associated with button_info (1) is in the selected state, the graphics decoder 12 controls the audio decoder 7 so that the click sound data is reproduced according to the audio_reproduction_control_info of the button_info(1). As a result, the L component of the stereo click sound data is reproduced. On the other hand, in the case where the button B associated with button_info(2) is in the selected state, the graphics decoder 12 controls the audio decoder 7 so that the click sound data is reproduced according to the audio_reproduction_control_info of the button_info (2). As a result, the R component of the stereo click sound data is reproduced.

With the above control, a piece of click sound data composed in stereo is used as the click sound of button A by reproducing the L component and as the click sound of button B by reproducing the R component, when a respective button is selected.

Figure 45C:
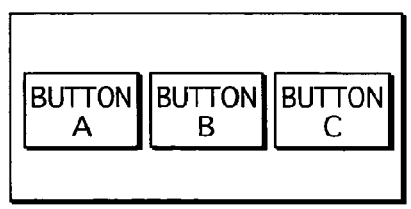
FIG. 45C is a view showing an example of three buttons (buttons A, B, and C) that are laterally aligned on an interactive display and an example of button state information associated with the buttons

This concludes the specific example in which a plurality of click sounds is collectively stored as one piece of uncompressed LPCM data. Alternatively, the button_info of the present invention may be set so as to produce the click sound upon a button operation in a manner that the sound comes from a different direction. A specific example of such control is described below with reference to FIG. 45. FIG. 45C shows an example of three pieces of button_info associated with three laterally aligned buttons (button A, button B, and button C). The button_info associated with the button A, which is on the left, has the mixing parameter of 1.0 for the L component. The button_info associated with the button B, which is in the middle, has the mixing parameters of 0.5 for both the L and R components. The button info associated with the button C, which is on the right, has the mixing parameter of 1.0 for the R component. With the above mixing parameters, when the left button A is selected, the click sound is outputted from the left speaker. When the right button C is selected, the click sound is outputted from the right speaker. When the middle button B is selected, the click sound is outputted equally from both speakers. As above, the button_info may be set so that the click sound is outputted from a different direction depending on the position of button on the screen. The click sound coming from the direction corresponding to the position of the button pushed adds to the realism in the button operations.

As described above, according to the present embodiment, a click sound for each of a plurality of buttons is integrated into one piece of stereo click sound data. With the use of audio_specification_info and audio_reproduction_control_info, the same piece of click sound data is reproduced as different click sounds for different buttons. With this integration, the amount of click sound data is reduced, and thus the size of preload memory 21 for loading the click sound data can be reduced.

Figure 44C:
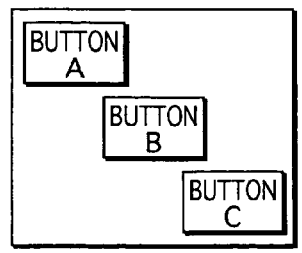
FIG. 44C is a view showing an example of three buttons (buttons A, B, and C) that are diagonally aligned on an interactive display and an example of button state information associated with the buttons.

Although the specific examples given above are based on the stereo click sound data, the click sound data may be uncompressed 5.2-channel audio data. FIG. 44C shows an example similar to the one shown in FIG. 45C. Yet, in the example in FIG. 44C, the mixing parameters are set for reproduction of 5.2-channel audio data. Thus, in addition to the L and R components, the 5.2-channel audio data includes Center, Rear Left, and Rear Right components. The buttons A, B, and C are diagonally aligned on the interactive display. In this example, the button_info associated with the button A has the mixing parameter of 1.0 for L component. The button_info associated with the button C has the mixing parameter of 1.0 for Rear Right component. The button_info associated with the button B has the mixing parameters of 0.1, 0.1, 0.4, 0.2, and 0.2 for L, R, Center, Rear Left, Rear Right components, respectively. With this setting, when the button A is selected, the click sound is outputted from the right. When the button B is selected, the click sound is outputted from the left. When the middle button B is selected, the click sound is outputted from all the directions. As above, the direction from which the click sound comes is changed depending on the position of the button pushed. This arrangement adds to the realism in button operations (Note in the above example, the button_info associated with the button B may alternatively be set to have the parameter of 1.0 for the Center component and the parameter of 1.0 for each of the other components).

Furthermore, in addition to the audio decoder 7, another audio decoder may be provided for click sound data. In this case, the preload memory 21 stores compressed audio data in advance. In response to the button state transition, the audio decoder for click sound data extracts the compressed audio data from the preload memory 21 and decodes the extracted data. The provision of the audio decoder for click sound data allows the preload memory 21 to store the compressed audio data, so that the size of preload memory 21 can be reduced.

Third Embodiment

Figure 46:
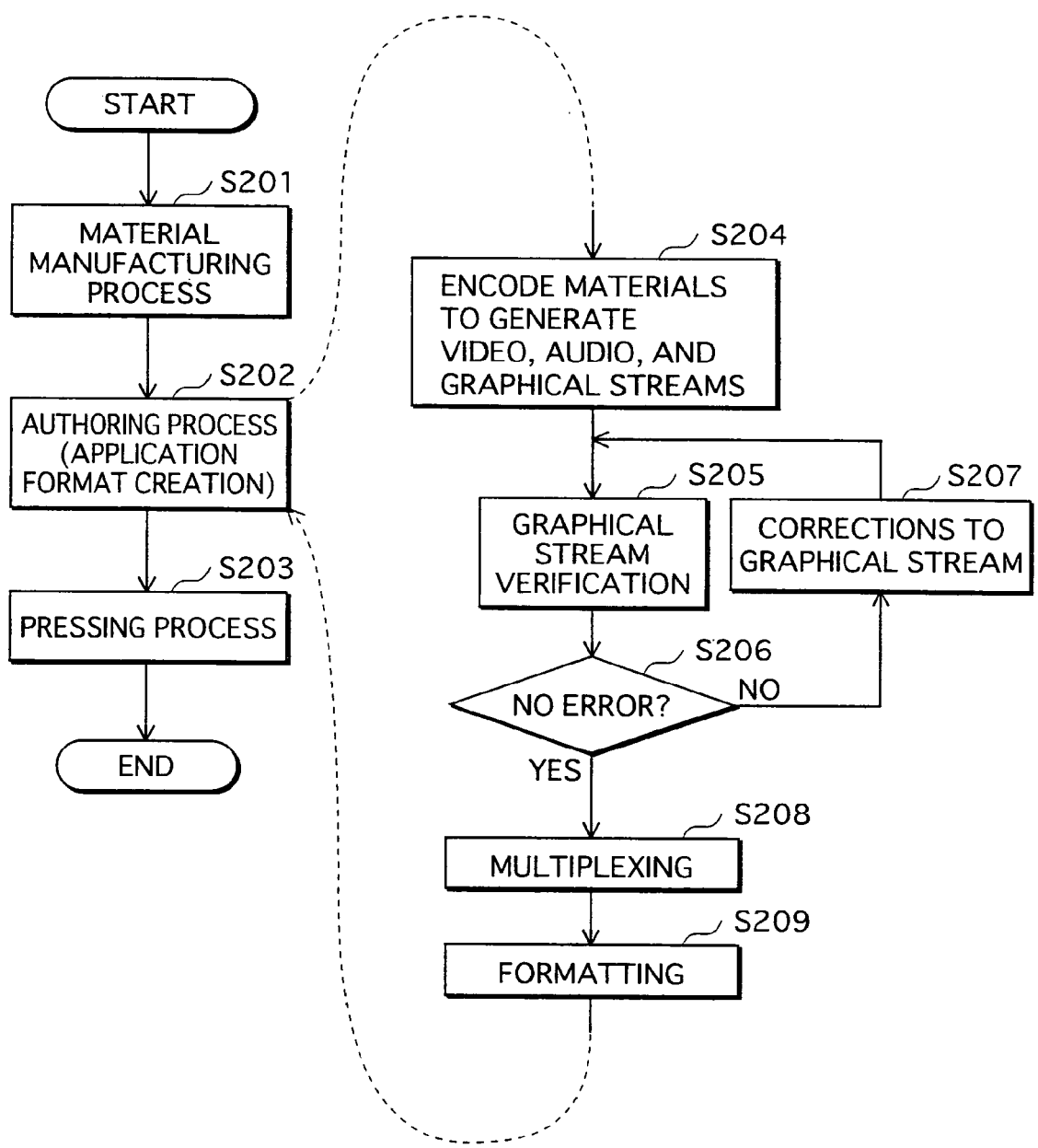
FIG. 46 is a flowchart of the manufacturing process of a BD-ROM according to a third embodiment of the present invention.

A third embodiment of the present invention relates to a manufacturing process of the BD-ROM. FIG. 46 is a flowchart of the manufacturing process of the BD-ROM according to the present invention.

The manufacturing process includes a material production step of recording video, sound, and the like (step S201), an authoring step of creating an application format using an authoring device (step S202), and a pressing step of creating an original master of the BD-ROM and performing stamping and bonding to complete the BD-ROM (step S203).

The BD-ROM authoring step includes the following steps S204-S209.

First, in the step S240, video materials, audio materials, and supplemental graphics materials are encoded into a video stream, an audio stream, and a graphics stream, respectively. Next, in the step S205, the verification test of the graphics stream is carried out. As described in the first embodiment, the graphics stream includes, in addition to graphics data for presentation of buttons, state control information of the button. This makes it possible to verify the graphics stream independently. If any error is detected (step S206: NO), an appropriate correction is made to the graphics stream, which is not yet multiplexed with the other streams (step S207), and the verification test of the graphics streams is carried out again.

If no error is detected through the verification test of graphics stream (step S206: YES), the video, audio, graphics streams, which are obtained in the step S208 by encoding the materials, are interleaved multiplex converted to one digital stream. In the step S209 that follows, necessary information is generated based on the scenario for the BD-ROM, and the scenario and digital stream are adapted to be in compliance with the BD-ROM format.

According to the present embodiment, the ICS defining the button state transition is integrated into the graphics stream with graphics data. Thus, it is no longer necessary to wait for the video stream to be encoded or the multiplexing of streams to be completed. Instead, the graphic stream is ready for verification test upon its production to see how the button states change as the reproduction proceeds. Since the verification test of button state transition can be carried out at an earlier stage of authoring, a possibility is avoided that an error is detected right before the shipment, which forces the developers to rush. The verification test of graphic stream alone provides a better environment for incorporating animated buttons of complex motion into a movie.

(Supplemental Note)

Practicing of the present invention is not limited to the specific examples described above. The present invention can be practiced with any of modifications (A) to (O) below. The invention of each of the claims of this application broadened or generalized descriptions of the above-described embodiments and their modifications including the following. The extent of the broadening and generalization reflects the state of the art in the related technical field at the time of filing of the present application. Yet, the invention recited in each claim is directed to means of solving the problems associated with the present invention. Thus, the scope of each invention does not go beyond the scope in which those skilled in the art recognize the means for solving the problems. Consequently, the invention recited in each of the appended claims is in substantial correspondence with the detailed description above.

(A) The above embodiments describe the case where the BD-ROM is used as the recording medium. Main features of the present invention, however, lie in a graphics stream recorded on the recording medium, which does not rely on physical characteristics of BD-ROMs. Therefore, the present invention is applicable to any recording medium that is capable of recording a dynamic scenario and a graphics stream. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive; and a non-removable hard disk drive.

(B) The above embodiments describe the cases where the reproduction apparatus decodes an AV Clip on the BD-ROM and outputs the decoded AV Clip to the television. As an alternative, the reproduction apparatus may be equipped with only a BD drive, with the remaining construction elements being provided in the television. In this case, the reproduction apparatus and the television can be incorporated in a home network connected with an IEEE 1394 connector. Furthermore, the above embodiments describe the cases where the reproduction apparatus is connected to the television, but the reproduction apparatus may instead be integrated with a display device. Also, the reproduction apparatus may include only the elements relating to the essential part of processing. Those reproduction apparatuses are all descried in this specification as inventions. Accordingly, regardless of the modes therefor, an act of manufacturing a reproduction apparatus based on the internal structure of the reproduction apparatus described in the first, second, or third embodiment is considered to be an act of practicing the present invention. Also, any act of assigning with charge (i.e. for sale) or without charge (i.e. as a gift), leasing, and importing the reproduction apparatus is an act of practicing the present invention. Likewise, an act of offering for assignment or lease of the reproduction apparatus using storefront displays, catalogs, or brochures is an act of practicing the present invention.

(C) Information processing using the programs shown in the flowcharts is actually realized using hardware resources. Accordingly, the programs which describe the operational procedures shown in the flowcharts are themselves an invention. The above embodiments describe the cases where the programs are incorporated in the reproduction apparatus, but the programs can be used independently of the reproduction apparatus. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) The time elements of the steps which are executed in a time series in each of the flowcharts can be regarded as the necessary elements of the present invention. With this being so, the procedures shown by these flowcharts are considered to disclose reproduction methods. If the processing shown in each flowchart is carried out by performing the steps in a time series so as to achieve the intended aim and the intended effect, this is an act of practicing the recording method of the present invention.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EX TS packets") are grouped in units of 32 packets, and each group is written to three sectors. One group made up of 32 EX TS packets has 6,144 bytes (=32×192), which is equivalent to a size of three sectors that is 6,144 bytes (=2,048×3). The 32 EX TS packets contained in the three sectors are called an Aligned Unit.

In a home network connected with an IEEE 1394 connector, the reproduction apparatus 200 transmits an Aligned Unit in the following manner. The reproduction apparatus removes a TP_extra_header from each of the 32 EX TS packets in the Aligned Unit, encrypts the body of each TS packet according to the DTCP Specification, and outputs the encrypted TS packets. When outputting the TS packets, the reproduction apparatus inserts an isochronous packet between adjacent TS packets. A point where the isochronous packet is inserted is determined based on a time shown by an arrival_time_stamp of the TP_extra_header. The reproduction apparatus 200 outputs a DTCP_descriptor, as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected with the IEEE 1394 connector, the TS packets from being recorded to other devices.

(F) The above embodiments describe the cases where an AV Clip of the BD-ROM Format is used as a digital stream, but the present invention can also be realized with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, or an MPEG-AAC audio stream.

(G) The video editing described in the above embodiments may be obtained by encoding an analog image signal broadcast by analog broadcasting.

Alternatively, analog/digital image signals recorded on a videotape may be encoded to obtain contents. Also, analog/digital image signals directly captured by a video camera may be encoded to obtain contents. A digital work distributed by a distribution server is applicable too.

Figure 47:
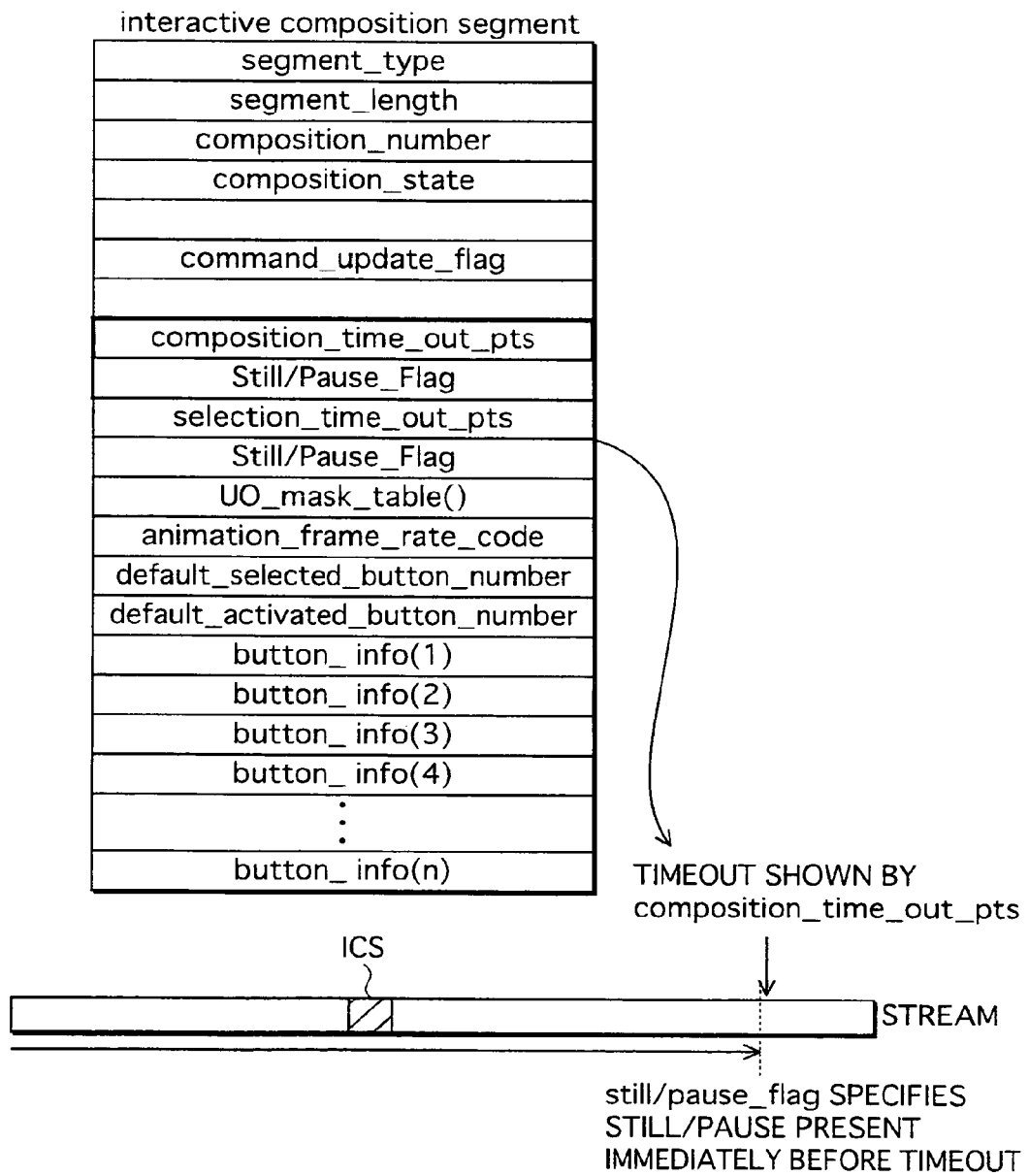
FIG. 47 is a view showing an ICS according to one modification of the present invention.

(H) The ICS may define the operations to be performed at the time of timeout. The timeout of the ICS is specified by the composition_time_out_pts described in the first embodiment. FIG. 47 shows an ICS according to one modification of the present invention. The ICS in the figure is newly provided with a Still/Pause_information field. The Still/Pause_information field shows whether the operations of reproduction apparatus are to be brought into "Still" or "Pause". The operations of the reproduction apparatus referred herein include the decoding operations by the video decoder 5, stream graphics processor 14, and graphics decoder 12 as well as the navigation operations by the graphics controller 17 and the controller 20. The term "Still" used herein refers to suspension of both the decode operations and the navigation operations, whereas the term "Pause" refers to suspension of the decode operations while the navigation operations are continued. Under the Still condition, the navigation operations are suspended, so that the last reproduced picture remains displayed as a still picture and no button state transition is possible.

On the other hand, under the Pause condition, the navigation operations are continued, so that users are allowed to change the button states. With provision of the Pause/Still_information in the ICS, control to be executed upon timeout can be defined at the time of authoring.

Figure 48:
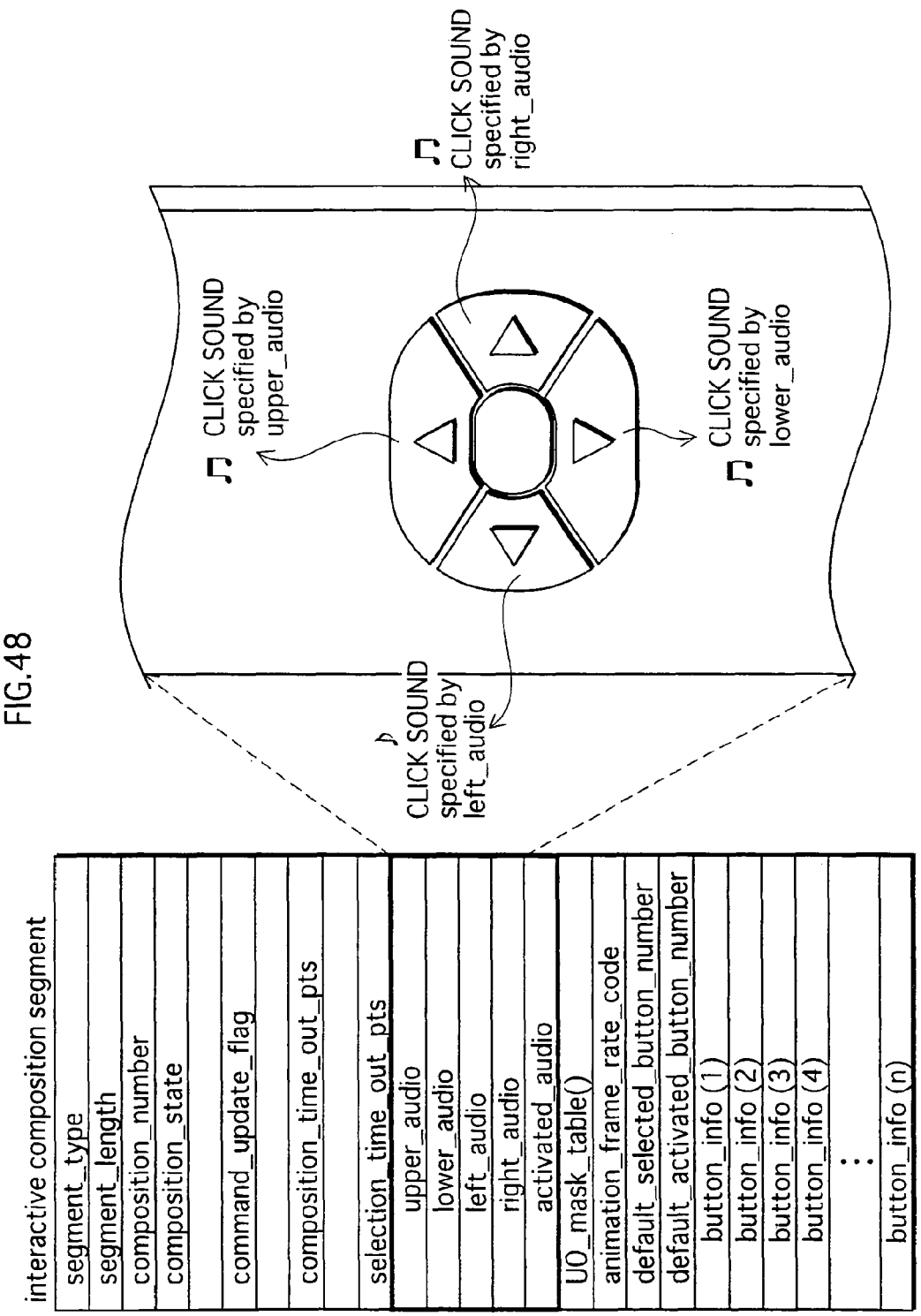
FIG. 48 is a view showing an ICS defining a click sound for each key of the remote controller.

(I) In the second embodiment, the button_info defines a click sound for each button. In addition, a click sound may be defined by ICS for each key of the remote controller. FIG. 48 is a view showing the ICS defining a click sound for each key of the remote controller.

The upper_audio field defines the audio specification information and reproduction control information to be referred to at a push of the Move Up key.

The lower_audio field defines the audio specification information and reproduction control information to be referred to at a push of the Move Down key.

The left_audio field defines the audio specification information and reproduction control information to be referred to at a push of the Move Left key.

The right_audio field defines the audio specification information and reproduction control information to be referred to at a push of the Move Right key.

The activated_audio field defines the audio specification information and reproduction control to be referred to at a push of the Activated key. At a push of a key of the remote controller 400, the preload memory 21 and the mixer 22 operate according to the audio specification information and reproduction control information that are associated with the pushed key, so that a corresponding click sound is reproduced.

(J) Graphics objects described in the above embodiments is run-length encoded raster data. Run-length encoding is used for compression/encoding of graphics objects, because the run-length encoding is suitable for compression and decompression of subtitles. Subtitles have a property in that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. Nevertheless, the use of run-length encoding for graphics objects is not essential to the present invention. For example, graphics objects may be PNG data. Also, graphics objects may be vector data instead of raster data. Further, graphics objects may be transparent patterns.

INDUSTRIAL APPLICABILITY

A recording medium and a reproduction apparatus according to the present invention realize interactive control on a movie, thereby adding value to the movie. Movies distributed with such added value invigorate the movie market and consumer appliance market. Thus, the recording medium and the reproduction apparatus according to the present invention are highly applicable in the movie and the consumer appliance industries.

What is claimed is:

1. A method for recording data onto a recording medium, the method comprising:
    a first step of multiplexing a video stream and a graphics stream to obtain a digital stream; and
    a second step of recording the digital stream and uncompressed audio data onto the recording medium, wherein
    the graphics stream includes a plurality of pairs of graphics data and state control information that are integrated in the graphics stream, the graphics data being used to compose an interactive display that includes a button having a normal state, a selected state, an activated state, and the state control information being used to cause the button to change to a different state in response to a reproduction proceeding of the video stream and a user operation,
    each pair of graphics data and state control information constitutes a display set, and
    each piece of state control information in a corresponding display set includes click sound control information that indicates uncompressed audio data to be reproduced upon a state transition of the button to the selected state and to the activated state.

2. The method according to claim 1, wherein
    each piece of state control information in a corresponding display set includes type information indicating a type of the corresponding display set, and
    each piece of type information indicates whether graphics data included in a corresponding display set is identical in contents to graphics data included in an immediately preceding display set on the graphics stream.

3. A reproduction apparatus for reproducing a digital stream into which a video stream and a graphics stream are multiplexed, the reproduction apparatus comprising:
    a video decoder operable to decode the video stream to obtain video data;

a graphics decoder operable to decode the graphics stream to obtain an interactive display that includes a button;

an audio decoder operable to decode an elementary stream multiplexed in the digital stream to produce audio output; and a preload memory operable to store uncompressed audio data, wherein the graphics stream includes a plurality of pairs of graphics data and state control information that are integrated in the graphics stream, the graphics data being used to compose an interactive display that includes a button having a normal state, a selected state, an activated state, and the state control information being used to cause the button to change to a different state in response to a reproduction proceeding of the video stream and a user operation, each pair of graphics data and state control information constitutes a display set, and each piece of state control information in a corresponding display set includes click sound control information that indicates uncompressed audio data to be reproduced upon a state transition of the button to the selected state and to the activated state, the reproduction apparatus further comprises a mixer operable, upon receipt of a user operation of selecting or activating the button, to mix (i) a piece of uncompressed audio data stored in the preload memory and associated with a corresponding one of the selected and activated states of the button and (ii) the audio output of the audio decoder and to output the mixed audio data, and the graphics decoder includes:
  a processing unit operable to decode the graphics data included in the graphic stream to obtain the interactive display including the button; and
  a controller operable to change a state of the button based on a corresponding piece of state control information.

4. The reproduction apparatus according to claim 3, wherein each piece of state control information in a corresponding display set includes type information indicating a type of the corresponding display set, each piece of type information indicates whether graphics data included in a corresponding display set is identical in contents to graphics data included in an immediately preceding display set on the graphics stream, when performing normal reproduction, the controller ignores a display set of which type information indicates that graphics data included in the display set is identical in contents to graphics data included in an immediately preceding display set, and when performing reproduction starting from a point searched in a skip operation, the controller starts decoding from a display set that is located after the reproduction start point and that has type information indicating that graphics data included in the display set is identical in contents to graphics data included in an immediately preceding display set.

5. A method for reproducing a digital stream into which a video stream and a graphics stream are multiplexed, the method comprising:

a first step of decoding the video stream to obtain video data;

a second step of decoding the graphics stream to obtain an interactive display that includes a button, and a third step of decoding an elementary stream multiplexed in the video stream, to produce audio output, wherein the graphics stream includes a plurality of pairs of graphics data and state control information that are integrated in the graphics stream, the graphics data being used to compose the interactive display that includes the button having a normal state, a selected state, an activated state, and the state control information being used to cause the button to change to a different state in response to a reproduction proceeding of the video stream and a user operation, each pair of graphics data and state control information constitutes a display set, and each piece of state control information in a corresponding display set includes click sound control information that indicates uncompressed audio data to be reproduced upon a state transition of the button to the selected state and to the activated state, the method further comprises a fourth step of, upon receipt of a user operation of selecting or activating the button, mixing (i) a piece of uncompressed audio data associated with a corresponding one of the selected and activated states of the button and (ii) the audio output of the third step and outputting the mixed audio data, and the second step includes:
  a sub-step of decoding the graphics data included in the graphic stream to obtain the interactive display including the button; and
  a sub-step of changing a state of the button based on a corresponding piece of state control information.

6. A reproduction system comprising:

a recording medium having (i) a digital stream into which a video stream and a graphics stream are multiplexed and (ii) uncompressed audio data recorded thereon; and a reproduction apparatus for reproducing the recording medium, wherein the graphics stream includes a plurality of pairs of graphics data and state control information that are integrated in the graphics stream, the graphics data being used to compose an interactive display that includes a button having a normal state, a selected state, an activated state, and the state control information being used to cause the button to change to a different state in response to a reproduction proceeding of the video stream and a user operation, each pair of graphics data and state control information constitutes a display set, and each piece of state control information in a corresponding display set includes click sound control information that indicates uncompressed audio data to be reproduced upon a state transition of the button to the selected state and to the activated state, the reproduction apparatus includes:
  a video decoder operable to decode the video stream to obtain video data;
  a graphics decoder operable to decode the graphics stream to obtain the interactive display that includes the button;
  an audio decoder operable to decode an elementary stream multiplexed in the digital stream to produce audio output;
  a preload memory operable to store the uncompressed audio data; and
  a mixer operable, upon receipt of a user operation of selecting or activating the button, to mix (i) a piece of uncompressed audio data stored in the preload memory and associated with a corresponding one of the selected and activated states of the button and (ii) the audio output of the audio decoder and to output the mixed audio data, and the graphics decoder includes:

a processing unit operable to decode the graphics data included in the graphic stream to obtain the interactive display including the button, and a controller operable to change a state of the button based on state control information.

7. A non-transitory computer-readable recording medium comprising:

a digital stream into which a video stream and a graphics stream are multiplexed; and uncompressed audio data, wherein the graphics stream includes a plurality of pairs of graphics data and state control information that are integrated in the graphics stream, the graphics data being used to compose an interactive display that includes a button having a normal state, a selected state, an activated state, and the state control information being used to cause the button to change to a different state in response to a reproduction proceeding of the video stream and a user operation, each pair of graphics data and state control information constitutes a display set, and each piece of state control information in a corresponding display set includes click sound control information that indicates uncompressed audio data to be reproduced upon a state transition of the button to the selected state and to the activated state.

* * * * *